United States Patent
Chen et al.

(10) Patent No.: US 10,992,578 B2
(45) Date of Patent: Apr. 27, 2021

(54) MESSAGE RETARGETING IN MACHINE-TO-MACHINE SERVICE LAYER COMMUNICATIONS

(71) Applicant: Convida Wireless, LLC, Wilmington, DE (US)

(72) Inventors: Zhuo Chen, Claymont, DE (US); Dale N. Seed, Allentown, PA (US); Quang Ly, North Wales, PA (US); Catalina Mihaela Mladin, Hatboro, PA (US); William Robert Flynn, IV, Schwenksville, PA (US); Rocco Di Girolamo, Laval Quebec (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/644,110

(22) Filed: Jul. 7, 2017

(65) Prior Publication Data
US 2018/0014144 A1  Jan. 11, 2018

Related U.S. Application Data

(60) Provisional application No. 62/359,516, filed on Jul. 7, 2016, provisional application No. 62/360,033, filed on Jul. 8, 2016.

(51) Int. Cl.
*H04L 12/741* (2013.01)
*H04W 4/70* (2018.01)
*G06F 9/54* (2006.01)

(52) U.S. Cl.
CPC ............ *H04L 45/745* (2013.01); *G06F 9/546* (2013.01); *H04W 4/70* (2018.02)

(58) Field of Classification Search
CPC . H04L 45/745; H04L 41/12; H04L 45/02–10; H04L 67/104; H04L 67/1061; H04W 4/70; G06F 9/546
See application file for complete search history.

(56) References Cited

U.S. PATENT DOCUMENTS 5,329,619 A * 7/1994 Page .................. G06F 9/546
707/999.104
9,210,645 B2 * 12/2015 Gleixner ................ H04W 4/70
(Continued)

FOREIGN PATENT DOCUMENTS

JP    2009-038511 A    2/2009

OTHER PUBLICATIONS

Pereira et al., IoT Interoperability for actuating applications through standardized M2M communications, 2016 IEEE 17th International Symposium on a World of Wireless, Mobile and Multimedia Networks (WOWMOM), IEEE, Jun. 21, 2016, pp. 1-6.
(Continued)

*Primary Examiner* — Asad M Nawaz
*Assistant Examiner* — Thomas R Cairns
(74) *Attorney, Agent, or Firm* — BakerHostetler

(57) ABSTRACT

Two methods are described to enable the communication between two service layer entities that do not have registration relations. In the first method, service layer entities employ a retargeting table that stores the service layer entity to retarget the message in order to deliver the message to the destination. In a second method, an infrastructure node in a service provider employs a retargeting chain table that stores a chain of entities that can retarget the message to the destination.

16 Claims, 43 Drawing Sheets

(56) References Cited

U.S. PATENT DOCUMENTS

| | | | |
|---|---|---|---|
| 9,344,888 B2* | 5/2016 | Starsinic | H04W 4/70 |
| 9,459,903 B2* | 10/2016 | Gray | G06F 9/45558 |
| 9,813,494 B2* | 11/2017 | Ding | H04W 4/08 |
| 9,973,535 B2* | 5/2018 | Maher | H04L 63/20 |
| 9,979,645 B2* | 5/2018 | Ll | H04L 45/745 |
| 10,367,677 B2* | 7/2019 | Parkvall | H04W 52/0245 |
| 2015/0003311 A1 | 1/2015 | Feuersaenger et al. | |
| 2015/0033311 A1 | 1/2015 | Seed et al. | |
| 2015/0033312 A1* | 1/2015 | Seed | H04W 4/70 726/7 |
| 2015/0055557 A1* | 2/2015 | Dong | H04W 4/70 370/328 |
| 2015/0304411 A1* | 10/2015 | Cheng | H04L 67/16 709/203 |
| 2016/0014028 A1* | 1/2016 | He | H04L 45/745 370/392 |
| 2016/0085577 A1 | 3/2016 | Gray | |
| 2016/0337875 A1* | 11/2016 | Sheng | H04W 4/70 |
| 2017/0149659 A1* | 5/2017 | K | H04L 45/02 |
| 2018/0375755 A1* | 12/2018 | Joshi | H04L 45/18 |

OTHER PUBLICATIONS

OneM2M Technical Specification, OneM2M TS-0001 V1.6.1, Functional Architecture, Jan. 30, 2015, 321 pages.

ETSI TS 102 690 V2.0.14 Machine-to-Machine Communications (M2M); Functional Architecture, Jul. 2013, 332 pages.

\* cited by examiner

MESSAGE RETARGETING IN MACHINE-TO-MACHINE SERVICE LAYER COMMUNICATIONS

CROSS-REFERENCE TO RELATED APPLICATIONS

This application claims the benefit of U.S. Provisional Patent Application No. 62/359,516, filed on Jul. 7, 2016, titled "Methods to Enable Message Retargeting in Machine-to-Machine Service Layer Communication," and this application claims the benefit of U.S. Provisional Patent Application No. 62/360,033, filed on Jul. 8, 2016, titled "Methods to Enable Message Retargeting in Machine-to-Machine Service Layer Communication," the contents of both of which are hereby incorporated by reference in their entireties.

BACKGROUND

An machine-to-machine (M2M)/Internet-of-things (IoT) service layer (SL) is a technology specifically targeted towards providing value-added services for M2M/IoT devices and applications. Recently, several industry standard bodies (e.g., oneM2M and ETSI) have been developing M2M/IoT SLs to address the challenges associated with the integration of M2M/IoT devices and applications into deployments with the Internet/Web, cellular, enterprise, and home network.

An M2M/IoT SL can provide applications and devices access to a collection of M2M/IoT oriented capabilities. A few examples include security, charging, data management, device management, discovery, provisioning, and connectivity management. These capabilities are made available to applications via APIs which make use of message formats, resource structures and resource representations supported by the M2M/IoT SL.

From a protocol stack perspective, SLs are typically situated above the Application Protocol Layer and provide value added services to applications they support. Hence, SLs are often categorized as 'middleware' services. FIG. 1 shows an exemplary service layer 102 between the Application Protocols 104 and Applications 106.

The oneM2M standards body has defined a M2M/IoT SL. The purpose of the SL is to provide "horizontal" services that can be utilized by different "vertical" M2M systems and applications, such as e-Health, fleet management, and smart homes. The architecture of the oneM2M SL, as shown in FIG. 2, defines a Common Service Entity (CSE) 202 that supports four reference points. The Mca reference point interfaces with the Application Entity (AE) 204. The Mcc reference point interfaces with another CSE 206 within the same service provider domain and the Mcc' reference point interfaces with another CSE in a different service provider domain. The Mcn reference point interfaces with the underlying network service entity (NSE) 208. An NSE 208 provides underlying network services to the CSEs, such as device management, location services and device triggering. A CSE 202 contains multiple logical functions called "Common Service Functions (CSFs)", such as "Discovery", "Data Management & Repository". FIG. 3 illustrates the CSFs supported by oneM2M.

The oneM2M architecture enables the following types of Nodes:
  Application Service Node (ASN): An ASN is a Node that contains one CSE and contains at least one Application Entity (AE). Example of physical mapping: an ASN could reside in an M2M Device.
  Application Dedicated Node (ADN): An ADN is a Node that contains at least one AE and does not contain a CSE. Example of physical mapping: an Application Dedicated Node could reside in a constrained M2M Device.
  Middle Node (MN): A MN is a Node that contains one CSE and contains zero or more AEs. Example of physical mapping: a MN could reside in an M2M Gateway.
  Infrastructure Node (IN): An IN is a Node that contains one CSE and contains zero or more AEs. A CSE in an IN may contain CSE functions not applicable to other node types. Example of physical mapping: an IN could reside in an M2M Service Infrastructure.
  Non-oneM2M Node (NoDN): A non-oneM2M Node is a Node that does not contain oneM2M Entities (neither AEs nor CSEs). Such Nodes represent devices attached to the oneM2M system for interworking purposes, including management.

The possible configurations of inter-connecting the various entities supported within the oneM2M system are illustrated in FIG. 4.

Within the Resource Oriented Architecture (ROA) of oneM2M, there is a distinction between resources hosted in the oneM2M service layer, and entities which interact with the oneM2M system. At the service layer all interactions are initiated by entities (AEs or CSEs) through a request operation, and these requests always target a resource. The response to each of these requests is always between two entities. As a consequence, within the M2M service provider domain, each resource needs to be identified by a unique resource ID, and each entity (AE and CSE) needs to be identified by a unique entity ID.

A CSE Identifier (CSE-ID) is an identifier that identifies a CSE, and is used for all interactions from/to a CSE. Service providers assign a relative CSE-ID to each CSE, which is unique within the service provider domain. The relative CSE-ID can be made globally unique by prefixing a unique M2M Service Provider ID.

An Application Entity Identifier (AE-ID) is an identifier that is used to uniquely identify "an AE resident on an M2M Node, or an AE that requests to interact with an M2M Node". In order to use the M2M services offered by the oneM2M service layer, applications must first register to a CSE. During this registration request, the application entity can either request a service provider assigned AE-ID (as-signed by the IN-CSE) or a 'locally' assigned AE-ID (as-signed by the CSE the application is registering with, also known as the registrar CSE). If assigned by the IN-CSE, the AE-ID is unique within the service provider domain. In such a case, the AE-ID starts with an 'S' character. In contrast, if the AE-ID is assigned by the Registrar CSE, it is only unique among all applications registered to this CSE. In such a case, the AE-ID starts with a 'C' character. Locally assigned AE-ID can be made unique within the service provider domain, by prefixing the CSE-ID of the Registrar CSE.

A Resource ID is an identifier, which most often is assigned by the CSE that is hosting the resource. The CSE may assign an unstructured ID or a structured ID. An unstructured ID is a sequence of characters that uniquely identifies the resource within the hosting CSE. In contrast, a structured ID identifies the resource within the CSE through its parent-child-relationships. It is very similar to how file-names are identified by their path, in an operating system directory structure. The resource ID can be made unique within the service provider domain, by prefixing the CSE-ID of the hosting CSE. In such a case, the ID is referred to as "Service Provider Relative Resource ID". In particular, this ID uniquely identifies the resource within the M2M service provider domain as well as the CSE where the resource is hosted. In addition, any Resource ID can be made globally unique by prefixing a unique M2M Service Provider ID. In such a case, the ID is referred to as "Absolute Resource ID". One important caveat about the M2M resource IDs is that they carry no routing information.

FIG. 5 shows an absolute resource identifier. In this example, This resource is located within the service provider domain with M2M Service Provide ID='www.m2mprovider2.com', is located within CSE with CSE-ID=CSE001, is located under resource '/AE1/', and has resource name 'cont001'. What is important, is that the resource is not located on the server with fully qualified domain name (FQDN) www.m2mprovider2.com. Rather it is located on the server hosting CSE with CSE-ID CSE001. In oneM2M, the routing information of this server is maintained in a Point of Access (PoA) attribute which provides the routable location of this CSE. Note however that the PoA may include another FQDN which denotes server hosting the CSE with CSE-ID CSE001.

An AE on an ASN, an MN or an IN performs registration locally with the corresponding CSE in order to use M2M services offered by that CSE. An AE on an ADN performs registration with the CSE on an MN or an IN in order to use M2M services offered by that CSE. An IN-AE performs registration with the corresponding CSE on an IN in order to use M2M services offered by that IN CSE.

The CSE on an ASN performs registration with the CSE in the MN in order to be able to use M2M Services offered by the CSE in the MN. As a result of successful ASN-CSE registration with the MN-CSE, the CSEs on the ASN and the MN establish a relationship allowing them to exchange information.

The CSE on an MN performs registration with the CSE of another MN in order to be able to use M2M Services offered by the CSE in the other MN. As a result of successful MN-CSE registration with the other MN-CSE, the CSEs on the MNs establish a relationship allowing them to exchange information.

The CSE on an ASN or on an MN perform registration with the CSE in the IN in order to be able to use M2M Services offered by the CSE in the IN. As a result of successful ASN/MN registration with the IN-CSE, the CSEs on ASN/MN and IN establish a relationship allowing them to exchange information.

In the above described cases, the AE or CSE performing the registration is referred to as a Registree AE or Registree CSE. The CSE on which the AE/CSE is registering is referred to as the Registrar CSE.

Following a successful registration of an AE to a CSE, the AE is able to access, assuming access privilege is granted, the resources in all the CSEs that are potential targets of request from the Registrar CSE.

The followings are some registration regulations specified in oneM2M-TS-0001 oneM2M Functional Architecture-V-2.6.0. First, an AE shall not be registered to more than one CSE (ASN-CSE, MN-CSE or IN-CSE). Second, an ASN-CSE shall be able to be registered to at most one other CSE (MN-CSE or IN-CSE). Third, an MN-CSE shall be able to be registered to at most one other CSE (MN-CSE or IN-CSE). Fourth, a concatenation (registration chain) of multiple uni-directional registrations shall not form a loop. E.g. two MN-CSEs A and B, cannot register with each other. Three MN-CSEs A, B and C, where A registers to B, and B registers to C, then C cannot register to A.

FIG. 6 illustrates a procedure for creating a <remoteCSE> resource. This procedure requires the creation of two resources: a <remoteCSE> on the Receiver CSE and a <remoteCSE> on the Originator CSE. The Originator is the registree CSE. The Receiver is the registrar CSE creating the <remoteCSE> resource initially.

In Step 001 of FIG. 6, the Originator 602 sends the CREATE Request message.

In Step 002 of FIG. 6, the Receiver 604 processes the registration request message.

In Step 003 of FIG. 6, the Receiver 604 responds with a registration Response message that contains the address/URI of the registered CSE.

In Step 004 of FIG. 6, the Originator 602, upon receipt of the CREATE response message, creates a <remoteCSE> resource locally under its <CSEBase> resource. This resource is representing the Receiver CSE. The Originator 602 provides the appropriate values to all mandatory parameters.

In Step 005 of FIG. 6, the Originator 602 may issue a RETRIEVE Request towards the Receiver (same To as for the CREATE request message) to obtain the optional parameters of the <remoteCSE> resource created at the Receiver 604 as for step 004 (e.g. labels, accessControlPolicyIDs attributes).

In Step 006 of FIG. 6, the Receiver 604 verifies that the Originator has the appropriate privileges to access the information.

In Step 007 of FIG. 6, The Receiver 604 sends a RETRIEVE response message.

In Step 008 of FIG. 6, The Originator 602 updates the created <remoteCSE> resource for the Receiver 604 with the information obtained in step 007.

The procedure for AE registration follows the message flow description depicted in FIGS. 7A-7B.

In this process, the Originator is the Registree AE. The Receiver allows the creation of the <AE> resource according to the access control policy and information in the applicable subscription profile. The Receiver derives the applicable M2M-Service-Profile-ID from the CSE-ID of the Registrar CSE.

In Step 001 of FIGS. 7A-B, optionally, in case the Registree AE intends to use a Security Association to perform the registration, a Security Association Establishment procedure is carried out first.

In Step 002 of FIGS. 7A-B, the Originator sends the information for the registration CREATE procedure with the following specific information in the CREATE Request message: From: AE-ID-Stem or NULL. In case the Registree AE has already registered successfully before, then deregistered and intends to register again with the same AE-ID-Stem value as before, the Registree AE includes that AE-ID-Stem value into the From parameter. In case the Registree AE has not registered successfully before and intends to get an M2M-SP-assigned AE-ID-Stem starting with an 'S' character assigned to itself but it does not have any specific value to suggest, it sets the From parameter to the character 'S'. In case the Registree AE intends to initiate a fresh registration and has no preference for the AE-ID-Stem value, the From parameter is set to NULL.

In Step 003 of FIGS. 7A-B, the Receiver determines whether the request to register the Registree AE meets any of the following conditions: Check if the applicable service subscription profile lists a combination of (allowed AE-ID-Stem value and allowed App-ID value) for the Credential-ID and the Registrar CSE-ID that match with the App-ID attribute in the Content parameter of the request and the AE-ID-Stem in the From parameter of the request. The applicable rules for this checking are contained in the <serviceSubscribedAppRule> resource(s) which are linked to by the ruleLinks attribute of the <m2mServiceSubscribedNode> resource(s) associated with the Registrar CSE.

In Step 004 of FIGS. 7A-B, if the From parameter of the request provides an AE-ID-Stem value, the Registrar CSE checks whether an <AE> resource with an Unstructured-CSE-relative-Resource-ID identical to the AE-ID-Stem value provided in the From parameter of the request does already exist. If so, there is still an active registration using the same AE-ID-Stem on the Registrar CSE and the Registrar CSE responds with an error.

The procedure continues with one of the following cases a)-d), details of which can be found in oneM2M-TS-0001 oneM2M Functional Architecture-V-2.6.0.

Case a) AE-ID-Stem starts with 'S' and AE does not include an AE-ID-Stem (initial registration).

Case b) AE-ID-Stem starts with 'S' and AE includes an AE-ID-Stem (re-registration).

Case c) AE-ID-Stem starts with 'C' and AE does not include an AE-ID-Stem (initial registration).

Case d) AE-ID-Stem starts with 'C' and AE includes an AE-ID-Stem (re-registration).

The oneM2M standard body has defined an announced resource scheme to facilitate resource discovery. As shown in FIG. 8, AE1 802 registers to MN-CSE1 804, MN-CSE1 804 registers to MN-CSE2 806, and MN-CSE2 806 registers to IN-CSE 808. After AE1 802 creates a resource at the MN-CSE1 804, AE1 802 may request the M2M Gateway hosting MN-CSE1 804 to announce the information to the MN-CSE2 806 and IN-CSE 808. Thus, other entities can discover the announced resource at MN-CSE2 806 and IN-CSE 808. In particular, AE1 802 sends a request to create an entry associated with MN-CSE1 804 in the announce To attribute at the original resource on MN-CSE 1 804. The MN-CSE 1 804 then sends a request to MN-CSE 2 806 to create an announced resource as shown in FIG. 9. The announced resource contains a "link" attribute, which stores the URI of the original resource. The MN-CSE 1 804 can send a request to create an announced resource at IN-CSE 808 as shown in FIG. 10.

SUMMARY

In existing M2M service layer architectures, two service layer (SL) entities, e.g. Entity A and B, can only exchange information if they have a registration relationship, i.e. Entity A registers to Entity B or Entity B registers to Entity A. Disclosed herein are two methods that enable communication between two SL entities that do not have registration relations.

In a first method, Service Layer entities employ a retargeting table that stores the SL entity to retarget the message in order to deliver the message to the destination. Specifically, when an entity receives a service layer message and the entity is not the destination entity of message, the entity looks up the retargeting table to find the destination service layer entity to retarget the message. The following procedures are described in order to manage the retargeting table at each entity. An enhanced service layer registration procedure can be used to add entries into a retargeting table. An enhanced service layer de-registration procedure can be used to delete entries from a retargeting table. An enhanced service layer registration management procedure can be used to update entries in a retargeting table In a second method, at least the Infrastructure Node in a Service Provider, employs a retargeting chain table that stores a chain of entities that can retarget the message to the destination.

When an SL entity receives a service layer message and it is not the destination entity of the message, the entity may look up its retargeting chain table, and retarget the message to the first entity on the retargeting chain. Moreover, the entity inserts a list of SL entities that make up the retargeting chain into the message. This sorted list provides guidance on how the message is to be retargeted to the destination.

When an entity receives a service layer message and it is not the destination entity of the message, the entity checks the retargeting chain information contained in the message. If there is no retargeting chain information in the message, the entity will forward the message if the destination has a registration relationship with it or forward the message to the entity it registered to otherwise. If there is retargeting chain information in the message, the entity retargets the message to the first entity on the retargeting chain. The entity removes the first entity on the retargeting chain and leaves the rest entities on the retargeting chain in the message.

According to another aspect disclosed herein, the following procedures are described in order to manage a retargeting chain table at an entity. An enhanced service layer registration procedure can be used to add entries into a retargeting chain table. An enhanced service layer de-registration procedure can be used to delete entries from a retargeting chain table. An enhanced service layer registration management procedure can be used to update entries in a retargeting chain table Also described herein are embodiments for a oneM2M implementation that enable service layer retargeting within a service provider domain, including new messages, resources and procedures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

In the following description, the following abbreviations have the following meanings:
ACP Access Control Policy
ADN Application Dedicated Node
AE Application Entity
API Application Programming Interfaces
ASN Application Service Node
CMDH Communication Management and Delivery Handling
CSE Common Service Entity
CSF Common Service Function
FQDN Fully Qualified Domain Name
IN Infrastructure Network
IoT Internet of Things
IP Internet Protocol
M2M Machine to Machine
MN Middle Node
NoDN Non-oneM2M Node
NSE Network Service Entity
PoA Point of Access
ROA Resource Oriented Architecture
SCL Service Capability Layer
SL Service Layer
URI Uniform Resource Identifier
URL Uniform Resource Locator Additionally, the following terms or phrases may have the following general meanings.

An M2M/IoT SL may be a software middleware layer that supports value-added services for M2M/IoT applications and devices through a set of Application Programming Interfaces (APIs) and underlying networking interfaces.

An M2M/IoT Application may be an application targeting a particular M2M/IoT use case (e.g. eHealth, smart energy, home automation).

A Registrar Entity may be a SL entity that another SL entity has registered to.

A Registree Entity may be a SL entity that registers with another SL entity.

A Retargeting Chain may be an ordered list that contains information about a chain of entities the message should follow to reach its destination.

A Retargeting Table may be a table that contains information about the next hop to be used for delivering a message to the destination.

An SL Entity may be a M2M Server, M2M Gateway, M2M Device or a resource in the M2M Area Network or the M2M Application Layer or M2M Service Layer software components.

An SL Resource may be a uniquely addressable entity in M2M/IoT SL.

Figure 1:
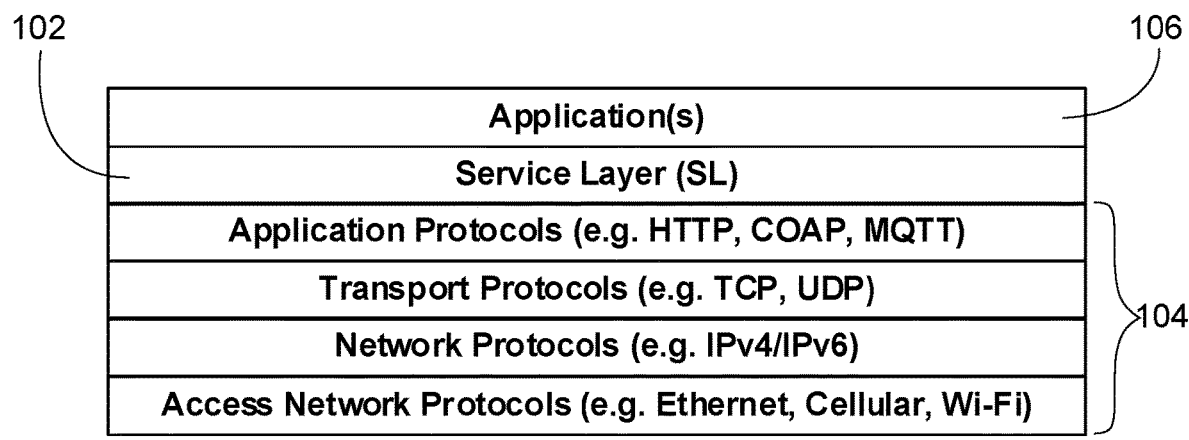
FIG. 1 is a diagram that illustrates an Exemplary Protocol Stack Supporting a Service Layer.
Figure 2:
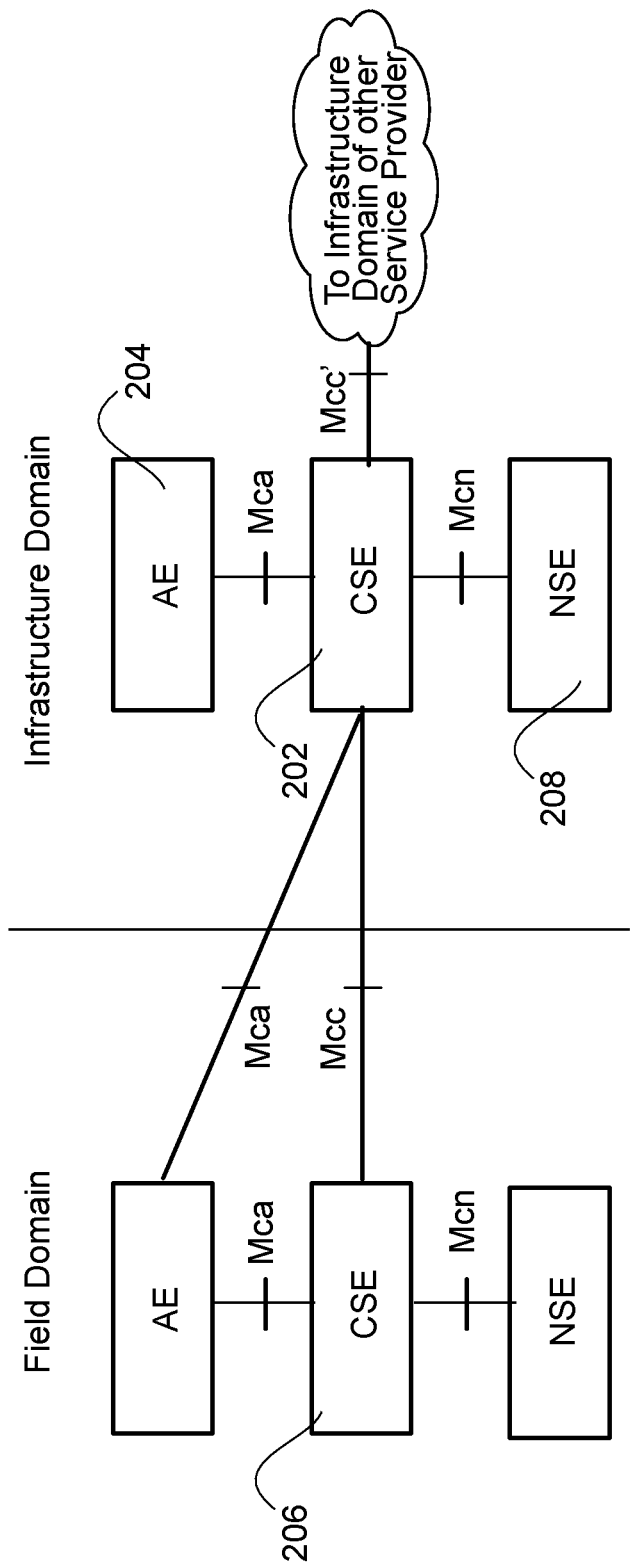
FIG. 2 is a diagram that illustrates a oneM2M Architecture.
Figure 3:
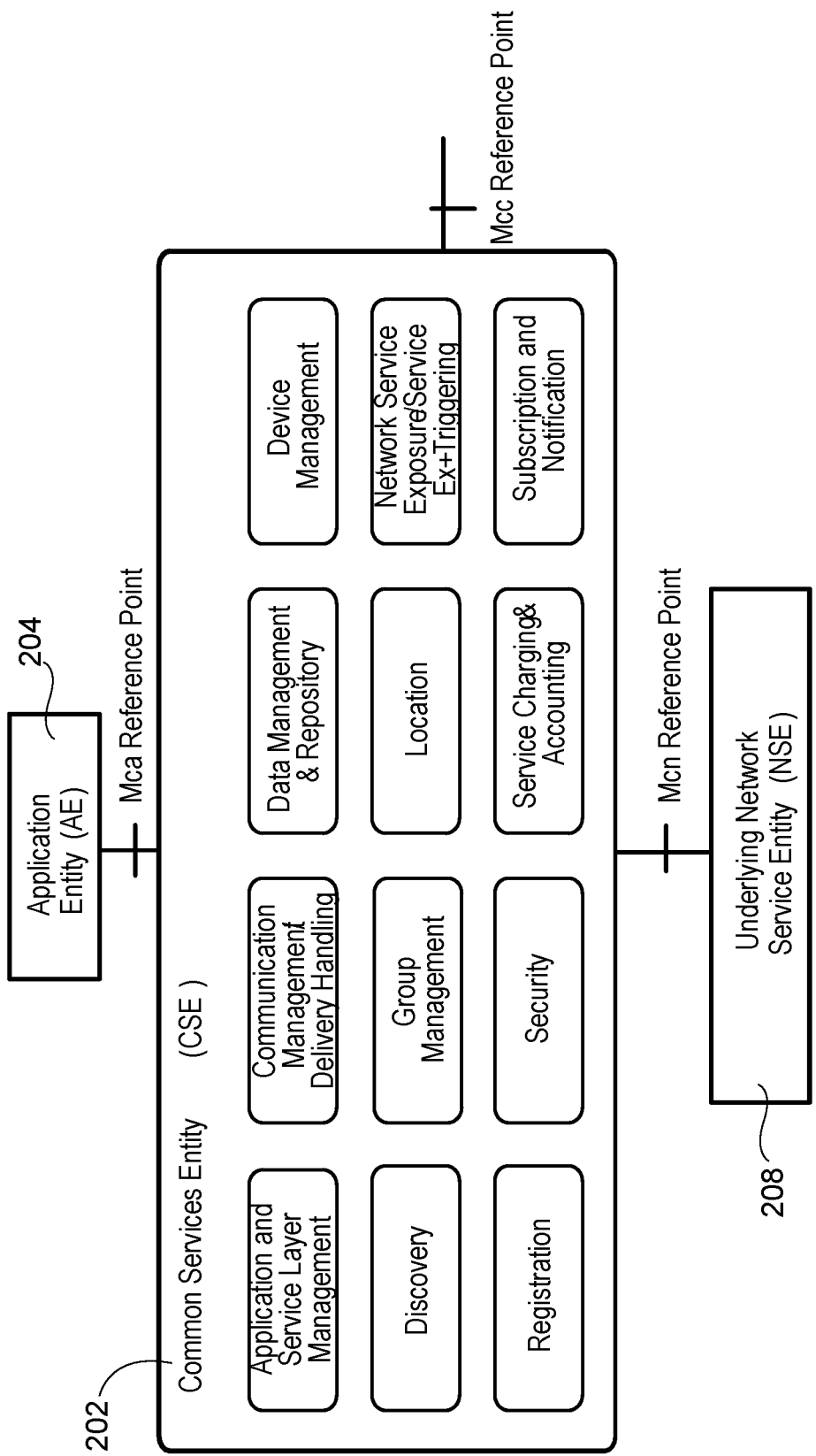
FIG. 3 is a diagram that illustrates oneM2M Common Service Functions.
Figure 4:
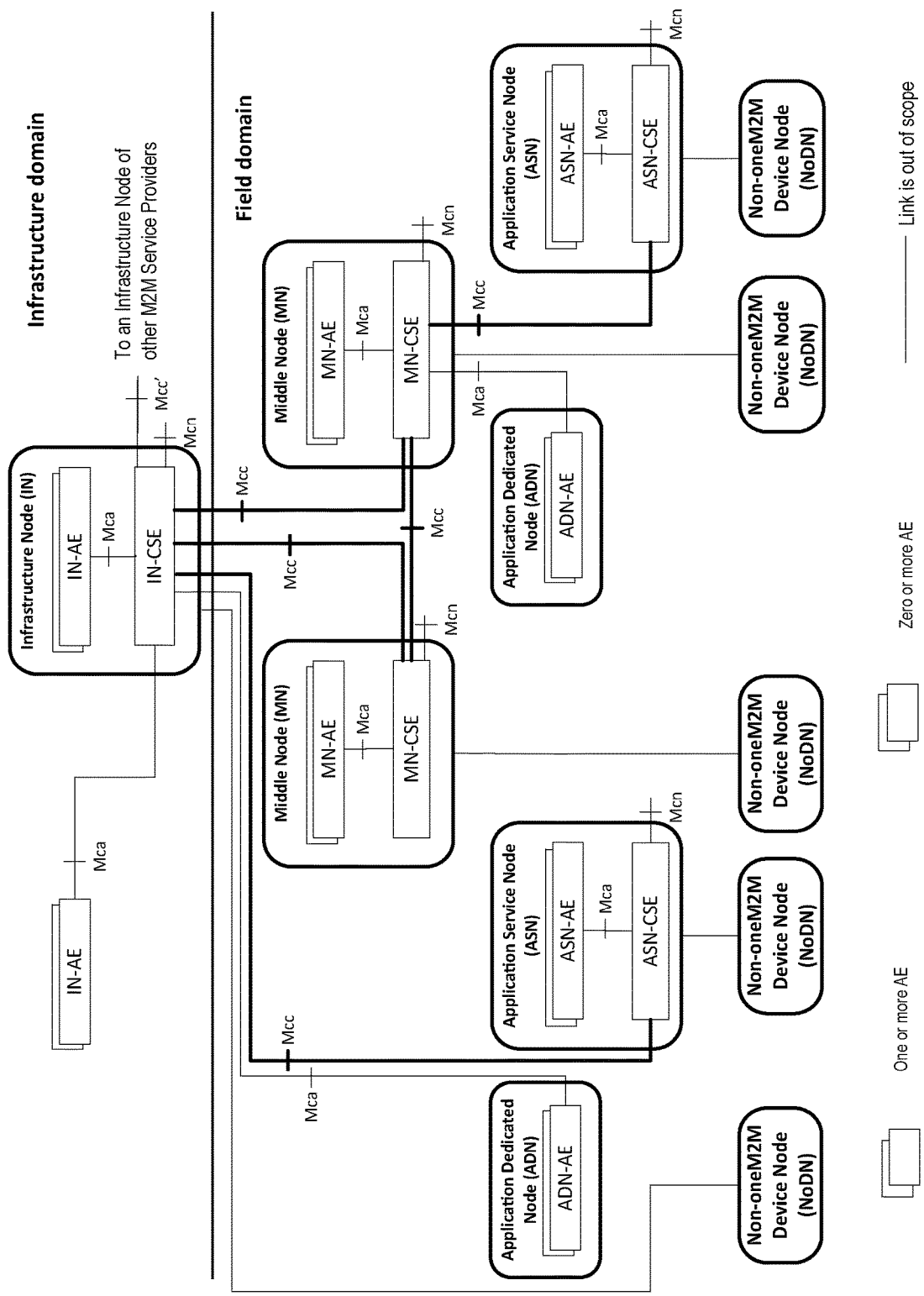
FIG. 4 is a diagram that illustrates configurations supported by oneM2M Architecture.
Figure 5:
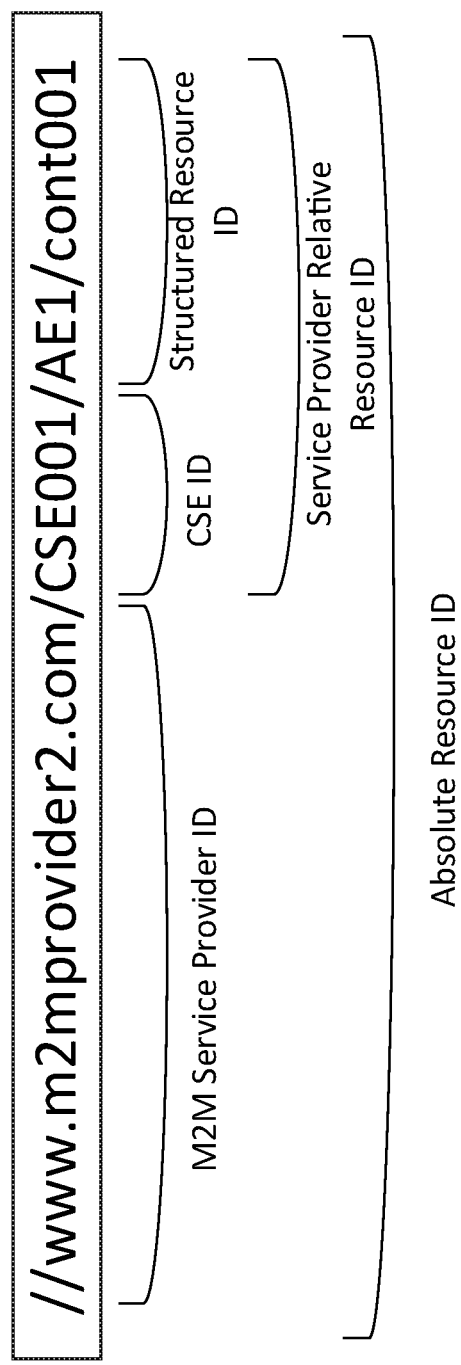
FIG. 5 is a diagram that illustrates resource IDs.
Figure 6:
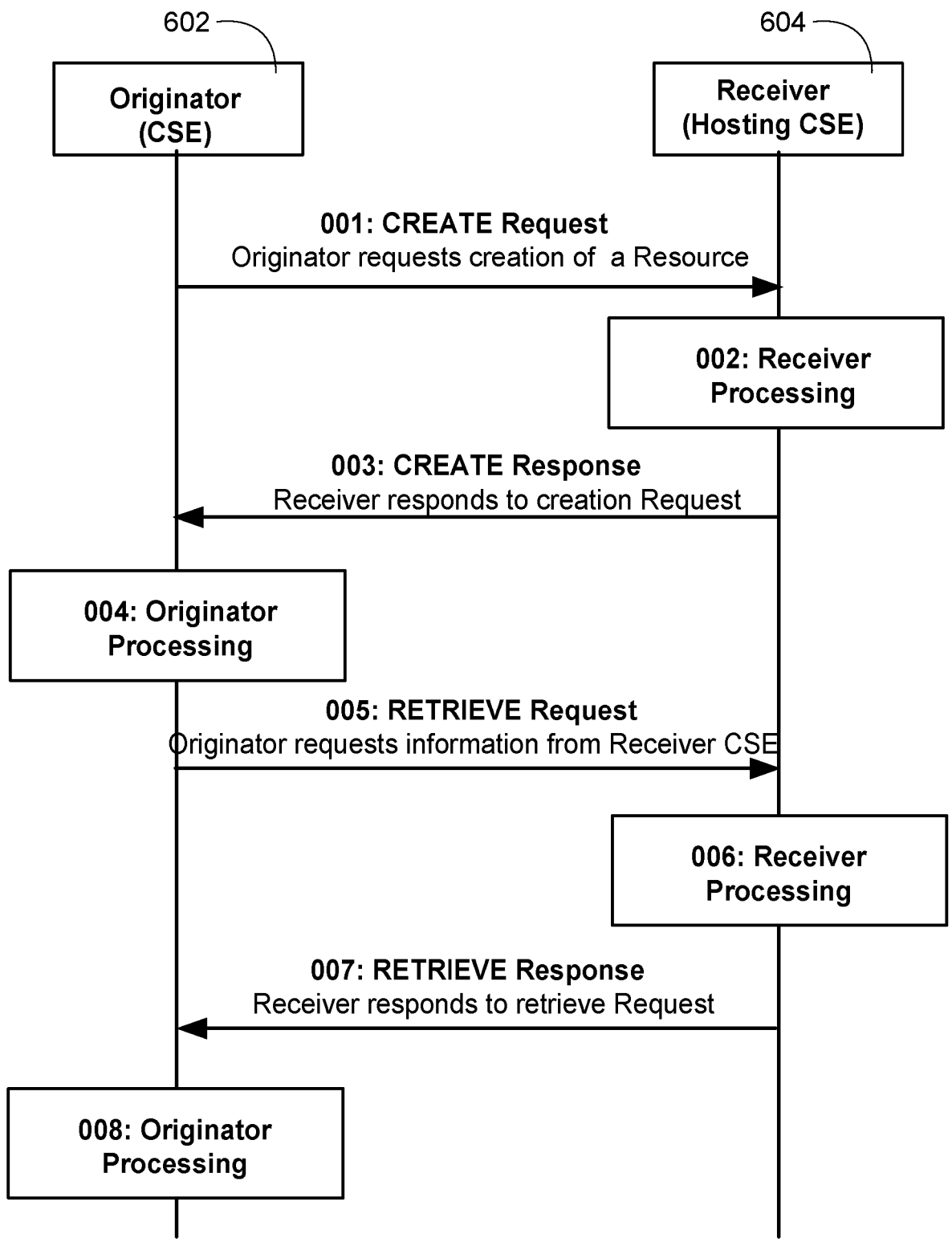
FIG. 6 is a diagram that illustrates a procedure for creating a <remoteCSE> resource.
Figure 7A:
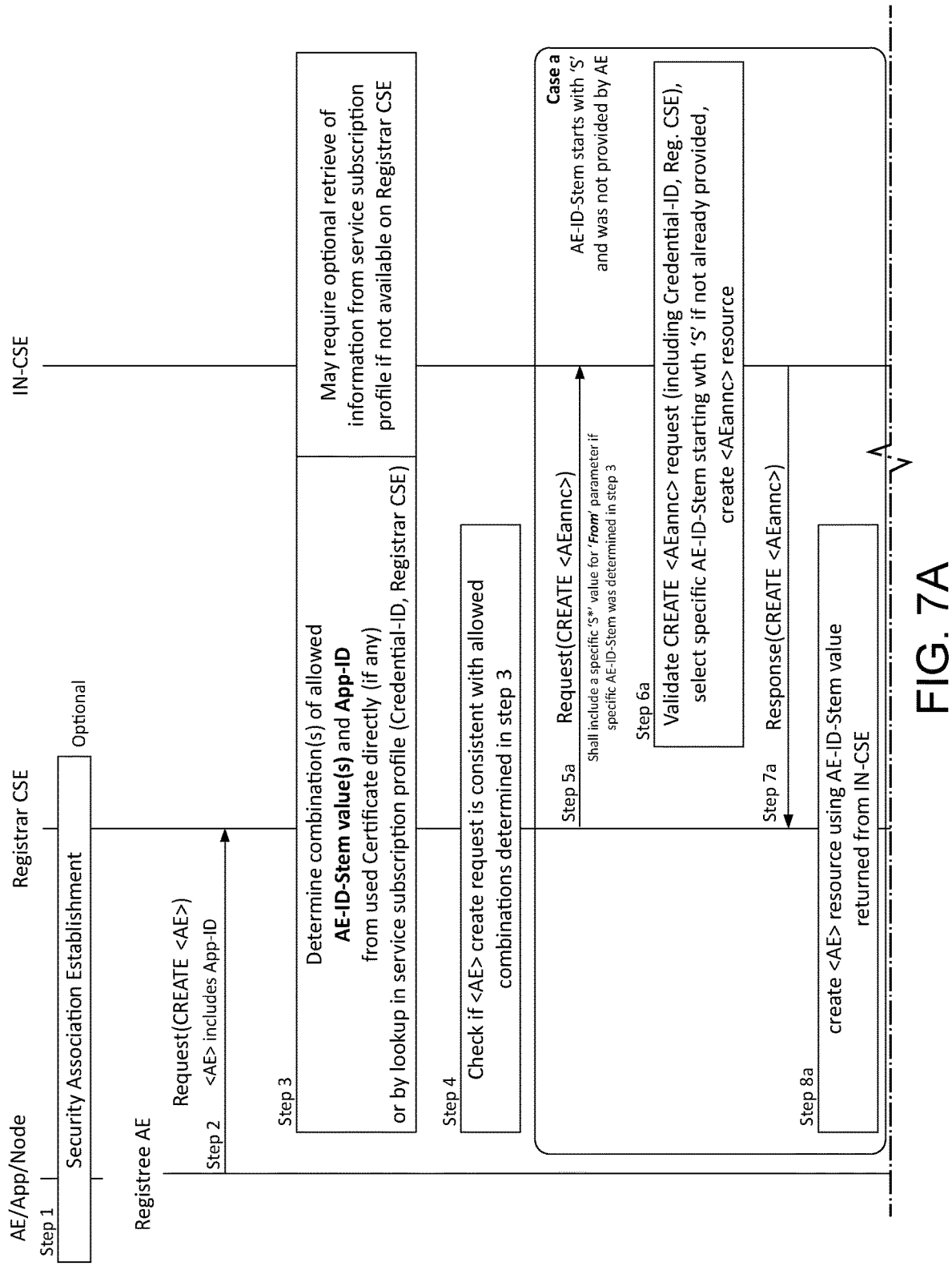
FIG. 7A and FIG. 7B together comprise a diagram that illustrates a procedure for creating an <AE> resource.
Figure 7B:
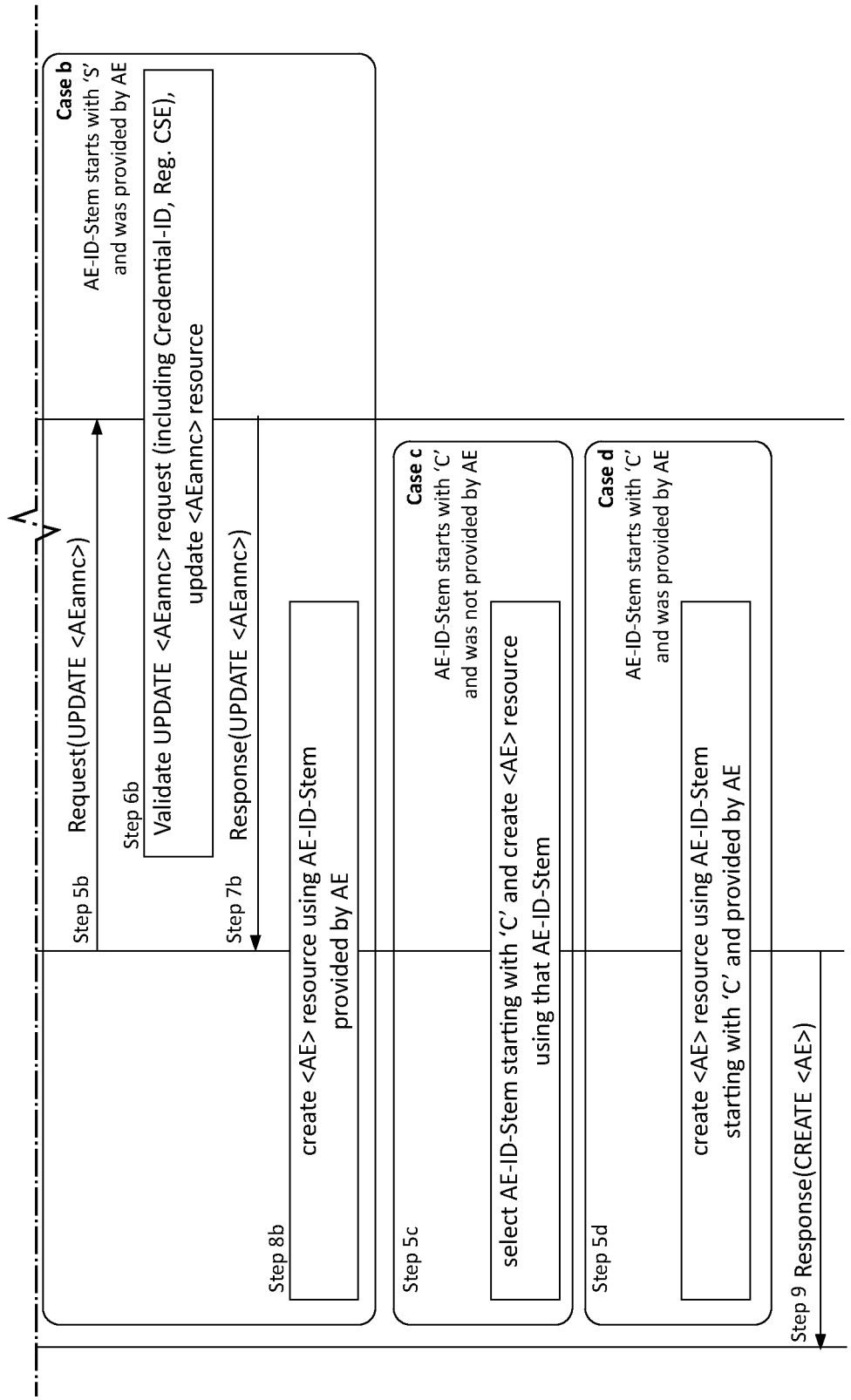
Figure 8:
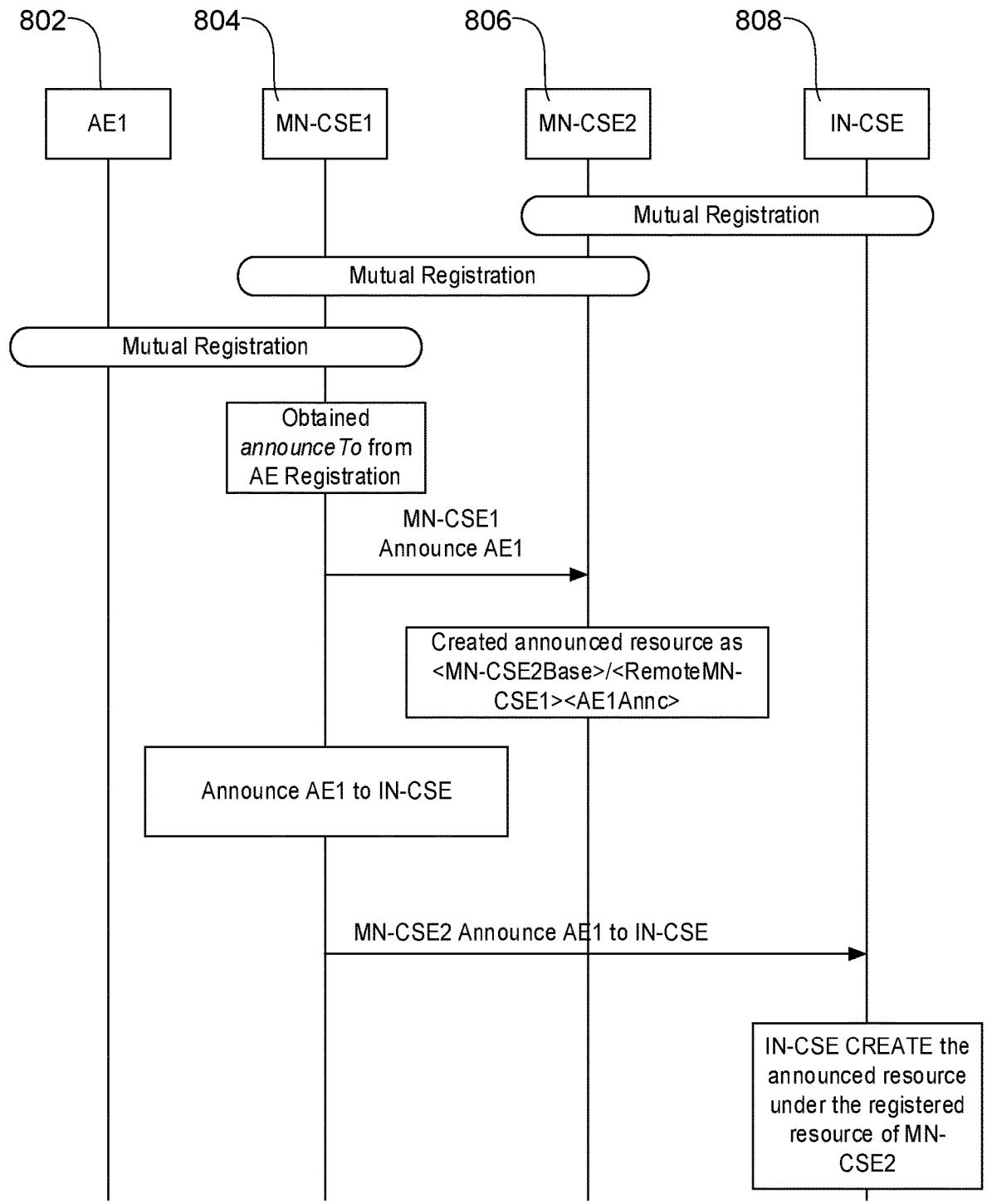
FIG. 8 is a diagram that illustrates an announced resource in a oneM2M Architecture.
Figure 9:
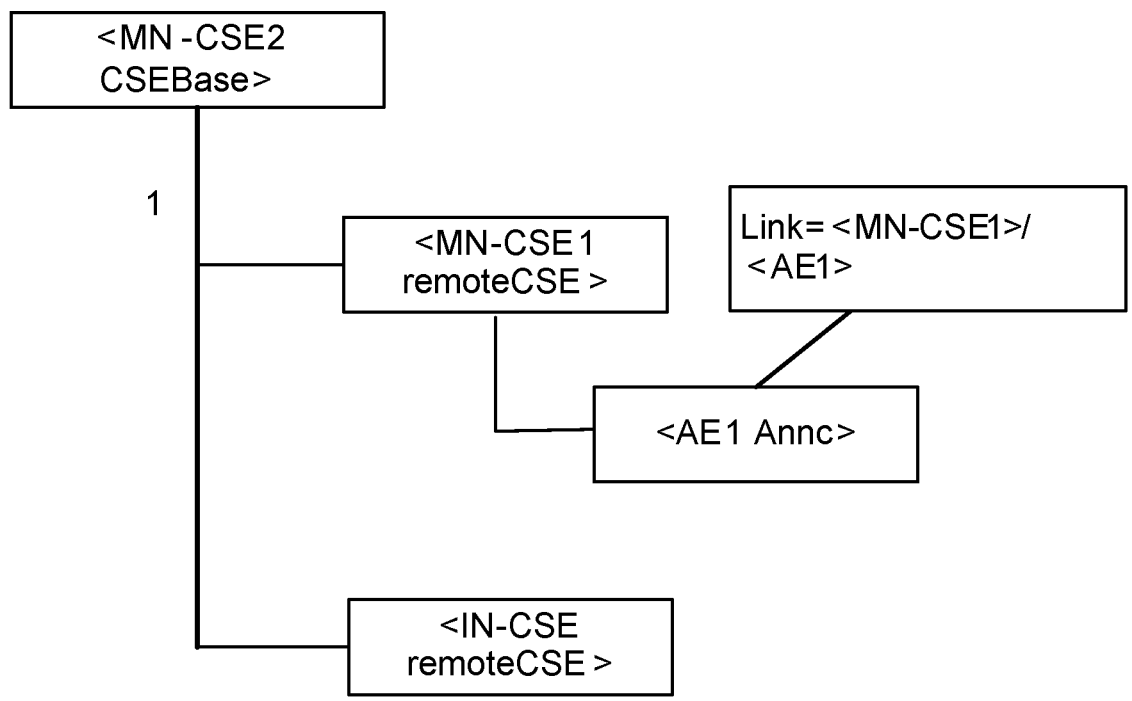
FIG. 9 is a diagram that illustrates an announced resource at a MN-CSE.
Figure 10:
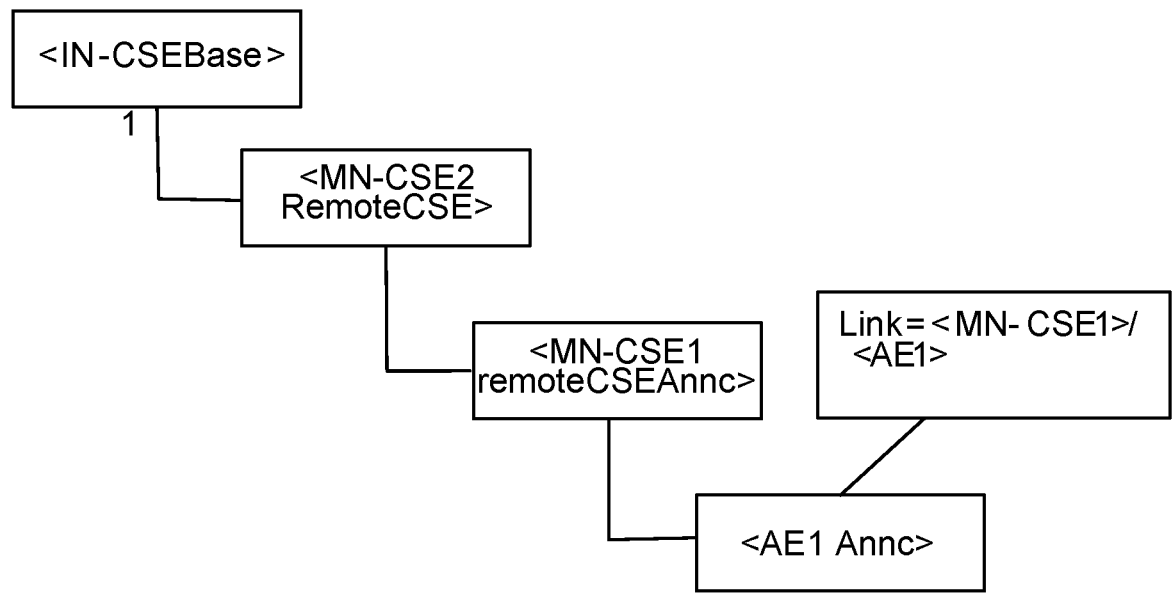
FIG. 10 is a diagram that illustrates an announced resource at IN-CSE.
Figure 11:
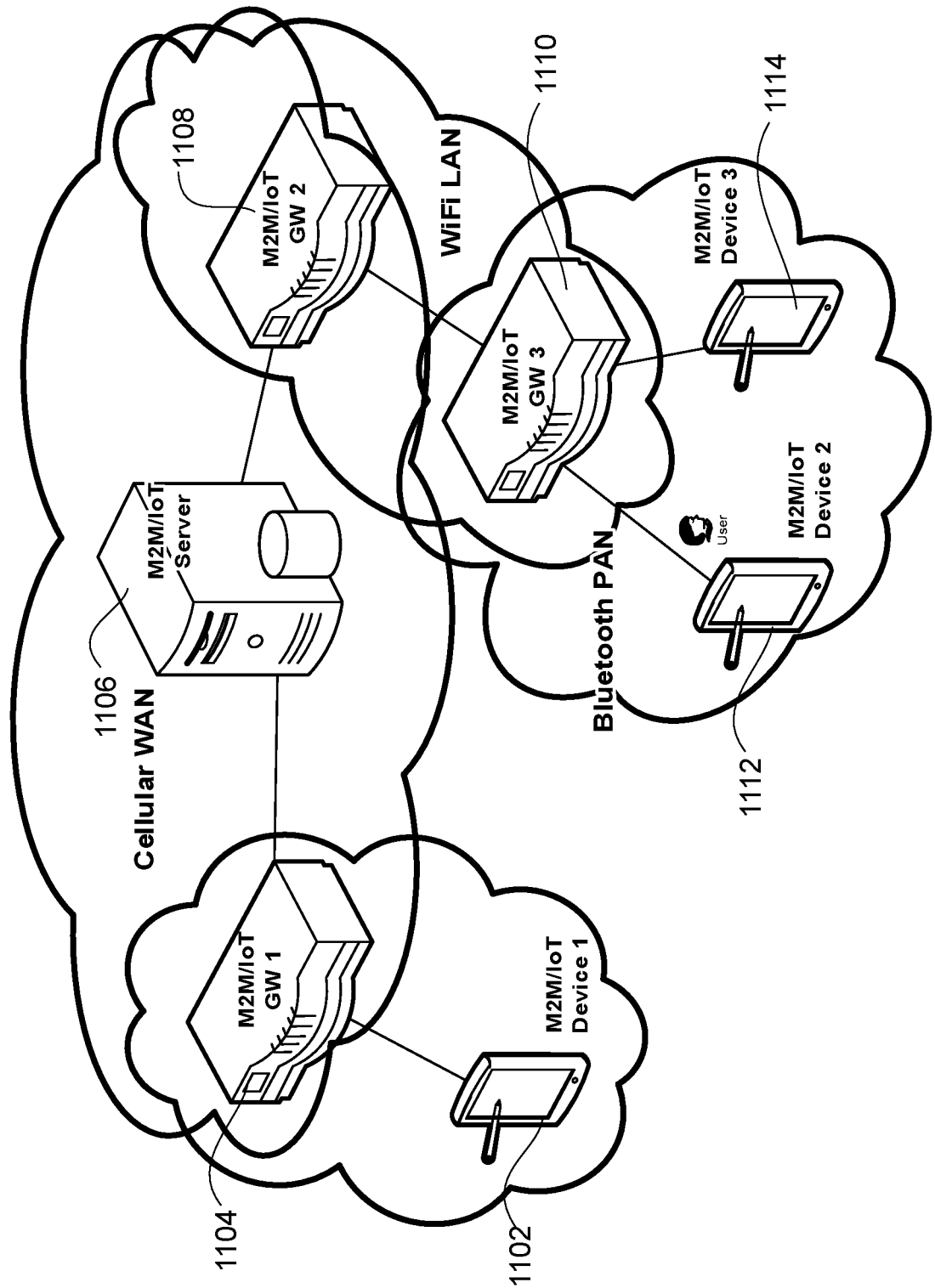
FIG. 11 is a diagram that illustrates an M2M/IoT Service Provider Network.

FIG. 11 shows a simple M2M/IoT network deployed by a service provider. M2M/IoT Gateway 1 1104 and M2M/IoT Gateway 2 1108 register directly to the M2M/IoT server 1106. M2M/IoT Gateway 3 1110 registers directly to M2M/IoT Gateway 2 1108. M2M/IoT Device 2 1112 and M2M/IoT Device 3 1114 register to M2M/IoT Gateway 3 1110. M2M/IoT Device 1 1106 registers to M2M/IoT Gateway 1 1104. Entities in the network communicate with each other, e.g. M2M/IoT Device 1 1106 may retrieve a resource from M2M/IoT Device 2 1112.

In existing M2M service layers, two SL entities, e.g. Entity A and B, can only exchange information if they have a registration relationship, i.e. Entity A registers to Entity B or Entity B registers to Entity A. Therefore, when an entity, e.g. Device 1 1102, sends a service layer message to another entity that does not have a registration relationship, e.g. Device 2 1112, Device 1 1102 sends the message to the entity that it registers to, e.g. Gateway 1 1104.

Figure 12:
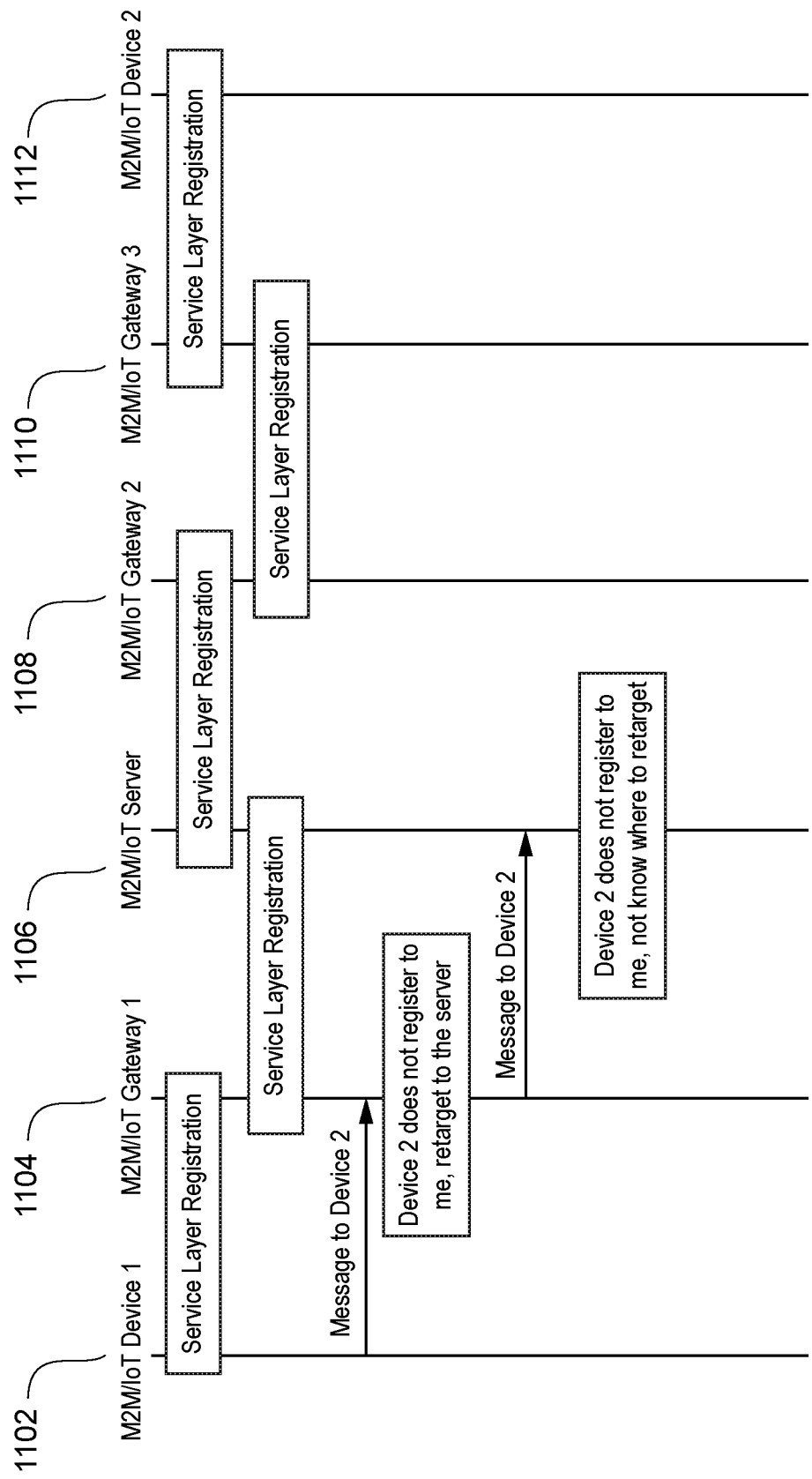
FIG. 12 is a diagram that illustrates an example in which a Device 1 cannot communicate with Device 2 in the Same Service Provider.

As illustrated in FIG. 12, when an entity, e.g. Gateway 1 1104, receives a message, if the destination entity of the message, e.g. Device 2 1112, does not have a registration relationship with it, it retargets the message to the entity that it registers to, e.g. the Server 1106. However, when the message arrives at the Server 1106, the Server 1106 does not know which entity to retarget the message to since the destination entity, e.g. Device 2 1112, does not have a registration relationship with the Server 1106 and the Server 1106 does not register to any other entity in the service provider domain. Therefore, the Server 1106 has to discard the message and two M2M service layer entities, e.g. Device 1 1106 and Device 2 1112 in FIG. 11 cannot communicate with each other at that point.

Described hereinafter are two methods to enable service layer message retargeting within a service provider. The first method proposes that service layer entities employ a retargeting table that stores the entity to retarget the message to in order to deliver the message to the destination. Specifically, when an entity receives a service layer message and the entity is not the destination entity of message, the entity looks up the retargeting table to find the service layer entity to retarget the message. Three procedures to manage the retargeting table at each entity are described.

The second method proposes that service layer entities, at least the Infrastructure Node (the Server) in a Service Provider, employ a retargeting chain table that stores a chain of entities that can retarget the message to the destination. When an entity receives a service layer message and is not the destination entity of the message, the entity will look up its retargeting chain table, and retarget the message to the first entity on the retargeting chain. Moreover, the entity inserts the remaining entities on the retargeting chain in the message. When an entity receives a service layer message and it is not the destination entity of the message, the entity checks the retargeting chain information contained in the message. If there is no retargeting chain information in the message, the entity will forward the message to the destination entity, if the destination entity has a registration relationship with it. Otherwise, the entity forwards the message to the entity it is registered to. If there is retargeting chain information in the message, the entity retargets the message to the first entity on the retargeting chain, and leaves the remaining entities on the retargeting chain in the message. Three procedures to manage the retargeting chain table at an entity are described.

In one embodiment, it is assumes there is only one Infrastructure Node, i.e. the Server, in a Service Provider. It may also be assumed that there is no registration chain loop in a Service Provider, i.e., a concatenation (registration chain) of multiple uni-directional registrations does not form a loop. In an example, two SL entities A and B cannot register with each other. In another example, there may be three SL entities A, B and C, where A registers to B, and B registers to C, then C cannot register to A. The described methods do not have the constriction that one SL entity can only register to at most one other entity as in oneMM-TS-0001 oneM2M Functional Architecture-V-2.6.0. However, to simplify the description of the method, in the example descriptions, one SL entity only registers to one SL entity. It is understood that these assumptions and implications are for ease of description only and are not to be limiting of the methods described herein.

Service Layer Retargeting Using Retargeting Tables

In a first aspect, a retargeting table is employed at each service layer entity. This table contains information about the next hop to be used for delivering a message to the destination. FIG. 11 illustrates an example scenario involving use of a retargeting table. Table 1 shows an example of a retargeting table at Gateway 2 1108 of FIG. 11. In this example, Gateway 2 1108 has registered to the Server 1106, Gateway 3 1110 has registered to Gateway 2 1108, and Device 2 1112 and Device 3 1114 have registered to Gateway 3 1110. When an SL entity receives a service layer message and the receiving SL entity is not the destination entity of message, the receiving SL entity will look up the retargeting table to find the service layer entity to retarget the message to. If the entity does not find the service layer entity in the retargeting table, it will retarget the message to the service layer entity it is registered to. As an example, when Gateway 2 1108 receives a message that is destined to Device 3 1114, it will retarget the message to Gateway 3 1110 based on the retargeting table shown in Table 1. As another example, when Gateway 2 1108 receives a message that is destined to Gateway 1 1104, it will retarget the message to the Server 1106 that it has registered to since it does not find a retargeting entity for Gateway 1 1104 in Table 1. Note that, an entry of the retargeting table may be removed when it expires at the expiration time.

TABLE 1

| SL Entries in Retargeting Table at Gateway 2 | | | |
|---|---|---|---|
| Index | Destination Entity ID | Retargeting Entity ID | Expiration time |
| 1 | Gateway 3 | Gateway 3 | 10 Jun. 2016 21:47:04 UTC |
| 2 | Device 2 | Gateway 3 | 10 Jun. 2016 21:47:04 UTC |
| 3 | Device 3 | Gateway 3 | 10 Jun. 2016 21:47:04 UTC |

Enhanced service layer registration management procedures to manage the retargeting table at each service layer entity are described below.

Enhanced Registration Method to Manage Retargeting Tables

Figure 13:
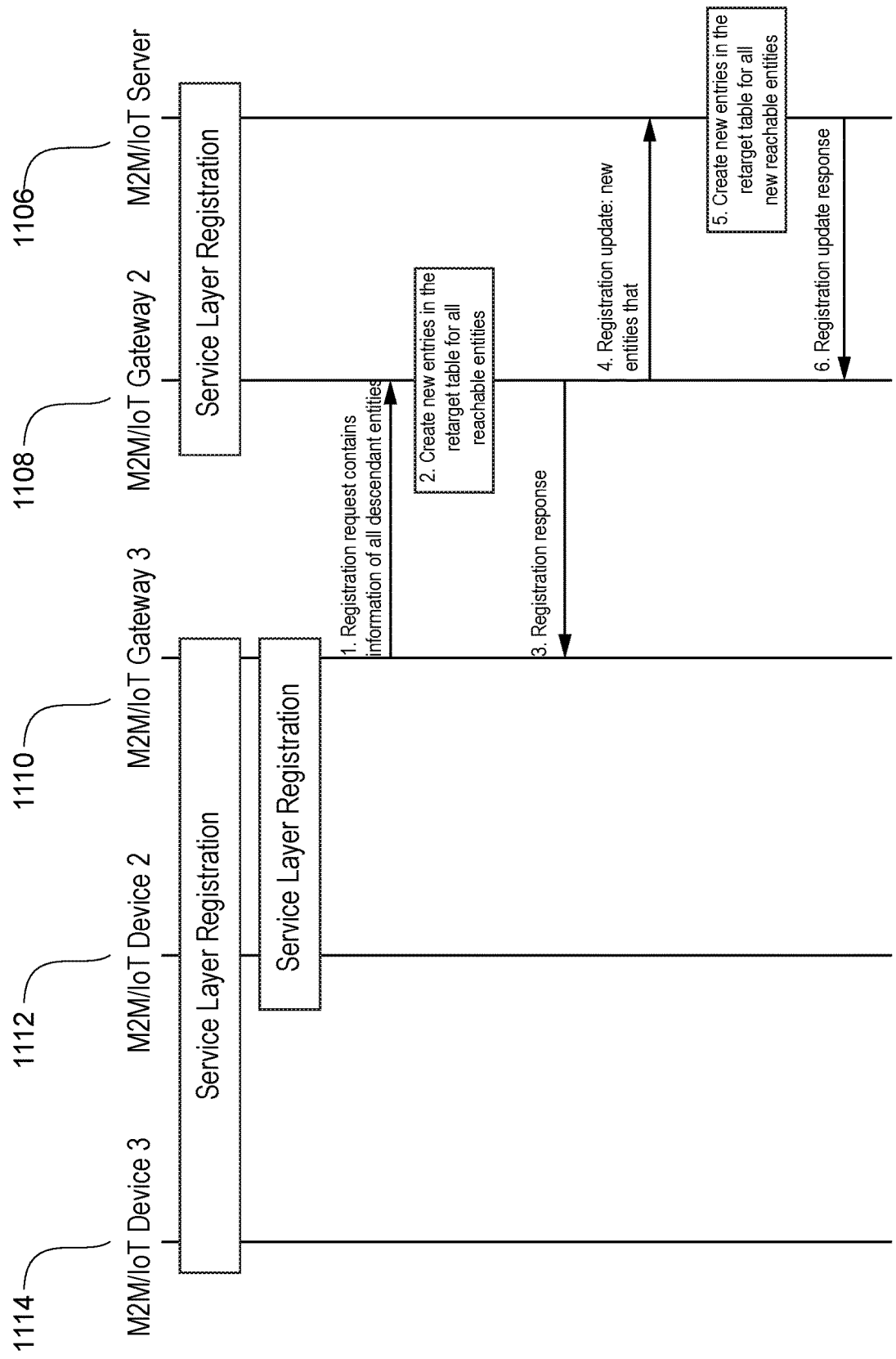
FIG. 13 is a diagram that illustrates an enhanced registration procedure to manage retargeting tables.

In this section, an enhanced service layer registration method is described to add entries in the retargeting table. One embodiment of the method is illustrated in FIG. 13. In order to describe the method, the SL entities depicted in FIG. 11 are used as an example. In the figure, Gateway 2 1108 has registered to the Server 1106; Device 2 1112 and Device 3 1114 have registered to Gateway 3 1110, then Gateway 3 1110 starts registering to Gateway 2 1108.

In Step 1 of FIG. 13, the Registree entity, e.g. Gateway 3 1110, sends a registration request message to the Registrar Entity, e.g. Gateway 2 1108. The registration request message contains the ID of all descendant entities that can be retargeted via Gateway 3 1110, e.g. Device 2 1112 and Device 3 1114, and their expiration time as listed in Table 2. Note that, this information can also be sent via separate messages, e.g. a registration update message such as the message listed in Table 4.

TABLE 2

New Fields in a Registration Request Message

| Field Name | Description |
| --- | --- |
| Descendant Entity 1 | The name or ID of the first entity that can be retargeted to via the registree entity, e.g. Device 2 |
| Expiration Time of the Descendant Entity 1 | The life time of the first entity, or the length of the time period that the entity can be reached, e.g. 10 Jun. 2016 21:47:04 UTC |
| Descendant Entity 2 | The name or ID of the second entity that can be retargeted to via the registree entity, e.g. Device 3 |
| Expiration Time of the Descendant Entity 2 | The life time of the second entity, or the length of the time period that the entity can be reached, e.g. 10 Jun. 2016 21:47:04 UTC |
| ... | ... |
| Descendant Entity n | The name or ID of the n'th entity that can be retargeted to via the registree entity |
| Expiration Time of the Descendant Entity n | The life time of the last entity, or the length of the time period that the entity can be reached |

In Step 2 of FIG. 13, after receiving the message, Gateway 2 1108 adds three new entries in its retargeting tables as shown in Table 3. If Gateway 2 1108 has registered to another service layer entity, e.g. the Server 1106, Gateway 2 1108 notifies the Server 1106 of all new entities that can be retargeted via Gateway 2 1108.

TABLE 3

New Entries in Retargeting Table at M2M/IoT Gateway 2

| Index | Destination Entity ID | Retargeting Entity ID | Expiration time |
| --- | --- | --- | --- |
| 1 | Gateway 3 | Gateway 3 | 10 Jun. 2016 21:47:04 UTC |
| 2 | Device 2 | Gateway 3 | 10 June 2016 21:47:04 UTC |
| 3 | Device 3 | Gateway 3 | 10 Jun. 2016 21:47:04 UTC |

In Step 3 of FIG. 13, Gateway 2 1108 sends the registration response to Gateway 3 1110.

In Step 4 of FIG. 13, Gateway 2 1108 sends a registration update message to the entity it has registered to, e.g. the M2M/IoT Server 1106. The registration update message contains the ID of all new entities that can be retargeted via Gateway 2 1108, e.g. Gateway 3 1110, Device 2 1112 and Device 3 1114 and their expiration time as listed in Table 4.

TABLE 4

New Fields in a Registration Update Message

| Field Name | Description |
| --- | --- |
| Add new entries | Indicate the receiver to add new entries in the retargeting table. |
| Descendant Entity 1 | The name or ID of the first entity, e.g. Gateway 3, which can be retargeted to via the sender, e.g. Gateway 2 |
| Expiration Time of the Descendant Entity 1 | The life time of the first entity, or the length of the time period that the entity can be reached, e.g. 10 Jun. 2016 21:47:04 UTC |
| Descendant Entity 2 | The name or ID of the second entity, e.g. Device 2, which can be retargeted to via the sender, e.g. Gateway 2 |
| Expiration Time of the Descendant Entity 2 | The life time of the second entity, or the length of the time period that the entity can be reached, e.g. 10 Jun. 2016 21:47:04 UTC |
| ... | ... |
| Descendant Entity n | The name or ID of the last entity, e.g. Device 3, which can be retargeted to via the sender, e.g. Gateway 2 |
| Expiration Time of the Descendant Entity n | The life time of the last entity, or the length of the time period that the entity can be reached, e.g. 10 Jun. 2016 21:47:04 UTC |

In Step 5 of FIG. 13, after receiving the message, the Server 1106 adds three new entries, i.e. entry with index 2, 3 and 4, in its retargeting tables as shown in Table 5. Note that the first entry in Table 5 is created when Gateway 2 1108 registered to the Server 1106. Since the Server 1106 does not register to any other entities, the Server 1106 does not notify all new entities can be retargeted through it to any other entities. In other words, the update procedure repeats up all the registration hierarchical layers of the SL deployment, and stops at the M2M server 1106.

TABLE 5

Retargeting Table at M2M/IoT Server after Adding New Entries

| Index | Destination Entity ID | Retargeting Entity ID | Expiration time |
| --- | --- | --- | --- |
| 1 | Gateway 2 | Gateway 2 | 10 Jun. 2016 21:47:04 UTC |
| 2 | Gateway 3 | Gateway 2 | 10 Jun. 2016 21:47:04 UTC |
| 3 | Device 2 | Gateway 2 | 10 Jun. 2016 21:47:04 UTC |
| 4 | Device 3 | Gateway 2 | 10 Jun. 2016 21:47:04 UTC |

In Step 6 of FIG. 13, the Server 1106 sends the registration update response to Gateway 2 1108.

Figure 39A:
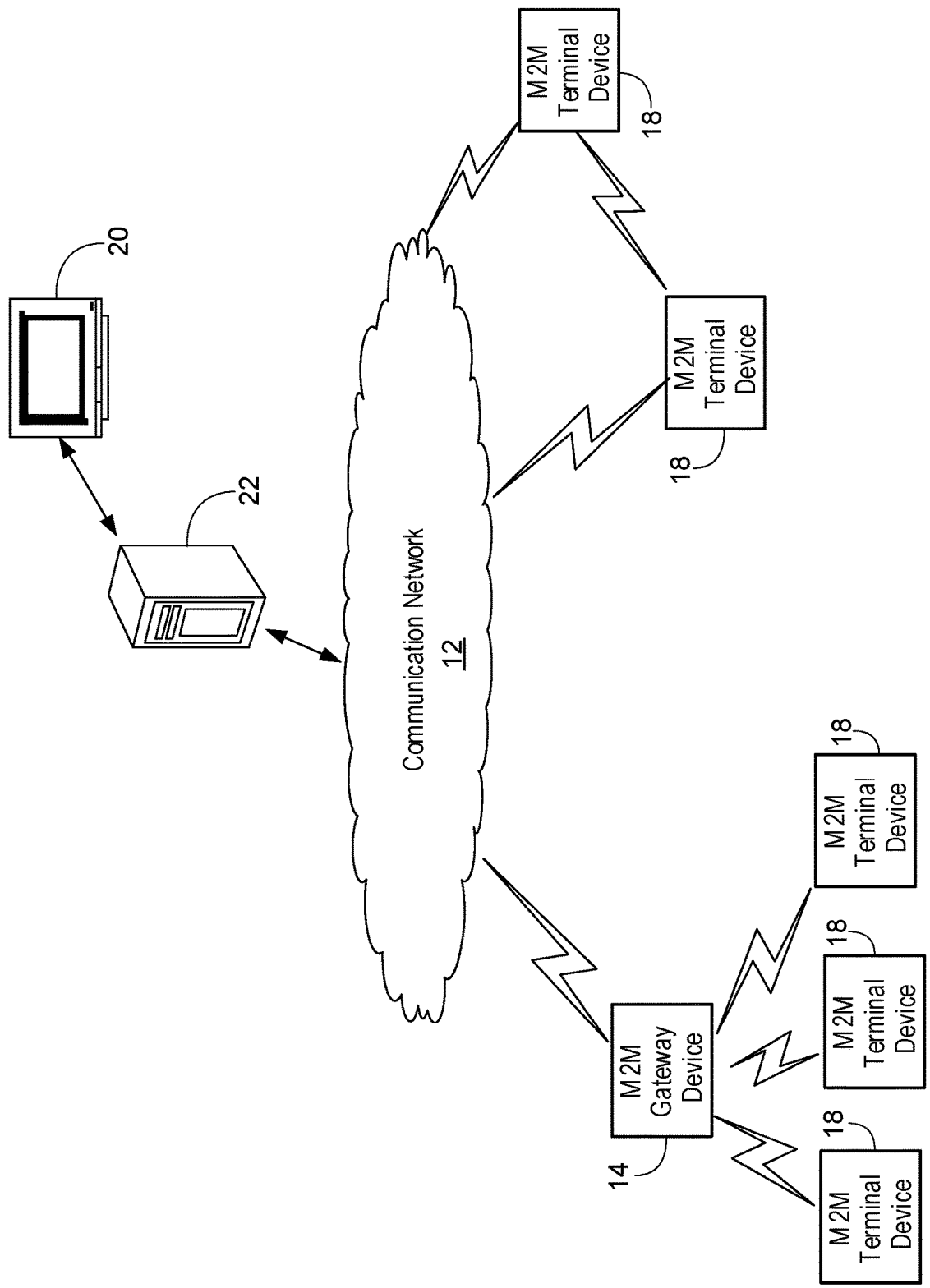
FIG. 39A is a diagram of a M2M/IoT/WoT communication system that includes a communication network.
Figure 39B:
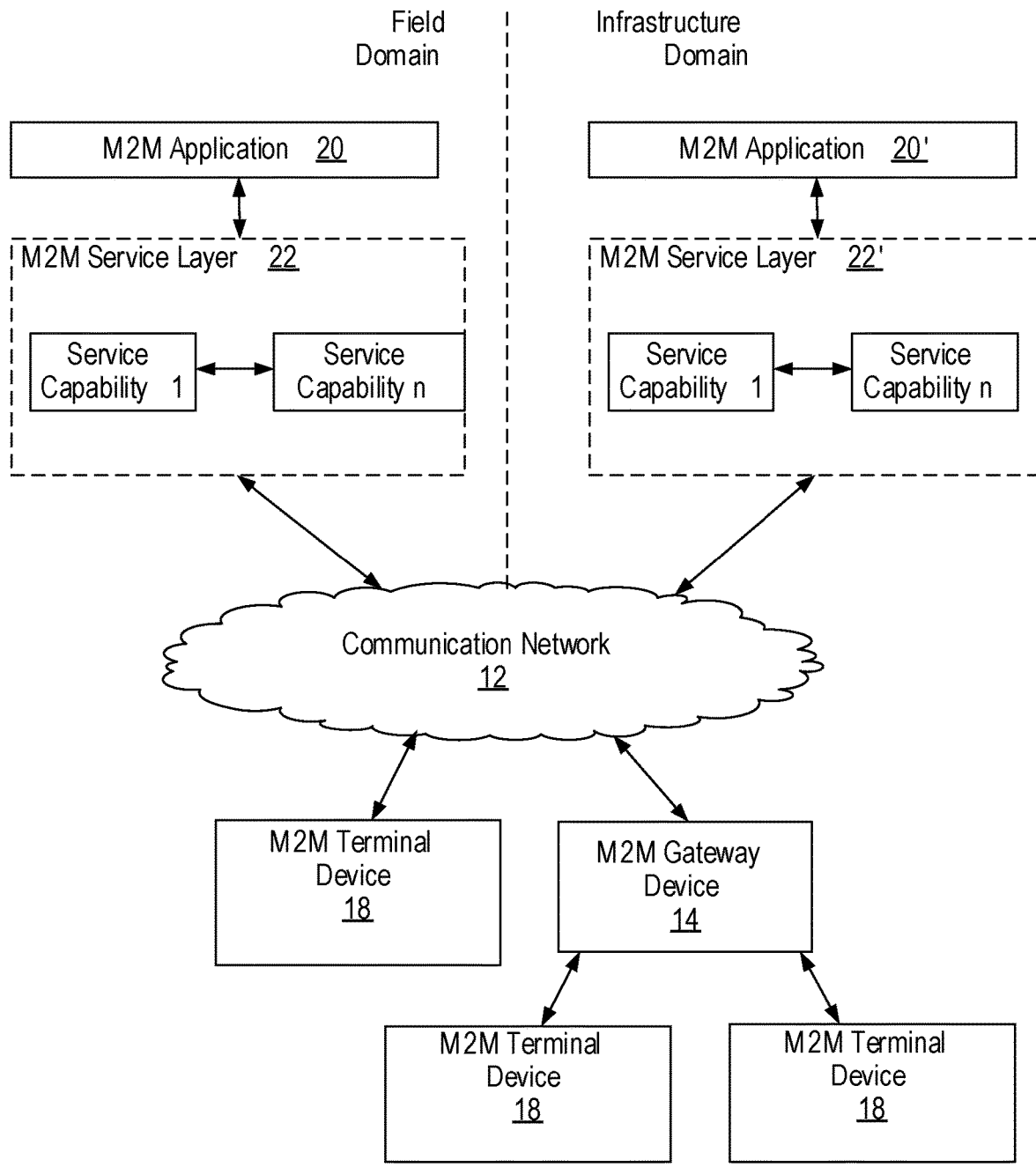
FIG. 39B is a diagram of an illustrated M2M service layer in the field domain that provides services for the M2M application, M2M gateway devices, and M2M terminal devices and the communication network.
Figure 39C:
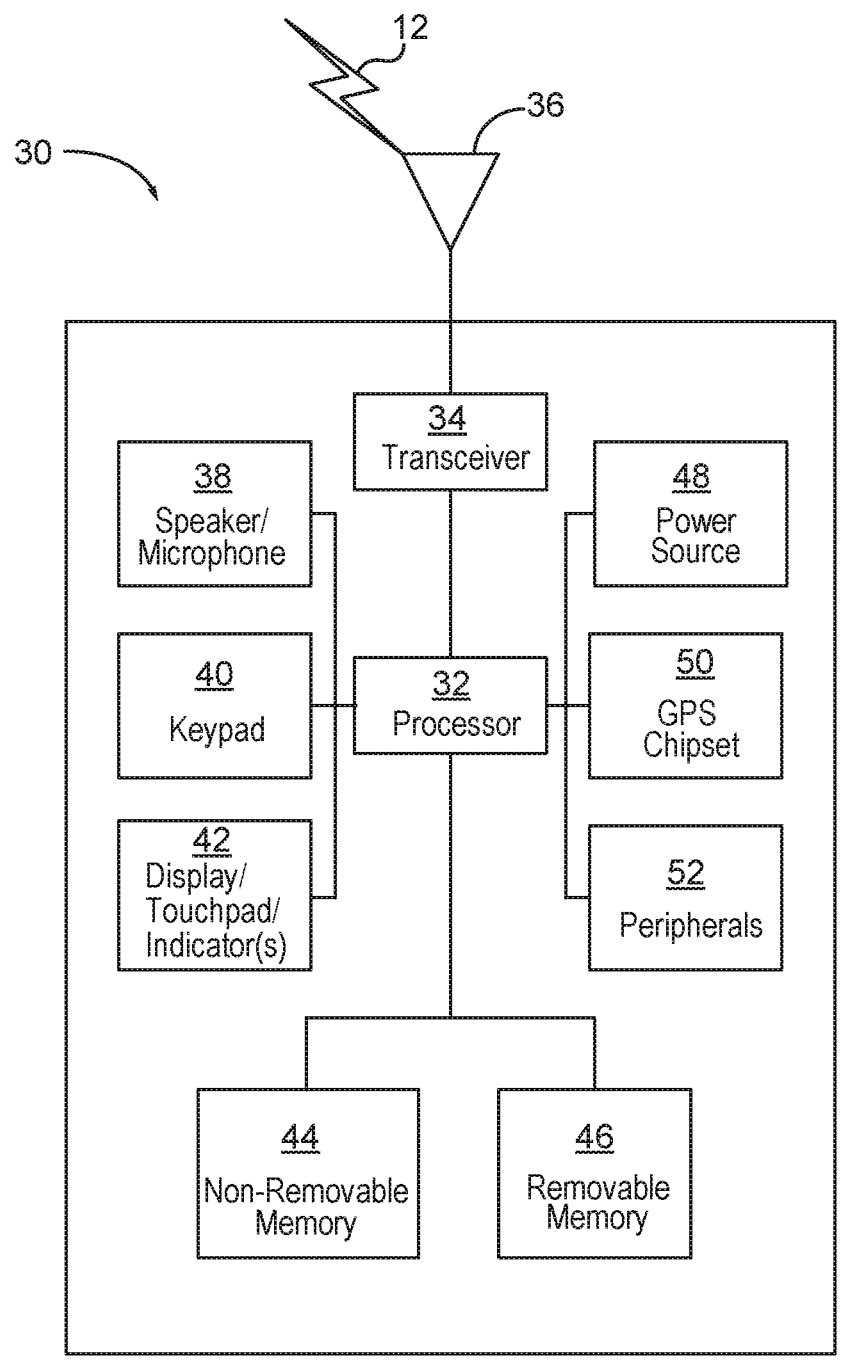
FIG. 39C is a diagram of an exemplary device that may be used to implement any of the network nodes, devices or apparatuses described herein.
Figure 39D:
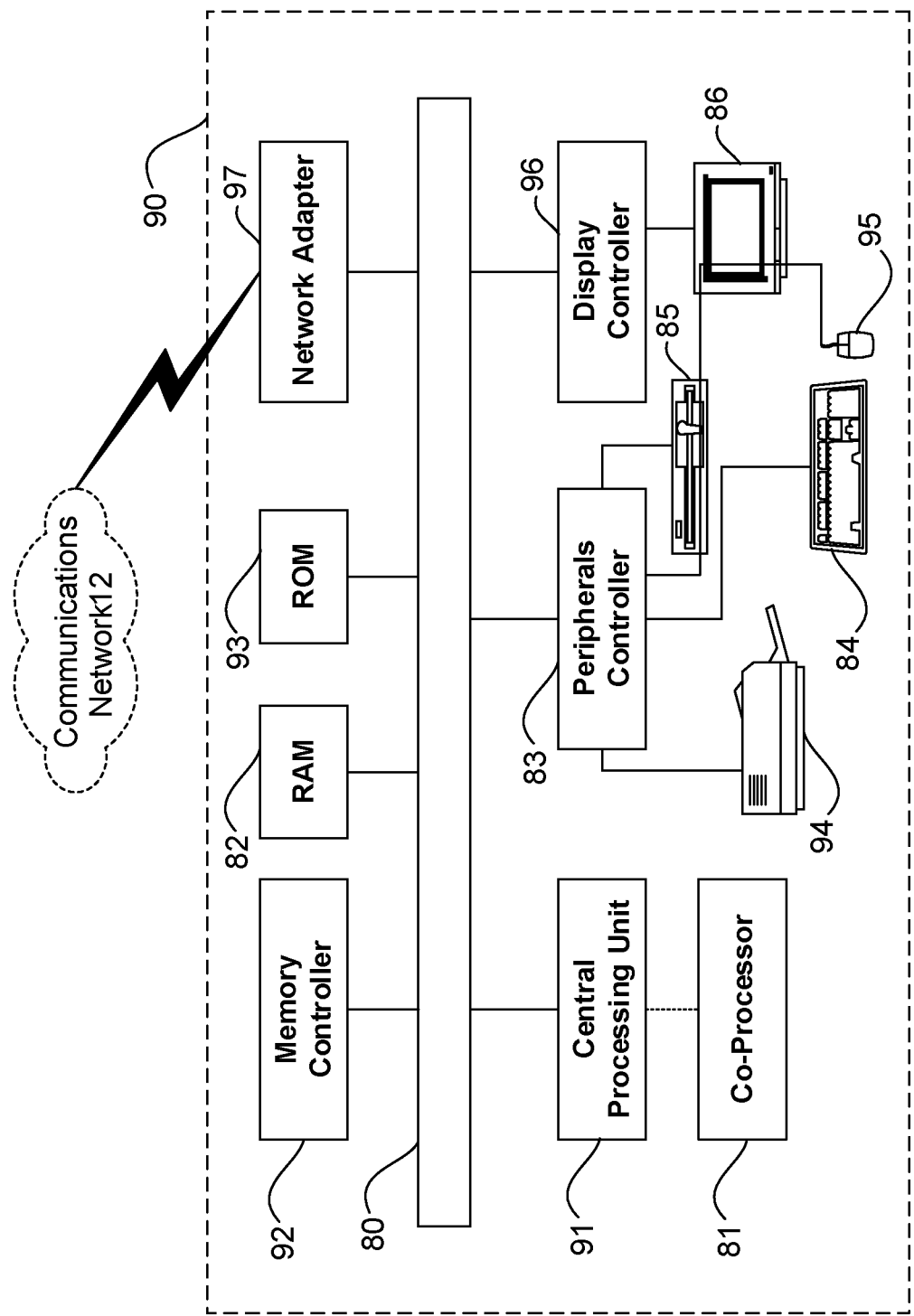
FIG. 39D is a block diagram of a computer system or server that may be used to implement any of the network nodes, devices or apparatuses described herein.

It is understood that the entities performing the steps illustrated in FIG. 13 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 13 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 13. It is also understood that the functionality illustrated in FIG. 13 may implemented as a set of virtualized network functions. The network functions may not necessarily communicate directly, rather, they may communicate via forwarding or routing function. It is also understood that any transmitting and receiving steps illustrated in FIG. 13 may be performed by communication circuitry of the apparatus under control of the processor of the apparatus and the computer-executable instructions (e.g., software) that it executes.

Enhanced De-Registration Method to Manage Retargeting Tables

Figure 14:
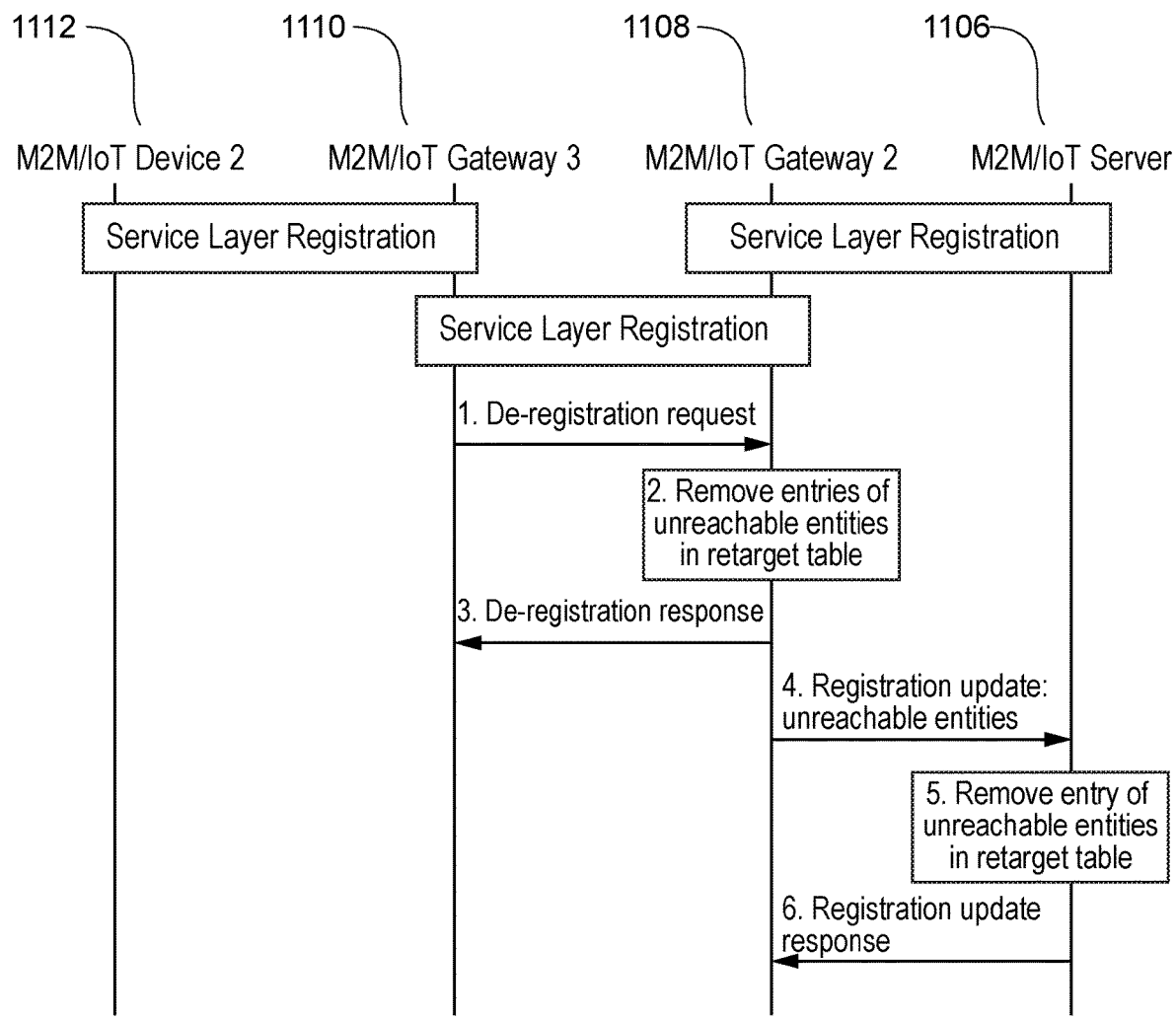
FIG. 14 is a diagram that illustrates an enhanced de-registration procedure to manage retargeting tables.

In this section, an enhanced service layer de-registration method to delete entries from the retargeting table when a SL entity de-registers from another SL entity is described. One embodiment of the method is illustrated in FIG. 14. Using the SL entities in FIG. 11, suppose that after Gateway 2 1108 has registered to the Server 1106, Gateway 3 1110 has registered to Gateway 2 1108, Device 2 1112 and Device 3 1114 have registered to Gateway 3 1110, Gateway 3 1110 intends to de-register from Gateway 2 1108 and may use the method illustrated in FIG. 14 to de-register from Gateway 2 1108.

In Step 1 of FIG. 14, Gateway 3 1110 sends a de-registration request message to Gateway 2 1108.

In Step 2 of FIG. 14, after receiving the message, Gateway 2 1108 removes all entries that the "Retargeting Entity ID" set to Gateway 3 1110, e.g. all entries listed in Table 3 will be removed. Those entries are shown again in Table 6.

TABLE 6

Entries to be Removed in Retargeting Table at M2M/IoT Gateway 2

| Index | Destination Entity ID | Retargeting Entity ID | Expiration time |
|---|---|---|---|
| 1 | Gateway 3 | Gateway 3 | 10 Jun. 2016 21:47:04 UTC |
| 2 | Device 2 | Gateway 3 | 10 Jun. 2016 21:47:04 UTC |
| 3 | Device 3 | Gateway 3 | 10 Jun. 2016 21:47:04 UTC |

In Step 3 of FIG. 14, Gateway 2 1108 sends the de-registration response to Gateway 3 1110.

In Step 4 of FIG. 14, Gateway 2 1108 sends a registration update message to the entity it has registered to, e.g. the M2M/IoT Server 1106. The registration update message contains the ID of all entities that cannot be retargeted via Gateway 2 1108, e.g. Gateway 3 1110, Device 2 1112 and Device 3 1114 as listed in Table 7.

TABLE 7

New Fields in a Registration Update Message

| Field Name | Description |
|---|---|
| Delete entries | Indicate the receiver to delete entries in the retargeting table. |
| Descendant Entity 1 to delete | The name or ID of the first entity, e.g. Gateway 3, which cannot be retargeted via the sender, e.g. Gateway 2 |
| Descendant Entity 2 to delete | The name or ID of the second entity, e.g. Device 2, which cannot be retargeted via the sender, e.g. Gateway 2 |
| Descendant Entity n to delete | The name or ID of the last entity, e.g. Device 3, which cannot be retargeted via the sender, e.g. Gateway 2 |

In Step 5 of FIG. 14, after receiving the message, the server 1106 deletes three entries, i.e. the entries with index 2, 3 and 4, in its retargeting tables as shown in Table 8.

TABLE 8

Entries to be Removed in Retargeting Table at M2M/IoT Server

| Index | Entity ID | Retargeting Entity ID | Expiration time |
|---|---|---|---|
| 2 | Gateway 3 | Gateway 2 | 10 Jun. 2016 21:47:04 UTC |
| 3 | Device 2 | Gateway 2 | 10 Jun. 2016 21:47:04 UTC |
| 4 | Device 3 | Gateway 2 | 10 Jun. 2016 21:47:04 UTC |

In Step 6 of FIG. 14, the Server 1106 sends the registration update response to Gateway 2 1108.

It is understood that the entities performing the steps illustrated in FIG. 14 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 13 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 14. It is also understood that the functionality illustrated in FIG. 14 may implemented as a set of virtualized network functions. The network functions may not necessarily communicate directly, rather, they may communicate via forwarding or routing function. It is also understood that any transmitting and receiving steps illustrated in FIG. 14 may be performed by communication circuitry of the apparatus under control of the processor of the apparatus and the computer-executable instructions (e.g., software) that it executes.

Enhanced Registration Update Method to Manage Retargeting Tables

Figure 15:
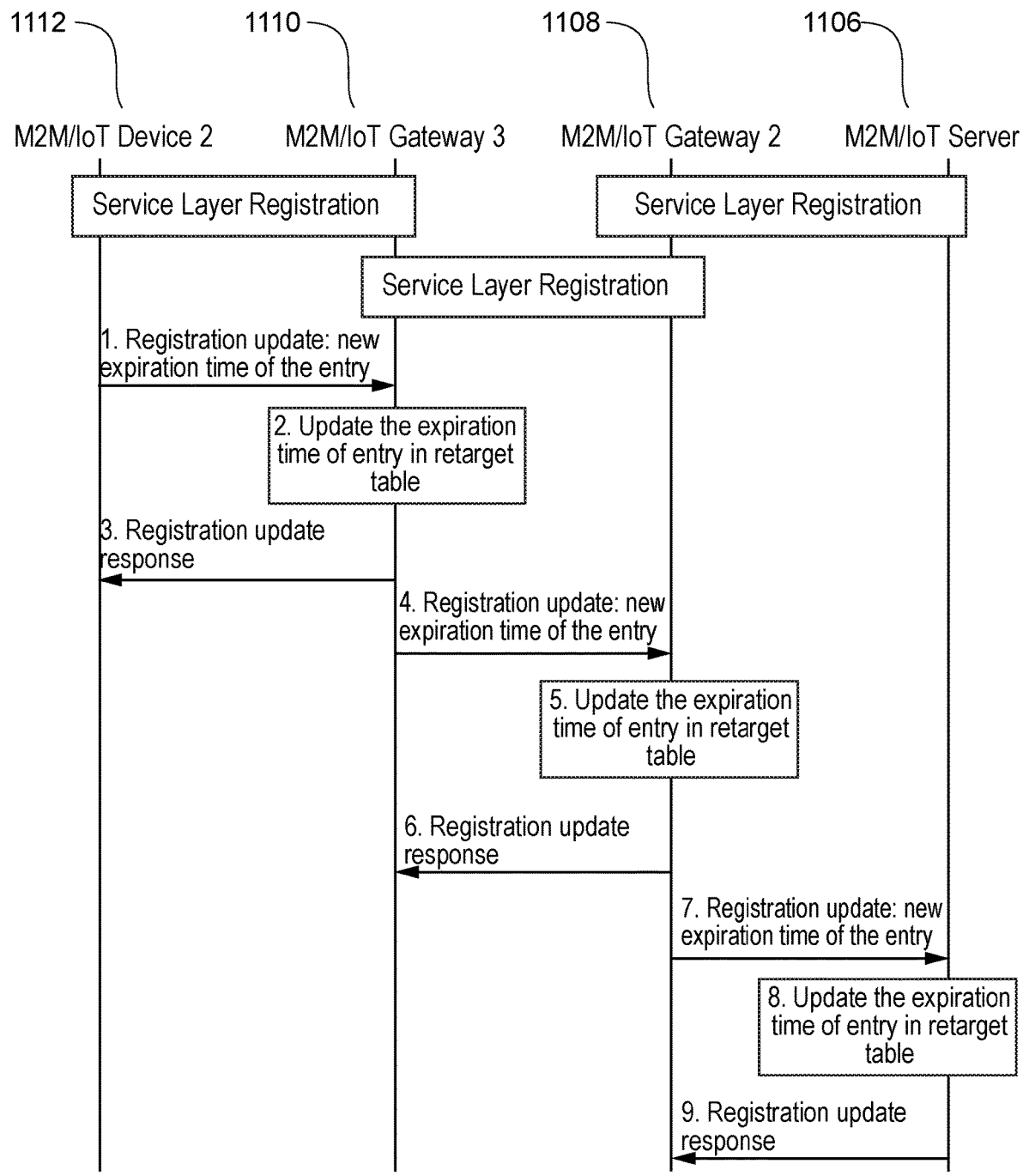
FIG. 15 is a diagram that illustrates an enhanced registration update procedure to update retargeting tables.

In this section, an enhanced service layer registration update method to update entries in a retargeting table is described. FIG. 15 illustrates one embodiment of the method. For purposes of illustration, suppose an entity, e.g. Entity A, may be required to send a registration update message to the entity it registered to, e.g. Entity B, before its registration expires at Entity B. As an example, in the SL entities in FIG. 11, Gateway 2 1108 has registered to the Server 1106, Gateway 3 1110 has registered to Gateway 2 1108, Device 2 1112 and Device 3 1114 have registered to Gateway 3 1110. Device 2 1112 may be required to send a registration update message to Gateway 3 1110, before its registration expires at Gateway 3 1110. The method illustrated in FIG. 15 may be used for this purpose.

In Step 1 of FIG. 15, Device 2 1112 sends a registration update message to Gateway 3 1110. The registration update message contains the new expiration time of the entity as listed in Table 9.

TABLE 9

New Fields in a Registration Update Message

| Field Name | Description |
|---|---|
| Descendant Entity | The name or ID of the entity, e.g. Device 2, which can be retargeted via the sender. |

TABLE 9-continued

New Fields in a Registration Update Message

| Field Name | Description |
|---|---|
| Expiration Time of the Descendant Entity | The life time of the entity, or the length of the time period that the entity can be reached, e.g. 10 Jun. 2016 22:46:04 UTC |

In Step 2 of FIG. 15, after receiving the message, Gateway 3 1110 updates the expiration time of the entry associated with Device 2 1112 as shown in Table 10.

TABLE 10

Entries in Retargeting Table at M2M/IoT Gateway 3 after the Receiving Registration Update Message from Device 2

| Index | Entity ID | Retargeting Entity ID | Expiration time |
|---|---|---|---|
| 1 | Device 2 | Device 2 | 10 Jun. 2016 22:46:04 UTC |
| 2 | Device 3 | Device 3 | 10 Jun. 2016 21:47:04 UTC |

In Step 3 of FIG. 15, Gateway 3 1110 sends the registration update response to Device 2 1112.

In Step 4 of FIG. 15, Gateway 3 1110 sends a registration update message that contains information in Table 9 to the entity it has registered to, e.g. Gateway 2 1108.

In Step 5 of FIG. 15, after receiving the message, Gateway 2 1108 updates the expiration time of the entry associated with Device 2 1112 as shown in Table 11.

TABLE 11

Entries in Retargeting Table at M2M/IoT Gateway 2 after the Receiving Registration Update Message from Gateway 3

| Index | Entity ID | Retargeting Entity ID | Expiration time |
|---|---|---|---|
| 1 | Gateway 3 | Gateway 3 | 10 Jun. 2016 21:47:04 UTC |
| 2 | Device 2 | Gateway 3 | 10 Jun. 2016 22:46:04 UTC |
| 3 | Device 3 | Gateway 3 | 10 Jun. 2016 21:47:04 UTC |

In Step 6 of FIG. 15, the Gateway 2 1108 sends the registration update response to Gateway 3 1110.

In Step 7 of FIG. 15, Gateway 2 1108 sends a registration update message that contains information in Table 9 to the entity it has registered to, e.g. the Server 1106.

In Step 8 of FIG. 15, after receiving the message, the Server 1106 updates the expiration time of the entry associated with Device 2 1112 as shown in Table 10.

TABLE 12

Entries in Retargeting Table at M2M/IoT Server after the Receiving Registration Update Message from Gateway 2

| Index | Entity ID | Retargeting Entity ID | Expiration time |
|---|---|---|---|
| 1 | Gateway 2 | Gateway 2 | 10 Jun. 2016 21:47:04 UTC |
| 2 | Gateway 3 | Gateway 2 | 10 Jun. 2016 21:47:04 UTC |

TABLE 12-continued

Entries in Retargeting Table at M2M/IoT Server after the Receiving Registration Update Message from Gateway 2

| Index | Entity ID | Retargeting Entity ID | Expiration time |
|---|---|---|---|
| 3 | Device 2 | Gateway 2 | 10 Jun. 2016 22:46:04 UTC |
| 4 | Device 3 | Gateway 2 | 10 Jun. 2016 21:47:04 UTC |

In Step 9 of FIG. 15, the Server 1106 sends the registration update response to Gateway 2 1108.

It is understood that the entities performing the steps illustrated in FIG. 15 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 15 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 15. It is also understood that the functionality illustrated in FIG. 15 may implemented as a set of virtualized network functions. The network functions may not necessarily communicate directly, rather, they may communicate via forwarding or routing function. It is also understood that any transmitting and receiving steps illustrated in FIG. 15 may be performed by communication circuitry of the apparatus under control of the processor of the apparatus and the computer-executable instructions (e.g., software) that it executes.

Service Layer Retargeting Using a Retargeting Chain Table

In this section, a method is described where entities employ a retargeting chain table. This table contains information about a chain of entities the message should follow to reach its destination. This table may be stored at the Infrastructure Node, e.g. the Server 1106, in a Service Provider. In this case, other SL entities are not required to employ a retargeting chain table or a retargeting table. When an SL entity receives a service layer message and is not the destination entity of the message, the entity may look up its retargeting chain table if it has one, and retarget the message to the first entity on the retargeting chain. Moreover, the entity inserts a list of SL entities that make up the retargeting chain into the message. This sorted list provides guidance on how the message is to be retargeted.

Table 13 shows an example of one embodiment of a retargeting chain table that may reside at the Server 1106 in the scenario shown in FIG. 11. In this example, Gateway 1 1104 and Gateway 2 1108 have registered to the Server 1106, Device 1 1106 registered to Gateway 1 1104, Gateway 3 1110 registered to Gateway 2 1108, and Device 2 1112 and Device 3 1114 have registered to Gateway 3 1110. When the Server 1106 receives a service layer message and is not the destination entity of the message, the server 1106 may look up its retargeting chain table, and retarget the message to the first entity on the retargeting chain. Moreover, the Server 1106 may also insert a list of entities that make up the retargeting chain into the message. For example, when the Server 1106 receives a service layer message destined to Device 2 1112, the Server 1106 looks up its retargeting chain table as shown in Table 13, then retargets the message to Gateway 2 1108 that is the first entity on the retargeting chain. The Server 1106 also inserts the list of remaining entities on the retargeting chain, e.g. Gateway 3 1110, in the message.

Further according to the present embodiment, when an entity receives a service layer message and is not the destination entity of the message, the entity checks the retargeting chain information contained in the message. If there is no retargeting chain information in the message, the entity will forward the message if the destination has a registration relationship with it or forward the message to the entity it registered to otherwise. If there is retargeting chain information in the message, the entity retargets the message to the first entity on the retargeting chain. The entity removes the first entity on the retargeting chain and leaves the remaining entities on the retargeting chain in the message. For example, when Gateway 2 1108 receives a service layer message destined to Device 2 1112 from the Server 1106. Gateway 2 1108 retargets the message to the first entity in the retargeting chain, which is Gateway 3 1110. As another example, when Gateway 2 1108 receives a service layer message destined to Device 1 1106 from Gateway 3 1110, it retargets the message to the Server 1106 if there is no retargeting chain information in the message.

TABLE 13

Retargeting Chain Table at M2M/IoT Server

| Index | Entity ID | Entity ID on Retargeting Chain | Expiration time |
|---|---|---|---|
| 1 | Device 1 | Gateway1 | 10 Jun. 2016 21:37:04 UTC |
| 2 | Gateway 3 | Gateway 2 | 10 Jun. 2016 21:47:04 UTC |
| 3 | Device 2 | Gateway 2, Gateway3 | 10 Jun. 2016 21:47:04 UTC |
| 4 | Device 3 | Gateway 2, Gateway3 | 10 Jun. 2016 21:47:04 UTC |

Enhanced service layer registration management methods are also described which may be used to manage the retargeting chain table, for example at the M2M/IoT Server 1106. Each entity in the network may be required to report to the M2M/IoT Server 1106 about all entities that register to it. The methods described herein may be used to manage the retargeting chain table at any SL entity.

Enhanced Registration Method to Manage the Retargeting Chain Table

Figure 16:
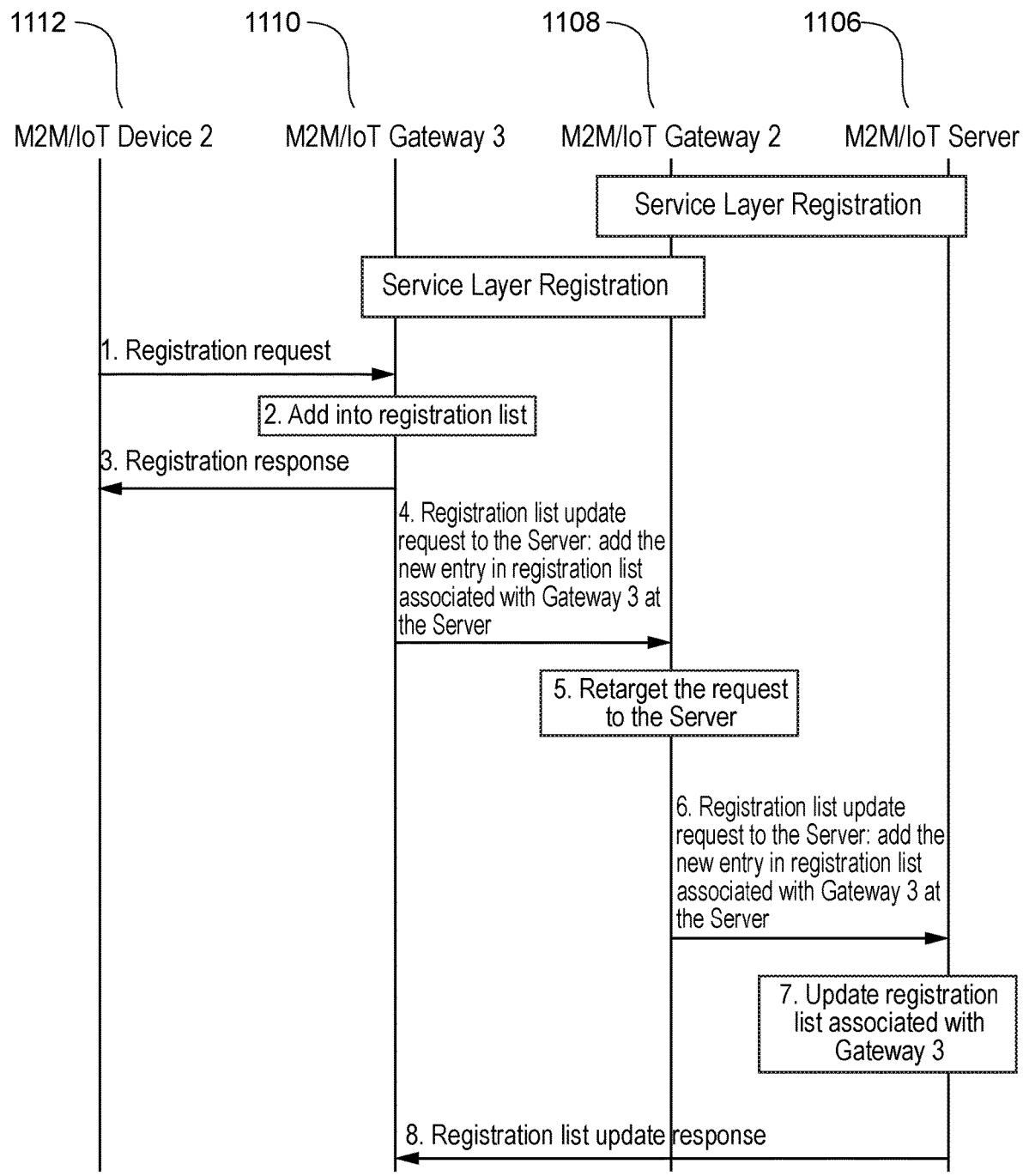
FIG. 16 is a diagram that illustrates an enhanced registration procedure to manage retargeting chain tables.

In this section, an enhanced service layer registration method to enable service layer retargeting is described. FIG. 16 illustrates one embodiment of the method. For purposes of illustration, suppose that in the SL entities of FIG. 11, Gateway 2 1108 has registered to the Server 1106, Gateway 3 1110 registers to Gateway 2 1108 using the same procedures, and then Device 2 1112 registers to Gateway 3 1110 using the procedure of FIG. 16.

In Step 1 of FIG. 16, the Registree entity, e.g. Device 2 1112, sends a registration request message to the Registrar Entity, e.g. Gateway3. The Registree entity also requests the name or ID of the Server 1106 in the message.

In step 2 of FIG. 16, after receiving the message, Gateway 3 1110 adds Device 2 1112 into its registration list, which stores all entries that have registered to Gateway 3 1110.

In Step 3 of FIG. 16, Gateway 3 1110 sends the registration response to Device 2 1112. The registration response message contains the name or ID of the Server 1106 in the message. Device 2 1112 stores this information locally.

In Step 4 of FIG. 16, Gateway 3 1110 sends a registration list update message to the Server 1106. The registration list update message contains the ID and expiration time of all SL new entities that register to Gateway 3 1110, e.g. Device 2 1112 as listed in Table 14. In order to send the message to the Server 1106, the name or ID of the Server 1106 can be provided provisionally. A SL entity obtain these information during the registration, i.e. in step 3. Since the Server 1106 does not have a registration relationship with Gateway 3 1110, Gateway 3 1110 sends the message to its Registrar Entity, i.e. Gateway 2 1108.

TABLE 14

New Fields in a Registration List Update Message

| Field Name | Description |
|---|---|
| Add new entries | Indicate the receiver to add new entries in the registration list. |
| Registered Entity 1 | The name or ID of the first entity that newly registers to the receiver but not reported to the Server since last update message, e.g. Device 2 in FIG. 16. |
| Expiration Time of the Registered Entity 1 | The life time of the first entity, or the length of the time period that the entity can be reached |
| Registered Entity 2 | The name or ID of the second entity that newly registers to the receiver but not reported to the Server since last update message |
| Expiration Time of the Registered Entity 2 | The life time of the second entity, or the length of the time period that the entity can be reached |
| . . . | . . . |
| Registered Entity n | The name or ID of the last entity that newly registers to the receiver but not reported to the Server since last update message |
| Expiration Time of the Registered Entity n | The life time of the last entity, or the length of the time period that the entity can be reached |

In Step 5 of FIG. 16, after receiving the message, Gateway 2 1108 finds that it is not the destination entity of the message. Since Gateway 2 1108 registers to the Server 1106, it retargets the message to the Server 1106 directly.

In Step 6 of FIG. 16, after receiving the message, the server 1106 adds all new entries associated with entities in the message to the combined registration list table as shown in Table 15. The table stores all registration relationship reported from a SL entity. Based on the new entries generated in the combined registration list table, new entries will be added in the retargeting chain table. For example, a new entry associated with Device 2 1112, i.e. entry with index 3, is added in the retargeting chain table as shown in Table 16. To determine the entities on the retargeting chain associated with Device 2 1112, the server 1106 first inserts the registrar entity of Device 2 1112, i.e. Gateway 3 1110, then inserts the registrar entity of Gateway 3 1110, i.e. Gateway 2 1108. Since the entity that Gateway 2 1108 registered is the Server 1106, the Server 1106 finishes inserting the entry associated with Device 2 1112 in the regarding chain table.

TABLE 15

Combined Registration List Table at M2M/IoT Server after Adding New Entries

| Index | Entity ID | Registered Entity ID | Expiration time |
|---|---|---|---|
| 1 | Gateway 2 | Gateway 3 | 10 Jun. 2016 21:37:04 UTC |
| 2 | Gateway 3 | Device 3 | 10 Jun. 2016 21:39:04 UTC |
| 3 | Gateway 3 | Device 2 | 10 Jun. 2016 21:47:04 UTC |

TABLE 16

Retargeting Chain Table at M2M/IoT Server

| Index | Destination Entity ID | Entity ID on Retargeting Chain |
|---|---|---|
| 1 | Device 1 | Gateway1 |
| 2 | Gateway 3 | Gateway 2 |
| 3 | Device 2 | Gateway 2, Gateway3 |
| 4 | Device 3 | Gateway 2, Gateway3 |

In Step 6 and 7 of FIG. 16, the Server 1106 sends the registration list update response to Gateway 3 1110. Since the retargeting chain for Gateway 3 1110 is Gateway 2 1108 as shown in Table 16, the Server 1106 sends to the message to Gateway 2 1108 and Gateway 2 1108 retargets the message to Gateway 3 1110.

It is understood that the entities performing the steps illustrated in FIG. 16 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 16 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 16. It is also understood that the functionality illustrated in FIG. 16 may implemented as a set of virtualized network functions. The network functions may not necessarily communicate directly, rather, they may communicate via forwarding or routing function. It is also understood that any transmitting and receiving steps illustrated in FIG. 16 may be performed by communication circuitry of the apparatus under control of the processor of the apparatus and the computer-executable instructions (e.g., software) that it executes.

Enhanced De-Registration Method to Manage the Retargeting Chain Table

Figure 17:
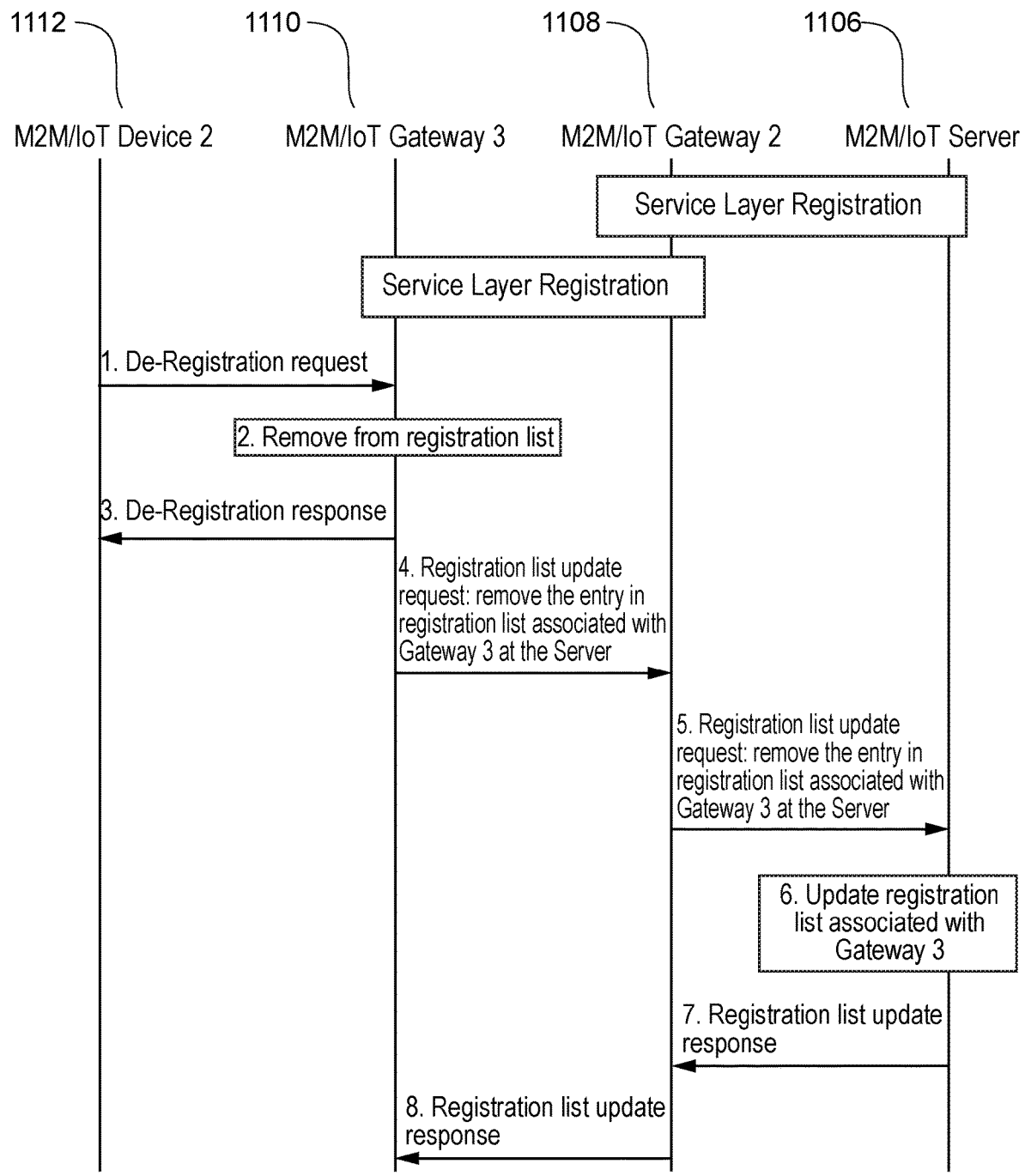
FIG. 17 is a diagram that illustrates an enhanced de-registration procedure to manage retargeting chain tables.

In this section, an enhanced service layer de-registration method to support service layer retargeting when a SL entity de-registers from another SL entity is described. FIG. 17 illustrates one embodiment of the method. For purposes of illustration, suppose that for the SL entities in FIG. 11, after Gateway 2 1108 has registered to the Server 1106, Gateway 3 1110 has registered to Gateway 2 1108, Device 2 1112 and Device 3 1114 have registered to Gateway 3 1110, Device 2 1112 intends to de-register from Gateway 3 1110 using the method shown in FIG. 17.

In Step 1 of FIG. 17, Device 2 1112 sends a de-registration request message to Gateway 3 1110.

In Step 2 of FIG. 17, after receiving the message, Gateway 3 1110 removes the entry that is associated with Device 2 1112.

In Step 3 of FIG. 17, Gateway 3 1110 sends the de-registration response to Device 2 1112.

In steps 4 and 5 of FIG. 17, Gateway 3 1110 sends a registration list update message to the M2M/IoT Server 1106. The registration list update message contains the ID of all entities that de-register from Gateway 3 1110 as shown in Table 17. Since the Server 1106 does not have a registration relationship with Gateway 3 1110, Gateway 3 1110 sends the message to its Registrar Entity, i.e. Gateway 2 1108, which retargets the message to the Server 1106.

TABLE 17

New Fields in a Registration List Update Message

| Field Name | Description |
|---|---|
| Delete entries | Indicate the receiver to delete new entries in the registration list. |
| Register Entity 1 to delete | The name or ID of the first entity that de-registers to the receiver but not report to the Server since last update message, e.g. Device 2 in FIG. 17. |
| Register Entity 2 to delete | The name or ID of the second entity that de-registers to the receiver but not report to the Server since last update message. |
| Register Entity n to delete | The name or ID of the last entity that de-registers to the receiver but not report to the Server since last update message. |

In Step 6 of FIG. 17, after receiving the message, the Server 1106 deletes entries for which the register entity is contained in in the message. For example, the Server 1106 delete entry with index 3 in Table 15 since its register entity is Device 2 1112.

The Server 1106 also removes the entries in the retargeting chain table, the destination entity ID of those entries matches the entity ID in the message. For example, the entry with index 3 in Table 16 is removed since its destination entity ID is Device 2 1112. The Server 1106 also removes the entries in the retargeting chain table, the Entity ID on Retargeting Chain field of those entries matches the entity ID that is contained in the message. For example, if the Gateway 3 1110 is contained in the message, entries with index 3 and 4 in Table 16 will be deleted since their "retargeting chain" contains Gateway 3 1110.

In Step 7 and 8 of FIG. 17, the Server 1106 sends the registration list update response to Gateway 3 1110. The Server 1106 sends to the message to Gateway 2 1108 and Gateway 2 1108 retargets the message to Gateway 3 1110.

It is understood that the entities performing the steps illustrated in FIG. 17 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 17 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 17. It is also understood that the functionality illustrated in FIG. 13 may implemented as a set of virtualized network functions. The network functions may not necessarily communicate directly, rather, they may communicate via forwarding or routing function. It is also understood that any transmitting and receiving steps illustrated in FIG. 17 may be performed by communication circuitry of the apparatus under control of the processor of the apparatus and the computer-executable instructions (e.g., software) that it executes.

Enhanced Registration Update to Manage the Retargeting Chain Table

Figure 18:
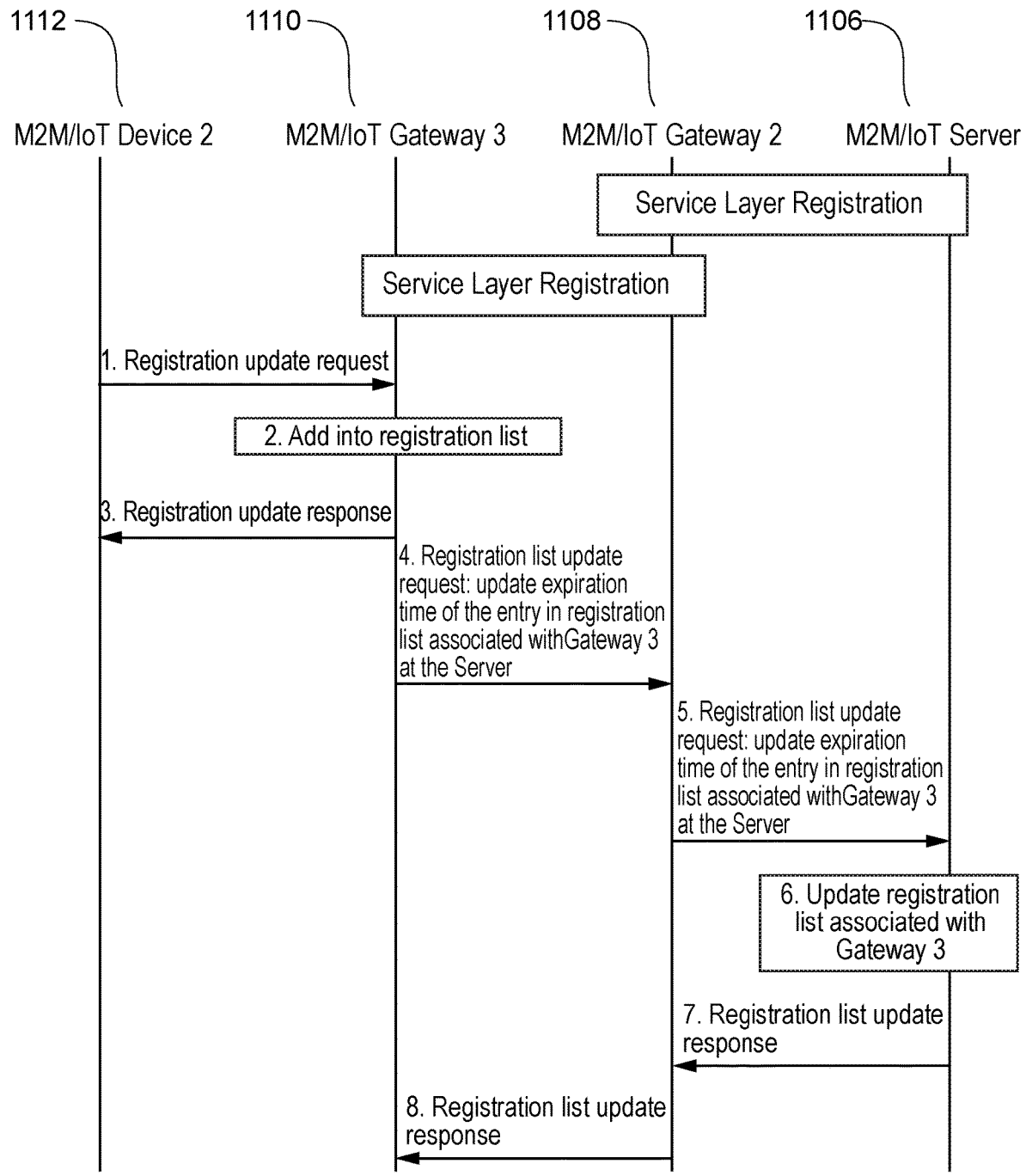
FIG. 18 is a diagram that illustrates an enhanced registration update procedure to update retargeting tables.

In this section, an enhanced service layer registration management method to update entries in a retargeting chain table is described. One embodiment of the method is illustrated in FIG. 18. Consider that an entity, e.g. Entity A, is required to send a registration update message to the entity it is registered to, e.g. Entity B, before its registration expires at Entity B. As an example, considering the SL entities in FIG. 11, assume that Gateway 2 1108 has registered to the Server 1106, Gateway 3 1110 has registered to Gateway 2 1108, and Device 2 1112 and Device 3 1114 have registered to Gateway 3 1110. Device 2 1112 may be required to send a registration update message to Gateway 3 1110, before its registration expires at Gateway 3 1110. In accordance with the method illustrated in FIG. 18, the registration update message may be processed and forwarded to the server 1106 in the network.

In Step 1 of FIG. 18, Device 2 1112 sends a registration update message to Gateway 3 1110. The registration update message contains the new expiration time of the entity as listed in Table 9.

In Step 2 of FIG. 18, after receiving the message, Gateway 3 1110 updates the expiration time of the entry associated with Device 2 1112 in its registration list.

In Step 3 of FIG. 18, Gateway 3 1110 sends the registration response to Device 2 1112.

In Step 4 and 5 of FIG. 18, Gateway 3 1110 sends a registration list update message to the Server 1106. The registration list update message contains the ID and expiration time of the updated entities that register to Gateway 3 1110, e.g. Device 2 1112 as listed in Table 18. Since the Server 1106 does not have a registration relationship with Gateway 3 1110, Gateway 3 1110 sends the message to its Registrar Entity, i.e. Gateway 2 1108, which retargets the message to the Server 1106.

TABLE 18

New Fields in a Registration List Update Message

| Field Name | Description |
| --- | --- |
| Update entries | Indicate the receiver to update entries in the registration list. |
| Registered Entity 1 | The name or ID of the first entity to update, e.g. Device 2. |
| Expiration Time of the Registered Entity 1 | The life time of the first entity, or the length of the time period that the entity can be reached |
| Registered Entity 2 | The name or ID of the second entity to update, e.g. Device 2. |
| Expiration Time of the Registered Entity 2 | The life time of the second entity, or the length of the time period that the entity can be reached |
| . . . | . . . |
| Registered Entity n | The name or ID of the last entity to update, e.g. Device 2. |
| Expiration Time of the Registered Entity n | The life time of the last entity, or the length of the time period that the entity can be reached |

In Step 6 of FIG. 18, after receiving the message, the Server 1106 updates all entries associated with entities in the message, i.e. updates the new expiration time of entry with index 3, in the combined registration list tables as shown in Table 19.

TABLE 19

Combined Registration List Table at M2M/IoT Server after Updating Entries

| Index | Entity ID | Registered Entity ID | Expiration time |
| --- | --- | --- | --- |
| 1 | Gateway 2 | Gateway 3 | 10 Jun. 2016 21:37:04 UTC |
| 2 | Gateway 3 | Device 3 | 10 Jun. 2016 21:39:04 UTC |
| 3 | Gateway 3 | Device 2 | 10 Jun. 2016 22:46:04 UTC |

In Step 7 and 8 of FIG. 18, the Server 1106 sends the registration list update response to Gateway 3 1110. Since the retargeting chain for Gateway 3 1110 is Gateway 2 1108 as shown in Table 16, the Server 1106 sends to the message to Gateway 2 1108 and Gateway 2 1108 retargets the message to Gateway 3 1110.

It is understood that the entities performing the steps illustrated in FIG. 18 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 18 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 18. It is also understood that the functionality illustrated in FIG. 18 may implemented as a set of virtualized network functions. The network functions may not necessarily communicate directly, rather, they may communicate via forwarding or routing function. It is also understood that any transmitting and receiving steps illustrated in FIG. 18 may be performed by communication circuitry of the apparatus under control of the processor of the apparatus and the computer-executable instructions (e.g., software) that it executes.

Embodiments

Figure 19:
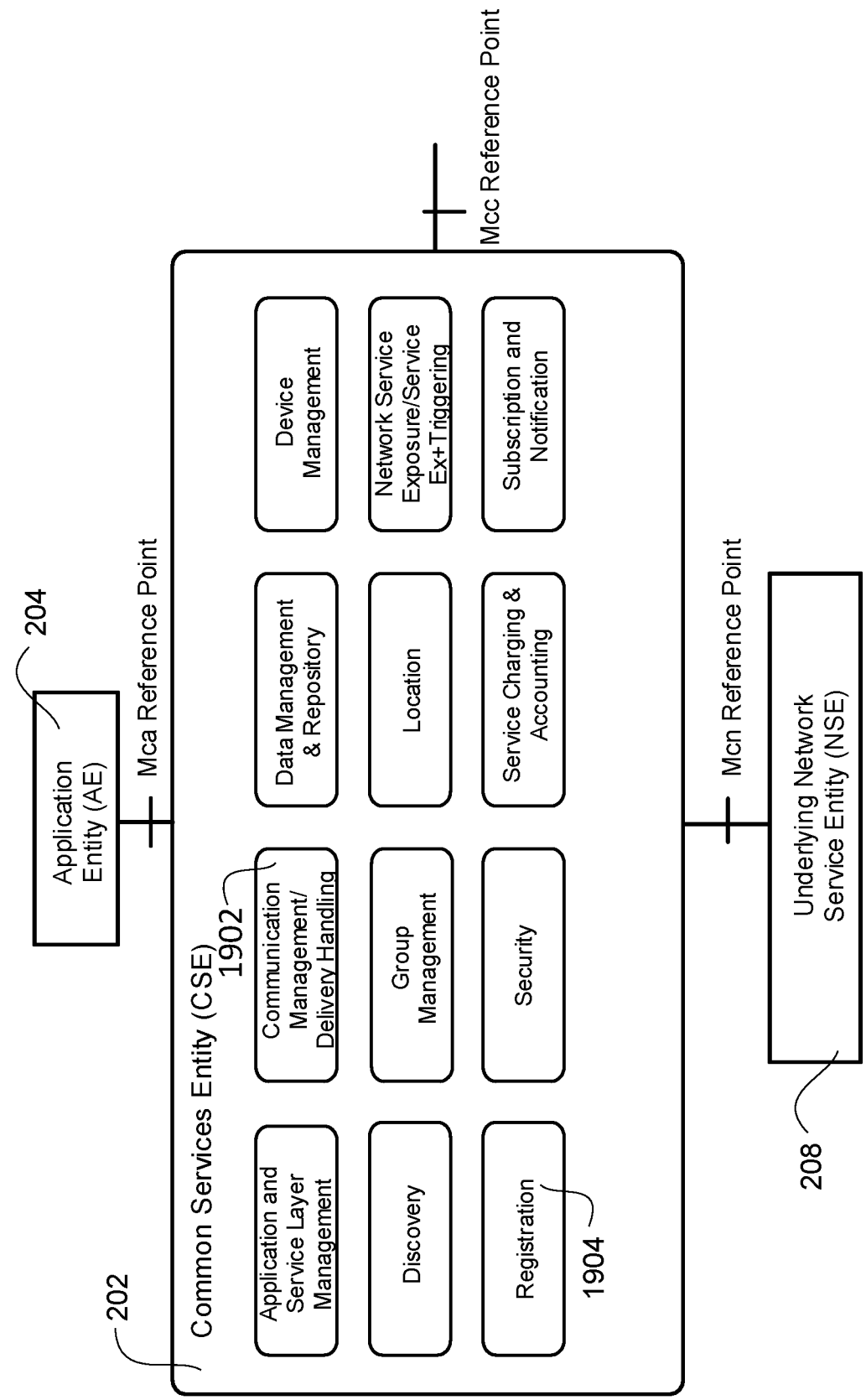
FIG. 19 is a diagram that illustrates a oneM2M CSF Embodiment.

While the methods and systems described above may be implemented in any M2M or IoT network having a service layer, described hereinafter are details of one embodiment of the methods and systems disclosed above in a network that operates in accordance with the specifications of the onM2M standards body.

oneM2M ROA Embodiment oneM2M defines the capabilities supported by the oneM2M Service Layer. The oneM2M Service Layer is instantiated as a Capability Services Entity (CSE) which comprises a set of Capability Service Functions (CSF). As one embodiment, the methods may be part of an enhanced Registration CSF 1904 and/or part of a Communication Management/Delivering Handling (CMDH) CSF 1902 as shown in FIG. 19. CSEs will communicate via the Mcc and Mcc' reference point to manage retargeting tables and/or the retargeting chain table at a server, such as the server 1106 illustrated above in various figures.

It is understood that the functionality illustrated in FIG. 19, may be implemented in the form of software (i.e., computer-executable instructions) stored in a memory of, and executing on a processor of, a wireless device or other apparatus (e.g., a server, gateway, device, or other computer system), such as one of those illustrated in FIG. 39C or 39D described below. It is also understood that the functionality illustrated in FIG. 19 may implemented as a set of virtualized network functions. The network functions may not necessarily communicate directly, rather, they may communicate via forwarding or routing function.

New Request Message Format

In one aspect, the existing oneM2M Request message may be enhanced with several new parameters for supporting service layer retargeting. Requests over the Mcc and Mcc' reference points, from an Originator to a Receiver may contain the new parameters as an optional parameter, as shown in Table 20.

TABLE 20

New Parameter in Request Message

| Request message parameter | Operation | | | | |
|---|---|---|---|---|---|
| | Create | Retrieve | Update | Delete | Notify |
| Descendant CSEs | O | O | O | O | O |
| Expiration Time of the Descendant CSEs | O | O | O | O | O |
| Registered Entities | O | O | O | O | O |
| Expiration Time of the Registered Entities | O | O | O | O | O |
| Entities on Retargeting Chain | O | O | O | O | O |

New Attributes and Resources

Figure 20:
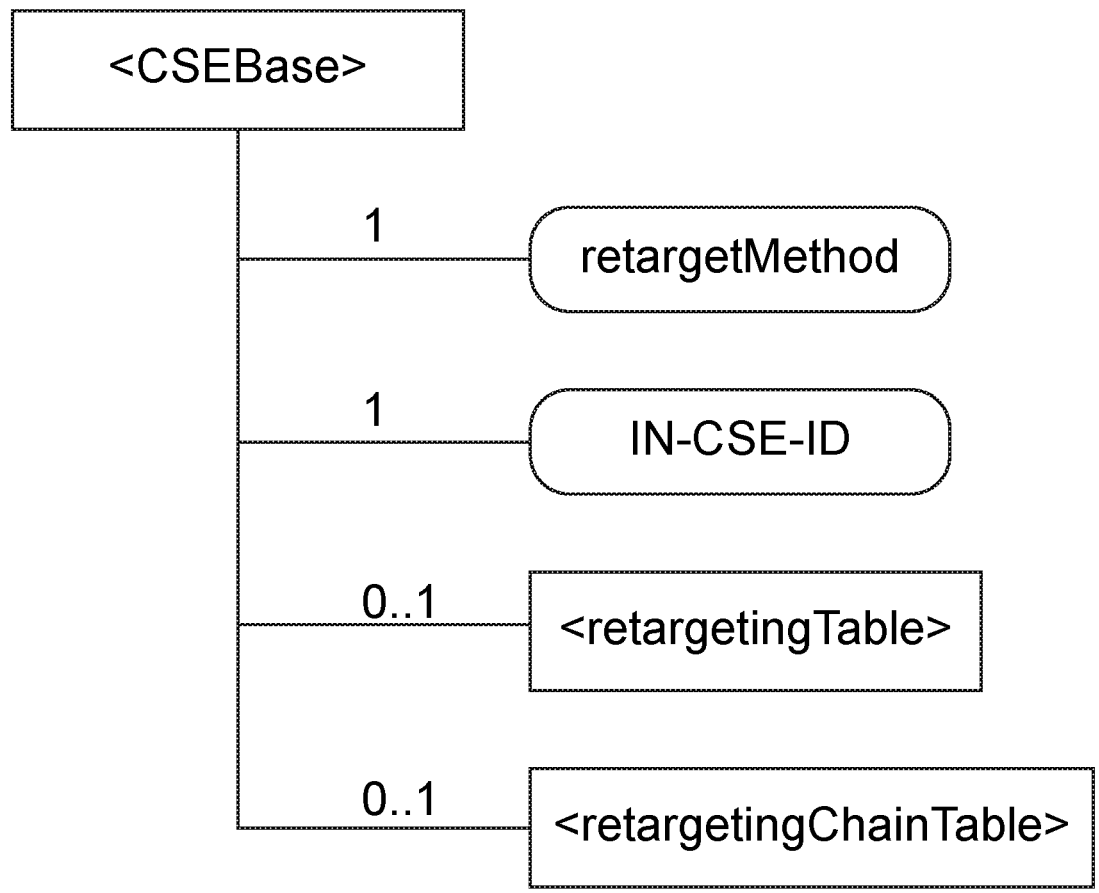
FIG. 20 is a diagram that illustrates new attributes and resources under <CSEBase>.

In order to support the message retargeting described herein, new resources and attributes may be added under <CSEBase> as shown in FIG. 20.

Figure 21:
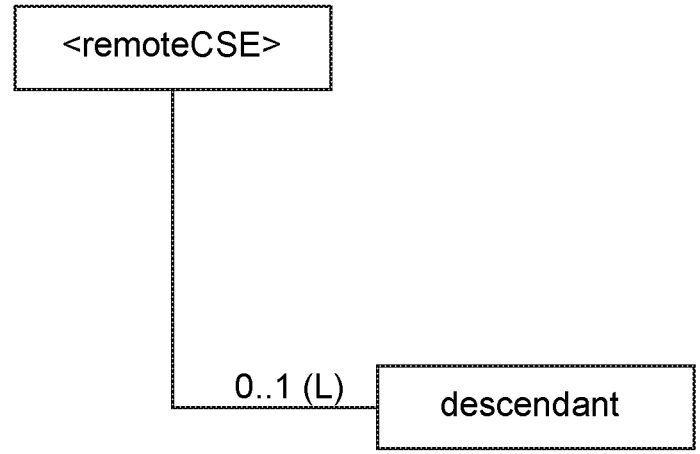
FIG. 21 is a diagram that illustrates new attributes under <remoteCSE>.

Table 21 shows the new attributes of the <CSEBase> resource, in accordance with one embodiment. The details of <retargetingTable> and <retargetingChainTable> are described below. In addition, a new attribute named descendantCSEs may be added under <remoteCSE> as shown in FIG. 21 and Table 22.

TABLE 21

New Attributes of <CSEBase>

| Attributes of <CSEBase> | Multi-plicity | RW/RO/WO | Description |
|---|---|---|---|
| retargetMethod | 1 | RW | Indicates the retarget method that the CSE supports, e.g. using retarget table or retarget chain table |
| IN-CSE-ID | 1 | RO/RW | Indicates the CSE-ID of the IN-CSE. The IN-CSE-ID may be Read Only if provisioning by Service Provider. The IN-CSE-ID may be Readable and Writeable if obtained during registration. |

TABLE 22

New Attributes of <remoteCSE>

| Attributes of <CSEBase> | Multi-plicity | RW/RO/WO | Description |
|---|---|---|---|
| descendantCSEs | 1(L) | RW | This attribute contains a list of identifiers of descendent CSEs of the Registree CSE represented by this <remoteCSE> resource. A descendant CSE is a CSE that either registers to the CSE represented by this <remoteCSE>, or registers to another CSE which is a descendant CSE of this <remoteCSE>. The Registree CSE represented by this <remoteCSE> configures this attribute with a list of descendent CSEs upon creation of the <remoteCSE> resource. The Registree CSE updates this attribute whenever a new descendent CSE either registers or de-registers. The Registree CSE detects when a descendent CSE registers or de-registers by monitoring its <remoteCSE> resources and the descendentCSEs attribute(s) of these <remoteCSE> resources. |

<retargetingTable> Resource

Figure 22:
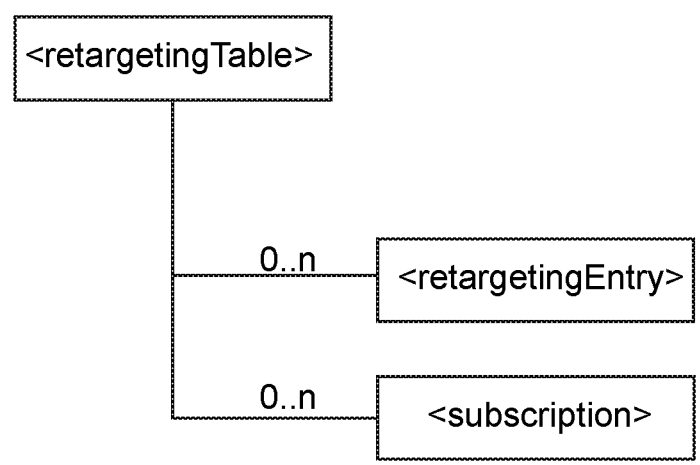
FIG. 22 is a diagram that illustrates a <retargetingTable> Resource.
Figure 23:
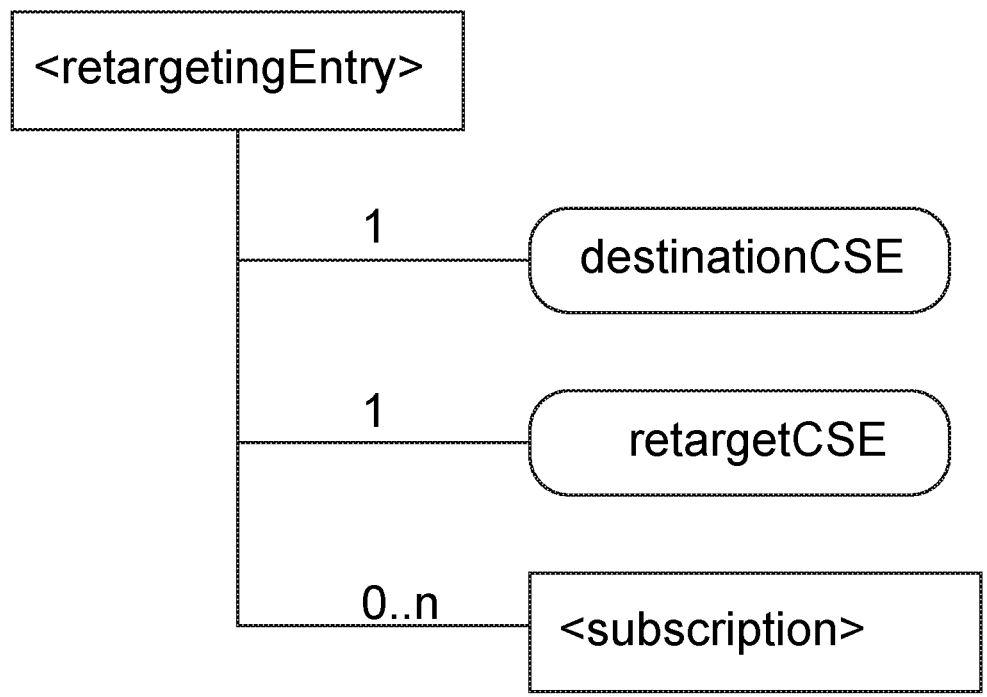
FIG. 23 is a diagram that illustrates a <retargetingEntry> Resource.

In one embodiment, the <retargetingTable> (shown in FIG. 22) has a child resource <retargetingEntry> described below and the <subscription> child resource may be as defined in oneM2M-TS-0001 oneM2M Functional Architecture-V-2.6.0. <retargetingEntry> Resource FIG. 23 shows one embodiment of the child resource <retargetingEntry>. Table 23 shows the attribute of the <retargetingEntry> child resource. The <retargetingEntry> resource may have the <subscription> child resource as defined in oneM2M-TS-0001 oneM2M Functional Architecture-V-2.6.0.

TABLE 23

Attribute of <retargetingEntry>

| Attributes of <retargetingEntry> | Multi-plicity | RW/RO/WO | Description |
|---|---|---|---|
| destinationCSE | 1 | WO | Indicates the AE or CSE that is the destination |
| retargetCSE | 1 | RW | Indicates the next CSE that SL messages should be retargeted to the target CSE. |

<retargetingChainTable> Resource

Figure 24:
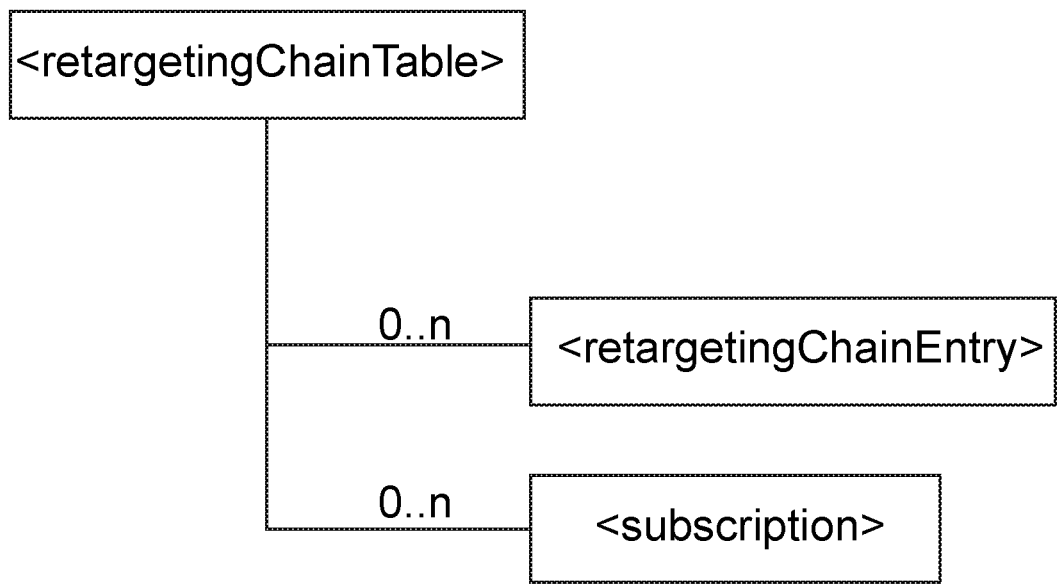
FIG. 24 is a diagram that illustrates a <retargetingChainTable> Resource.

In one embodiment, the <retargetingChainTable> resource (shown in FIG. 24) may have a child resource <retargetingChainEntry> described below and the <subscription> child resource may be as defined in oneM2M-TS-0001 oneM2M Functional Architecture-V-2.6.0.

<retargetingChainEntry> Resource

Figure 25:
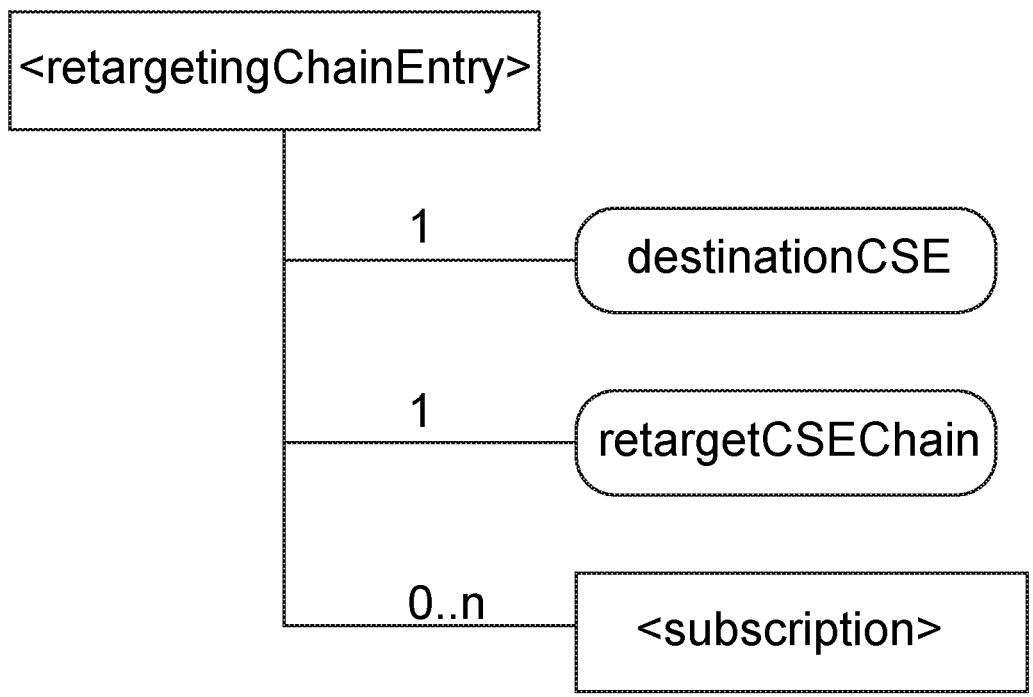
FIG. 25 is a diagram that illustrates a <retargetingChainEntry> Resource.

FIG. 25 shows one embodiment of the child resource <retargetingChainEntry>. Table 24 shows an attribute of the <retargetingChainEntry> child resource, in accordance with one embodiment. The <retargetingChainEntry> resource may have the <subscription> child resource as defined in oneM2M-TS-0001 oneM2M Functional Architecture-V-2.6.0.

TABLE 24

Attribute of <retargetingChainEntry>

| Attributes of <retargetingEntry> | Multi-plicity | RW/RO/WO | Description |
| --- | --- | --- | --- |
| destinationCSE | 1 | WO | Indicates the AE or CSE that is the destination |
| retargetCSEChain | 1 (L) | RW | An ordered list that Indicates the CSEs through which SL messages should be retargeted to the target CSE. | oneM2M Procedure Enhancements

To realize the methods and systems described above, the following enhancements to oneM2M procedures may be implemented.

Procedure for a CSE to Retarget a Message

Figure 26A:
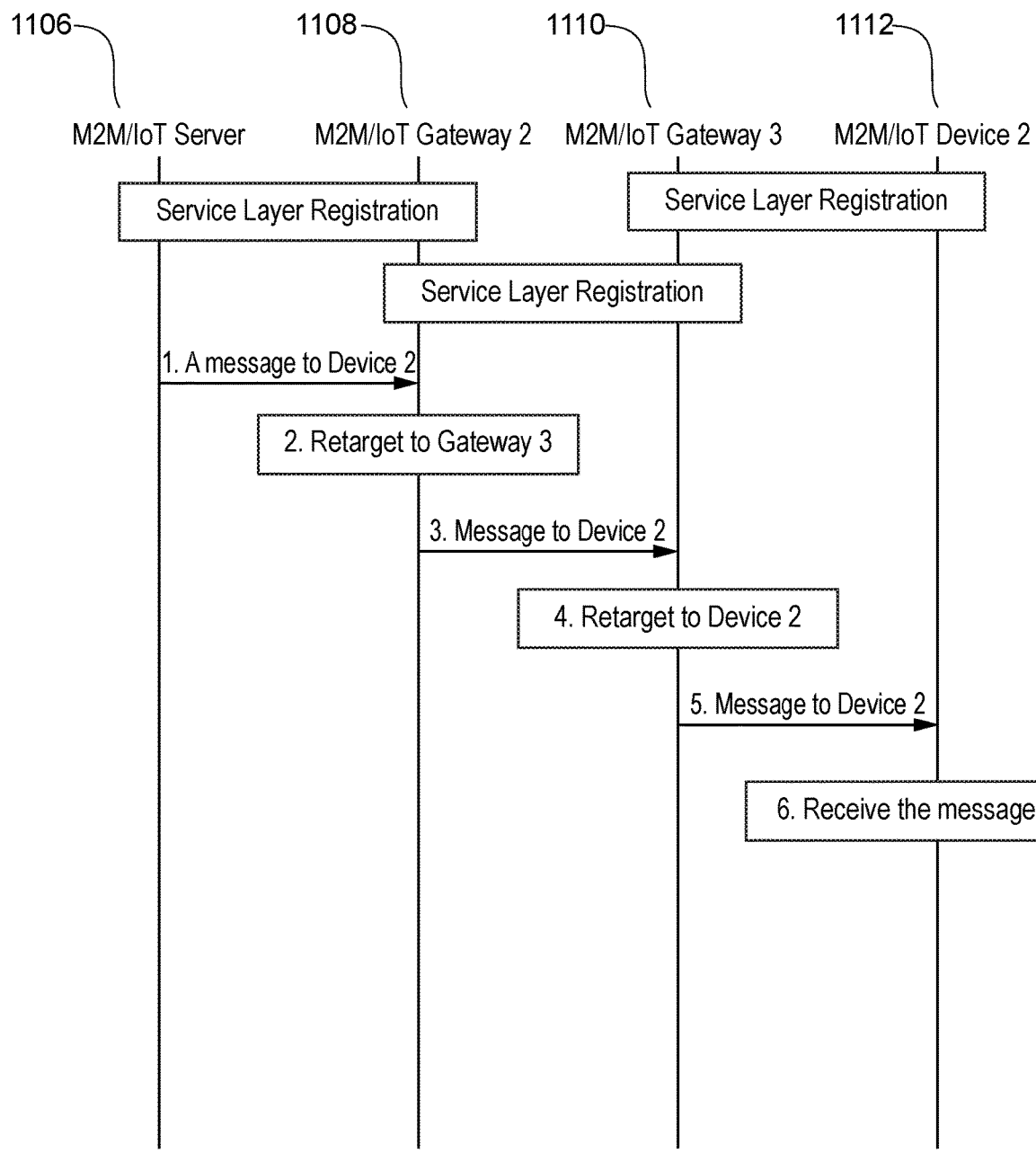
FIG. 26A is a diagram that illustrates the CSE Retargeting a Service Layer Message.
Figure 26B:
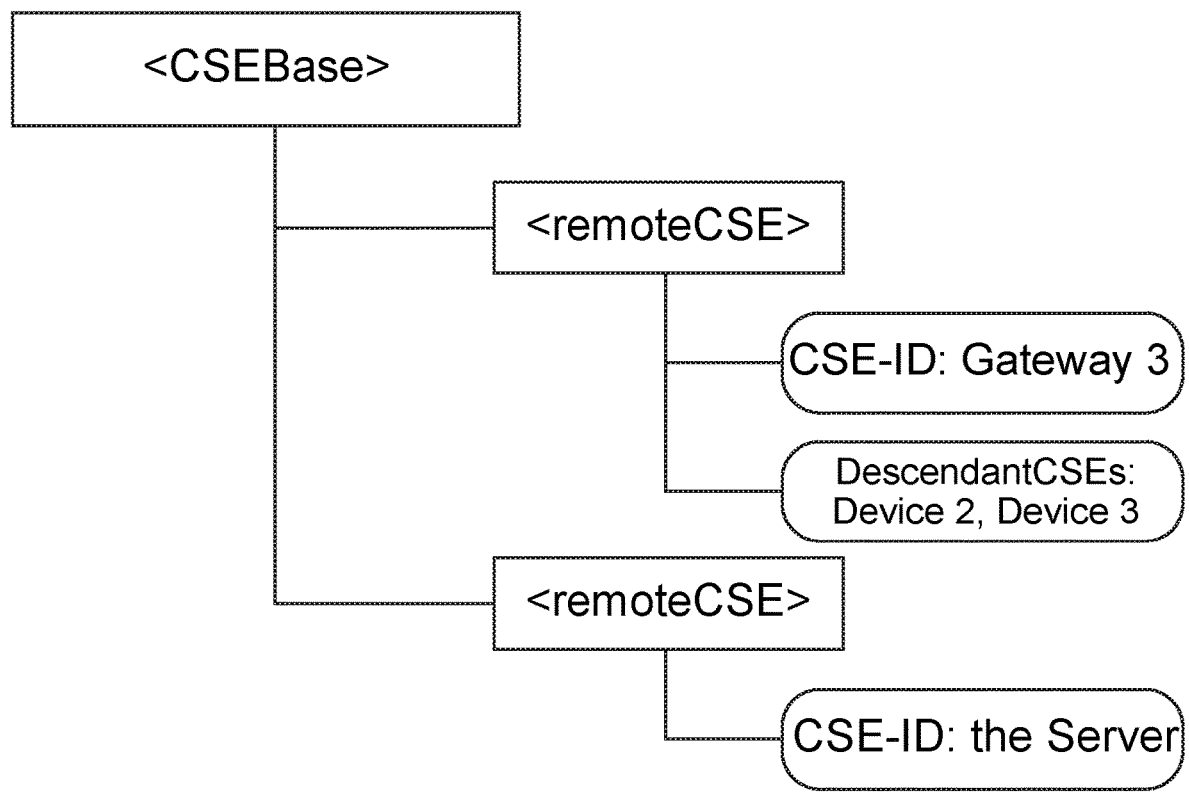
FIG. 26B is a diagram that illustrates a<CSEBase> Resource.

FIG. 26A is a call flow illustrating a CSE retargeting a service layer message in accordance with the methods and system described herein. When a CSE receives a service layer message and is not the destination CSE, i.e. its CSE-ID is different from CSE-ID in the To parameter of the request. The CSE may check each of its <remoteCSE> resources to determine whether the CSE-ID specified in the To parameter of the request matches either the CSE-ID or descendantCSEs attributes of a <remoteCSE> resource. If a match is found, the CSE shall retarget the request to the pointOfAccess of the matching <remoteCSE> resource. If a match is not found, and the CSE received the request from an AE or a descendant CSE, and the CSE is not the IN-CSE, then it shall retarget the request to its Registrar CSE. If a match is not found and the CSE is the IN-CSE, then the CSE shall not forward the request and it shall respond with an error. If a match is not found and the CSE is not the IN-CSE and the CSE receives the request from its registrar CSE, then the CSE shall not forward the request and it shall respond with an error. For example, with reference to FIG. 26A, when Gateway 2 1108 receives a message to Device 2 1112 in step 2 of FIG. 26A, Gateway 2 1108 checks each of its <remoteCSE> resources and finds Device 2 1112 is in the descendant attribute of the <remoteCSE> resource associated with Gateway 3 1110 as shown in FIG. 26B. Therefore, Gateway 2 1108 retargets the message to Gateway 3 1110.

Enhanced Registration Procedure to Enable Service Layer Retargeting

Figure 27:
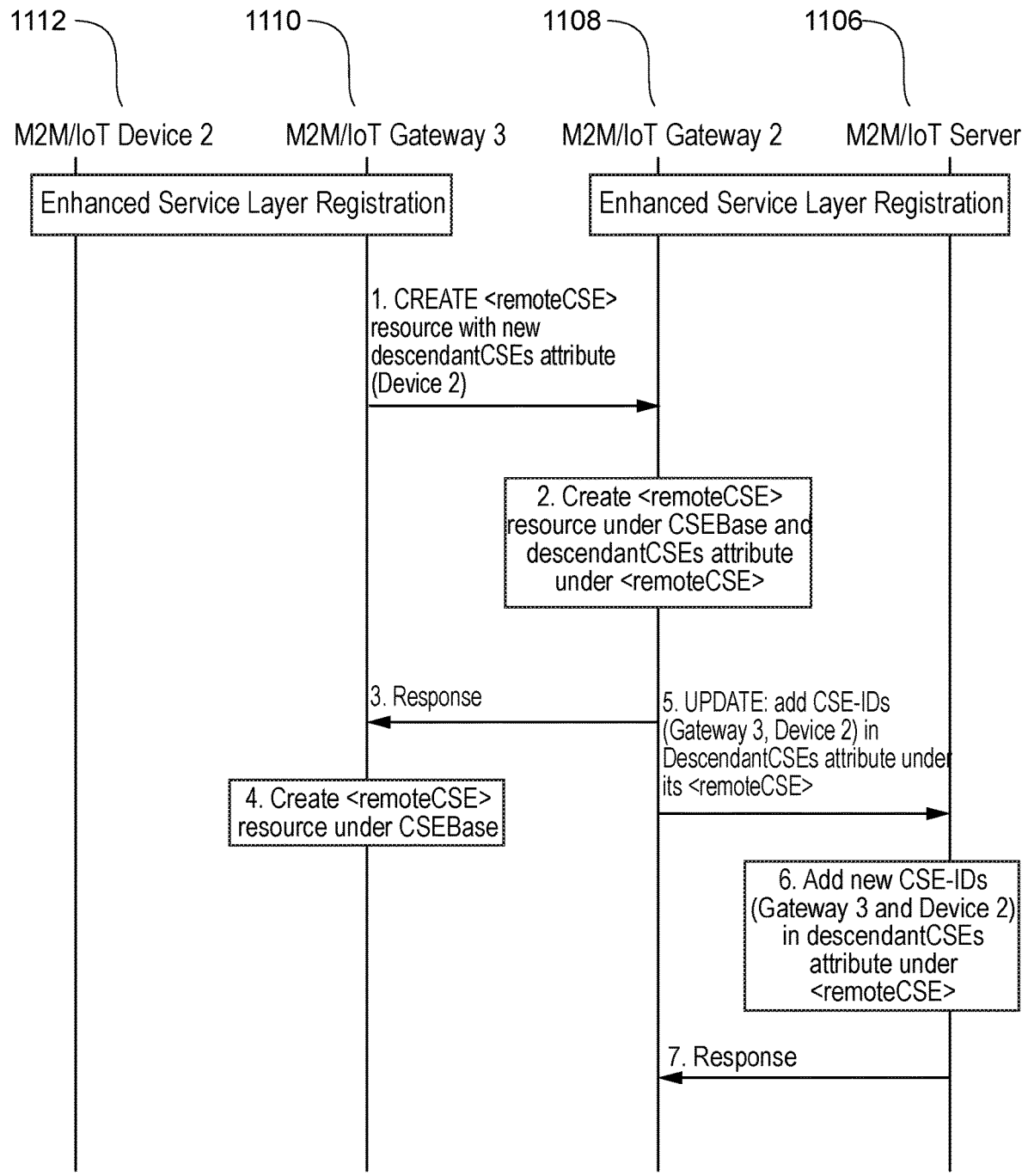
FIG. 27 is a diagram that illustrates an enhanced registration procedure to enable service layer retargeting.

One embodiment of an enhanced registration method to enable service layer retargeting in an oneM2M implementation is shown in FIG. 27.

In Step 1 of FIG. 27, the Originator, e.g. Gateway 3 1110, sends the CREATE Request message to the Receiver, e.g. Gateway 2 1108.

Descendant CSEs are the new parameter to be added to the request message in oneM2M-TS-0001 oneM2M Functional Architecture-V-2.6.0.

Figure 29:
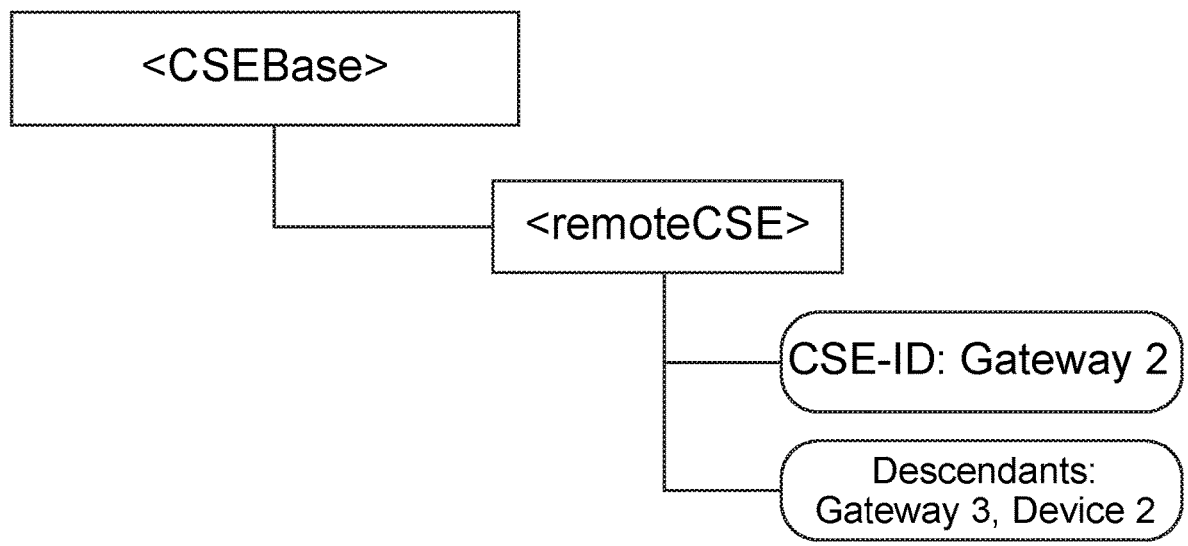
FIG. 29 is a diagram that illustrates the updating of a descendants attribute of <remoteCSE> resources when the server receives the request from Gateway 2.

In Step 2 of FIG. 27, the Receiver, e.g. Gateway 2 1108, performs creation of <remoteCSE> resource as highlighted in FIG. 29. If the Receiver CSE has registered to another CSE, the Receiver CSE shall send an update request to its Registrar CSE to add the CSE-IDs of the Originator CSE and the Originator CSE's descendants into the descendantCSEs attribute of the Receiver CSE's<remoteCSE> hosted by the Registrar CSE. For example, Gateway 2 1108 has registered to CSE of another service layer entity, e.g. the Server 1106, Gateway 2 1108 adds new descendant CSEs in the descendantCSEs attribute under the representing <remoteCSE> resource of the Servers'<CSEBase>. The Receiver CSE also provides the CSE-ID of the IN-CSE in the response.

In Step 3 of FIG. 27, the Receiver, e.g. Gateway 2 1108, responds with a Response message including the CSE-ID of the IN-CSE.

In Step 4 of FIG. 27, the Originator, e.g. Gateway 3 1110, upon receipt of the CREATE response message, creates a <remoteCSE> resource locally under its <CSEBase> resource. The Originator also stores the CSE-ID of IN-CSE in the IN-CSE-ID attribute. This resource is representing the Receiver CSE.

In Step 5 of FIG. 27, the Receiver, e.g. Gateway 2 1108 sends an UPDATE request to add new descendant CSE, i.e. Gateway 3 1110 and Device 3 1114, into "descendantCSEs" attribute under the representing <remoteCSE> of the CSE it registers to, e.g. the Server 1106.

In Step 6 of FIG. 27, the Server 1106 performs update the descendantCSEs attribute of the <remoteCSE> resources representing Gateway 2 1108 as highlighted in FIG. 29. If the descendantCSEs attribute is updated, and the Receiver CSE has registered to another CSE, the Receiver CSE shall send an update request to its Registrar CSE to make the corresponding updates to the descendantCSEs attribute of the Receiver CSE's<remoteCSE> hosted by the Registrar CSE. Since the Server 1106 does not register to any other entities, the Server 1106 does not sends an UPDATE request to reporting new descendant CSEs, i.e. Gateway 3 1110 and Device 3 1114, to any other CSEs.

In Step 7 of FIG. 27, the Server 1106 responds with a Response message.

Enhanced De-Registration Procedure to Enable Service Layer Retargeting

Figure 30:
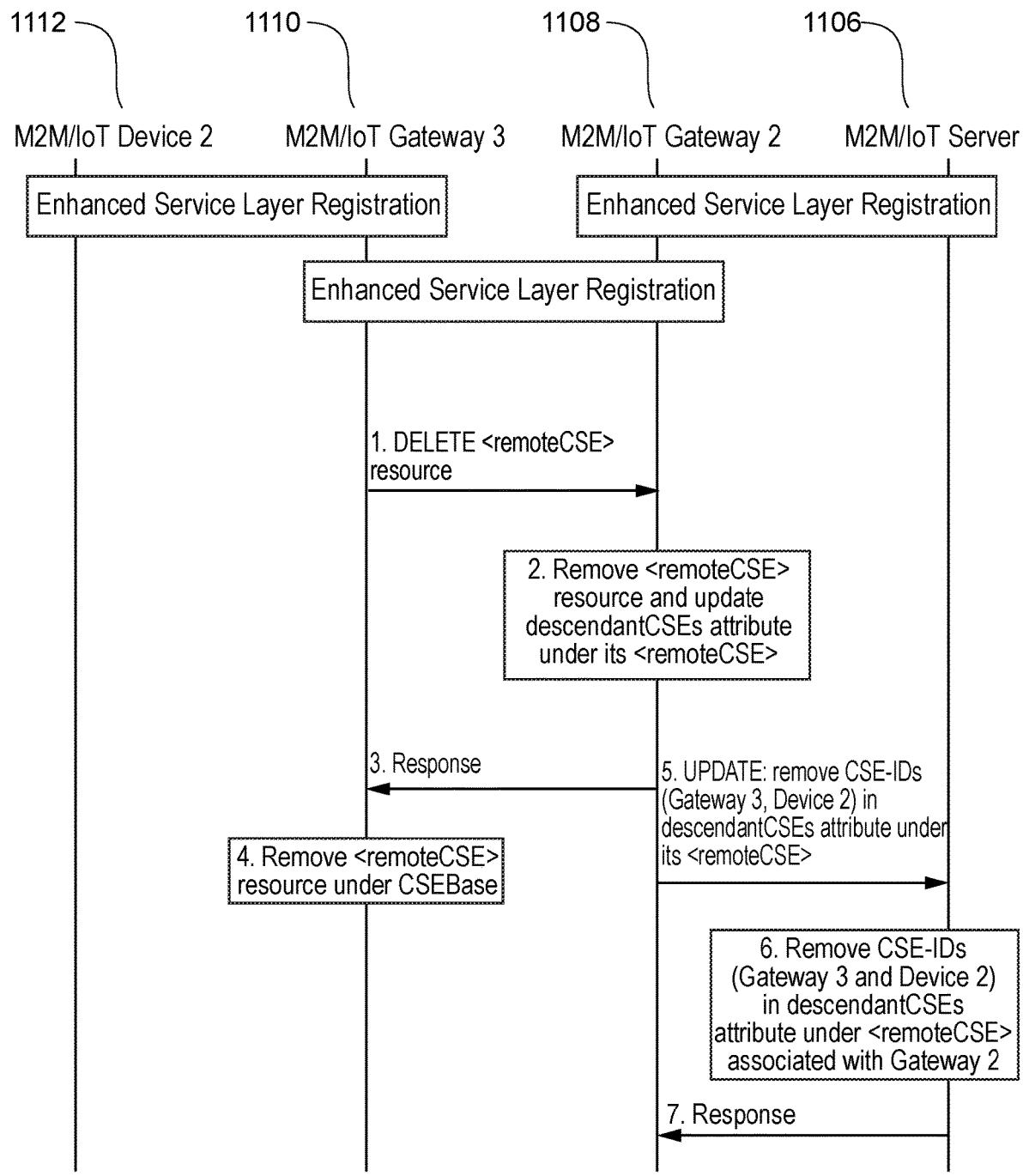
FIG. 30 is a diagram that illustrates an enhanced de-registration procedure to enable service layer retargeting.

An enhanced de-registration procedure to enable service layer retargeting in a oneM2M implementation is shown in FIG. 30.

In Step 1 of FIG. 30, the Originator, e.g. Gateway 3 1110, sends a DELETE Request message to the Receiver, e.g. Gateway 2 1108.

Figure 28:
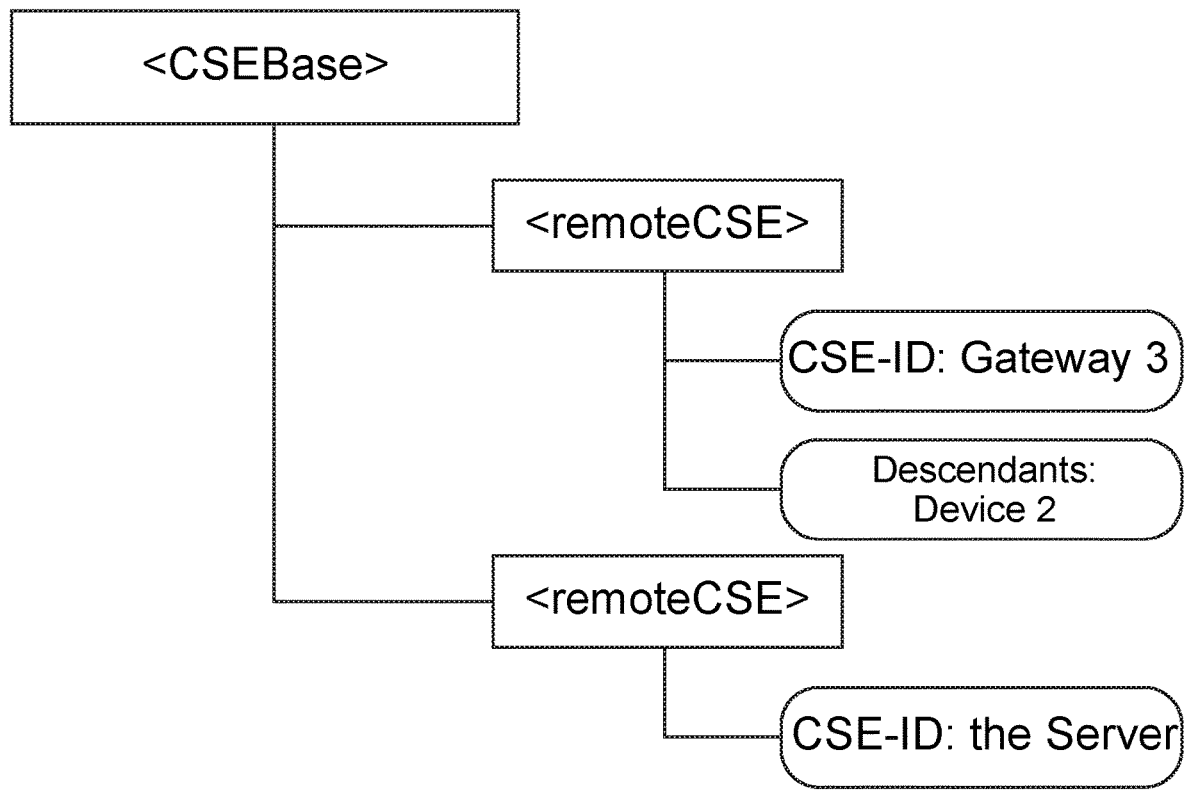
FIG. 28 is a diagram that illustrates the creation of new <remoteCSE> resources when Gateway 2 receives a request from Gateway 3.

In Step 2 of FIG. 30, the Receiver, e.g. Gateway 2 1108, performs deletion of <remoteCSE> resource representing Gateway 2 1108 as highlighted in FIG. 28. If the Receiver CSE has registered to another CSE, the Receiver CSE shall send an update request to its Registrar CSE to delete the CSE-IDs of the Originator CSE and the Originator CSE's descendants in the descendantCSEs attribute of the Receiver CSE's<remoteCSE> hosted by the Registrar CSE. For example, since Gateway 2 1108 has registered to the CSE of another service layer entity, e.g. the Server 1106, Gateway 2 1108 deletes descendant CSEs, i.e. Gateway 3 1110 and Device 2 1112 in the descendant attribute under <remoteCSE> resource it associates at CSE of the Server 1106.

In Step 3 of FIG. 30, the Receiver, e.g. Gateway 2 1108, responds with a Response message.

In Step 4 of FIG. 30, the Originator, e.g. Gateway 3 1110, upon receipt of the DELETE response message, deletes the <remoteCSE> resource associated with Gateway 2 1108 locally under its <CSEBase> resource.

In Step 5 of FIG. 30, the Receiver, e.g. Gateway 2 1108 sends an UPDATE request to remove descendant entities, i.e. Gateway 3 1110 and Device 3 1114, from "descendantCSEs" attribute under the representing <remoteCSE> of the CSE it registers to, e.g. the Server 1106.

In Step 6 of FIG. 30, the Server 1106 removes the descendantCSEs attribute of the <remoteCSE> resources representing Gateway 2 1108 as highlighted in FIG. 29. Since the Server 1106 does not register to any other entities, the Server 1106 does not sends an UPDATE request to reporting deleted descendant CSEs, i.e. Gateway 3 1110, Device 2 1112 and Device 3 1114, to any other CSEs.

In Step 7 of FIG. 30, the Server 1106 responds with a Response message.

It is understood that the entities performing the steps illustrated in FIG. 30 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 30 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 30. It is also understood that the functionality illustrated in FIG. 30 may implemented as a set of virtualized network functions. The network functions may not necessarily communicate directly, rather, they may communicate via forwarding or routing function. It is also understood that any transmitting and receiving steps illustrated in FIG. 30 may be performed by communication circuitry of the apparatus under control of the processor of the apparatus and the computer-executable instructions (e.g., software) that it executes.

Procedure for a CSE to Retarget a Message Using Retargeting Table

When a CSE receives a service layer message and the CSE is not the CSE in the "To" field of message, e.g. Gateway 2 1108 in step 2 and Gateway 3 1110 in step 4 in FIG. 26A. The CSE may look up the retargeting table to find the service layer entity to retarget the message. If the CSE does not find the destination CSE in the retargeting table, it will retarget the message to the service layer entity it registered to.

Procedure to Manage Retargeting Table

Figure 33:
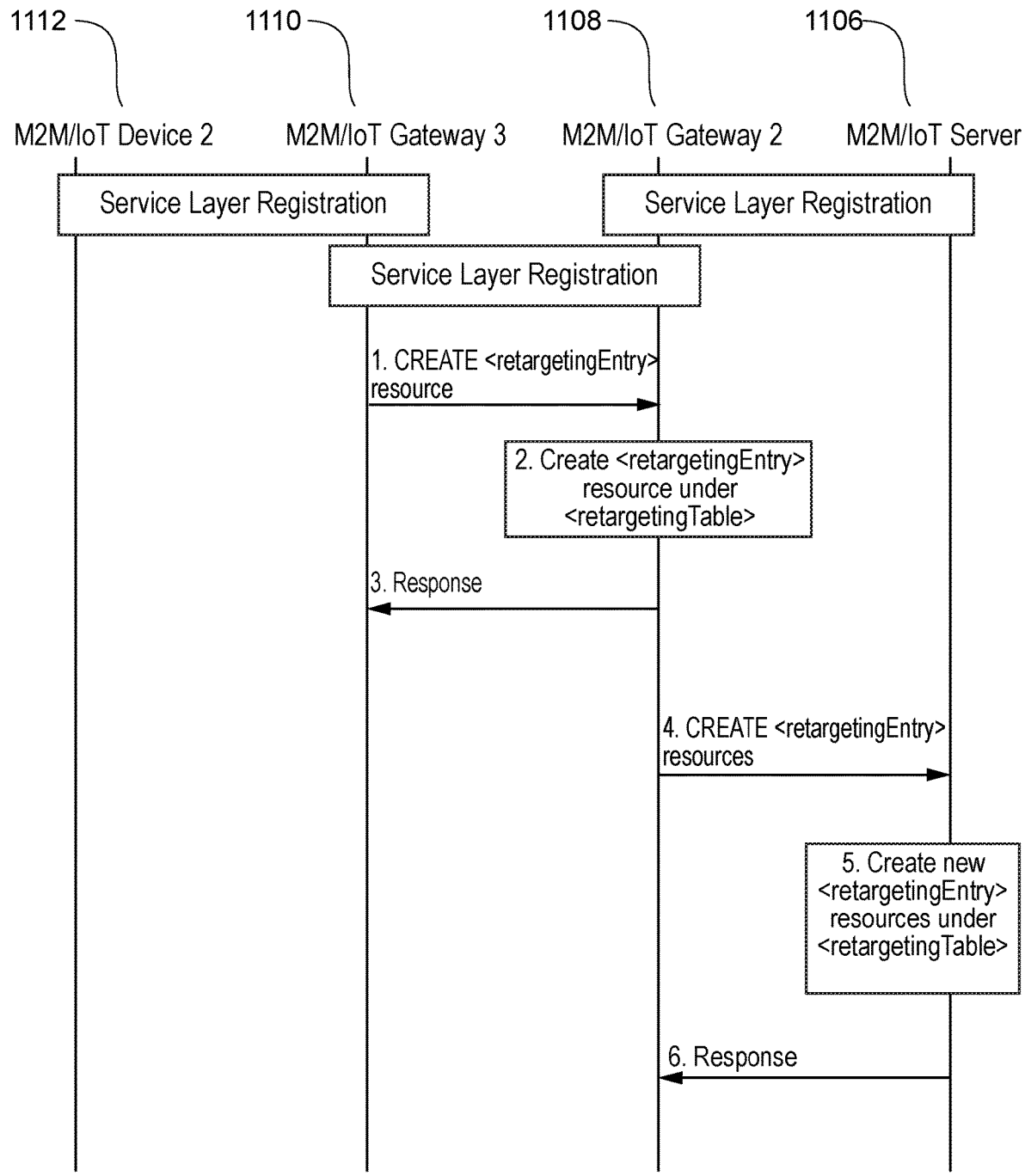
FIG. 33 is a diagram that illustrates an enhanced registration procedure to manage retargeting table.

A procedure to create a retargeting table in a oneM2M implementation is shown FIG. 33.

In Step 1 of FIG. 33, the Originator, e.g. Gateway 3 1110 sends the CREATE Request message to the Receiver, e.g. Gateway 2 1108.

Descendant entities and their expiration time are new parameter to be added to the request message in oneM2M-TS-0001 oneM2M Functional Architecture-V-2.6.0.

Figure 31:
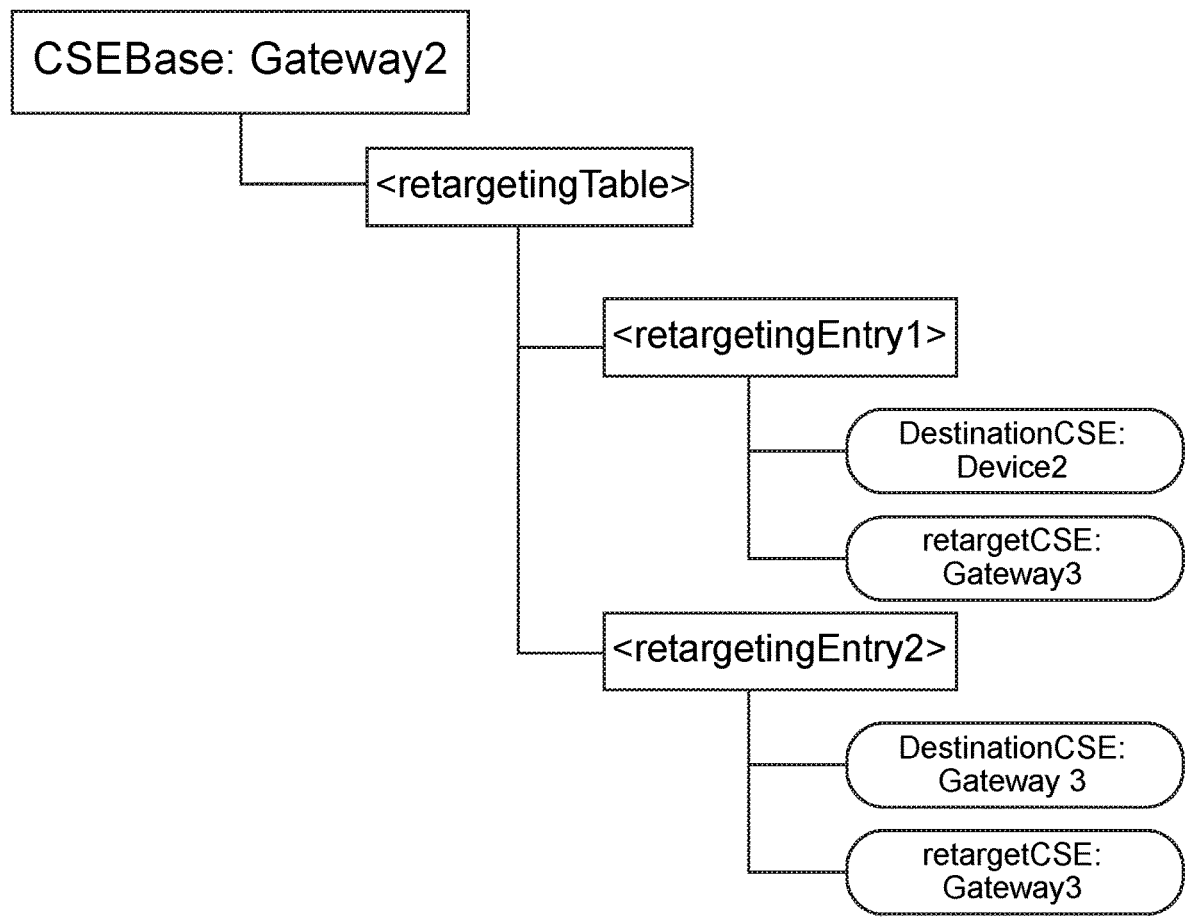
FIG. 31 is a diagram that illustrates the creation of new <retargetingEntry> resources when gateway 2 receives the request from Gateway 3.

In Step 2 of FIG. 33, the Receiver, e.g. Gateway 2 1108, performs creation of <retargetingEntry> resources under the <retargetingTable> resource as shown in FIG. 31. If Gateway 2 1108 has registered to CSE of another service layer entity, e.g. the Server 1106, Gateway 2 1108 creates new <retargetingEntry> resources at CSE of the Server 1106.

In Step 3 of FIG. 33, the Receiver, e.g. Gateway 2 1108, responds with a Response message.

In Step 4 of FIG. 33, the Receiver, e.g. Gateway 2 1108 creates new <retargetingEntry> resources under <retargetingTable> of the CSE it registers to, e.g. the Server 1106.

Figure 32:
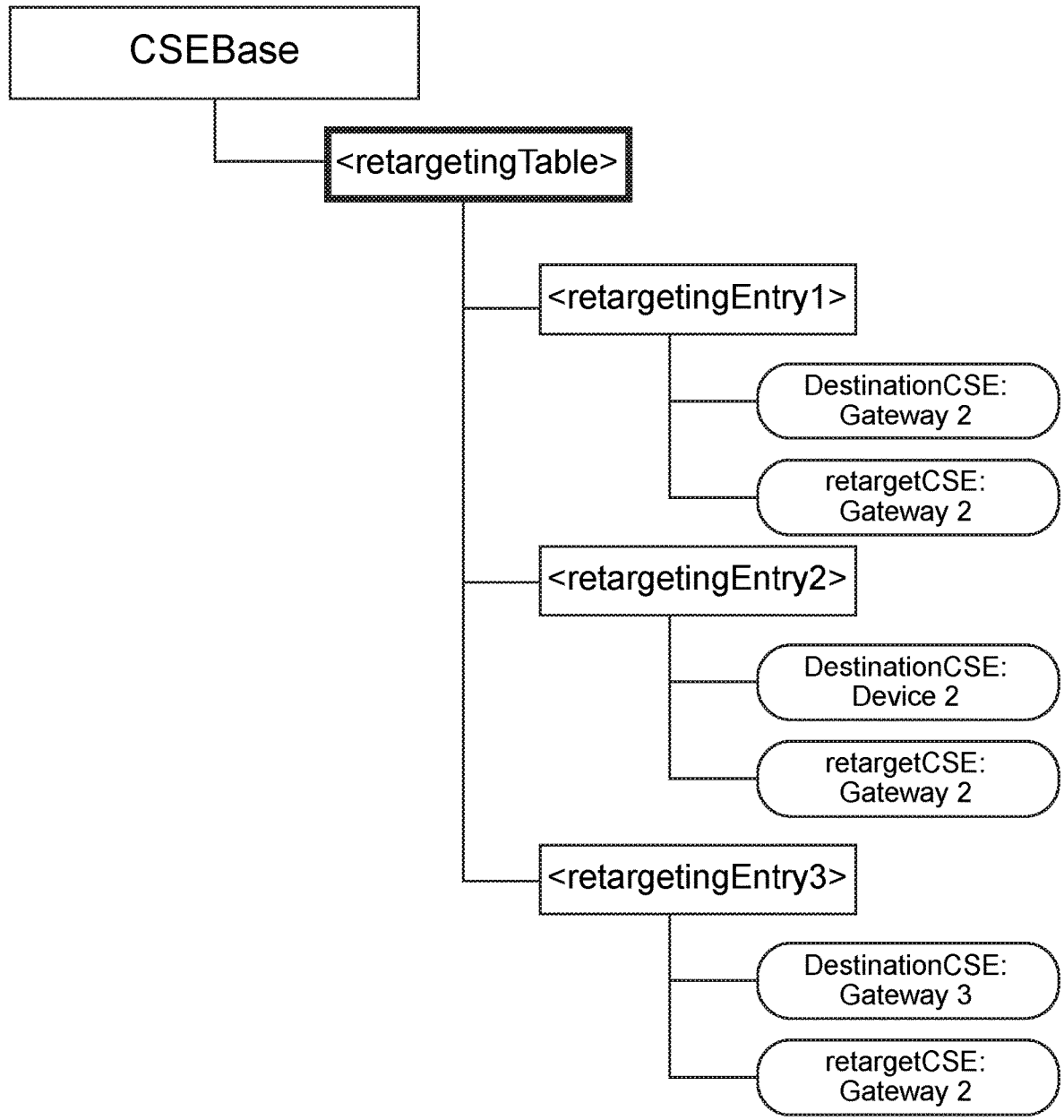
FIG. 32 is a diagram that illustrates the creation of new <retargetingEntry> resources when the server receives the request from gateway 2.

In Step 5 of FIG. 33, the Server 1106 performs creation of new <retargetingEntry> resources as highlighted in FIG. 32.

Since the Server 1106 does not register to any other entities, the Server 1106 does not create new <retargetingEntry> to any other CSEs.

In Step 6 of FIG. 33, the Server 1106 responds with a Response message.

It is understood that the entities performing the steps illustrated in FIG. 33 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 33 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 33. It is also understood that the functionality illustrated in FIG. 33 may implemented as a set of virtualized network functions. The network functions may not necessarily communicate directly, rather, they may communicate via forwarding or routing function. It is also understood that any transmitting and receiving steps illustrated in FIG. 33 may be performed by communication circuitry of the apparatus under control of the processor of the apparatus and the computer-executable instructions (e.g., software) that it executes.

Procedure for a CSE to Retarget a Message Using Retargeting Chain Table

Figure 34:
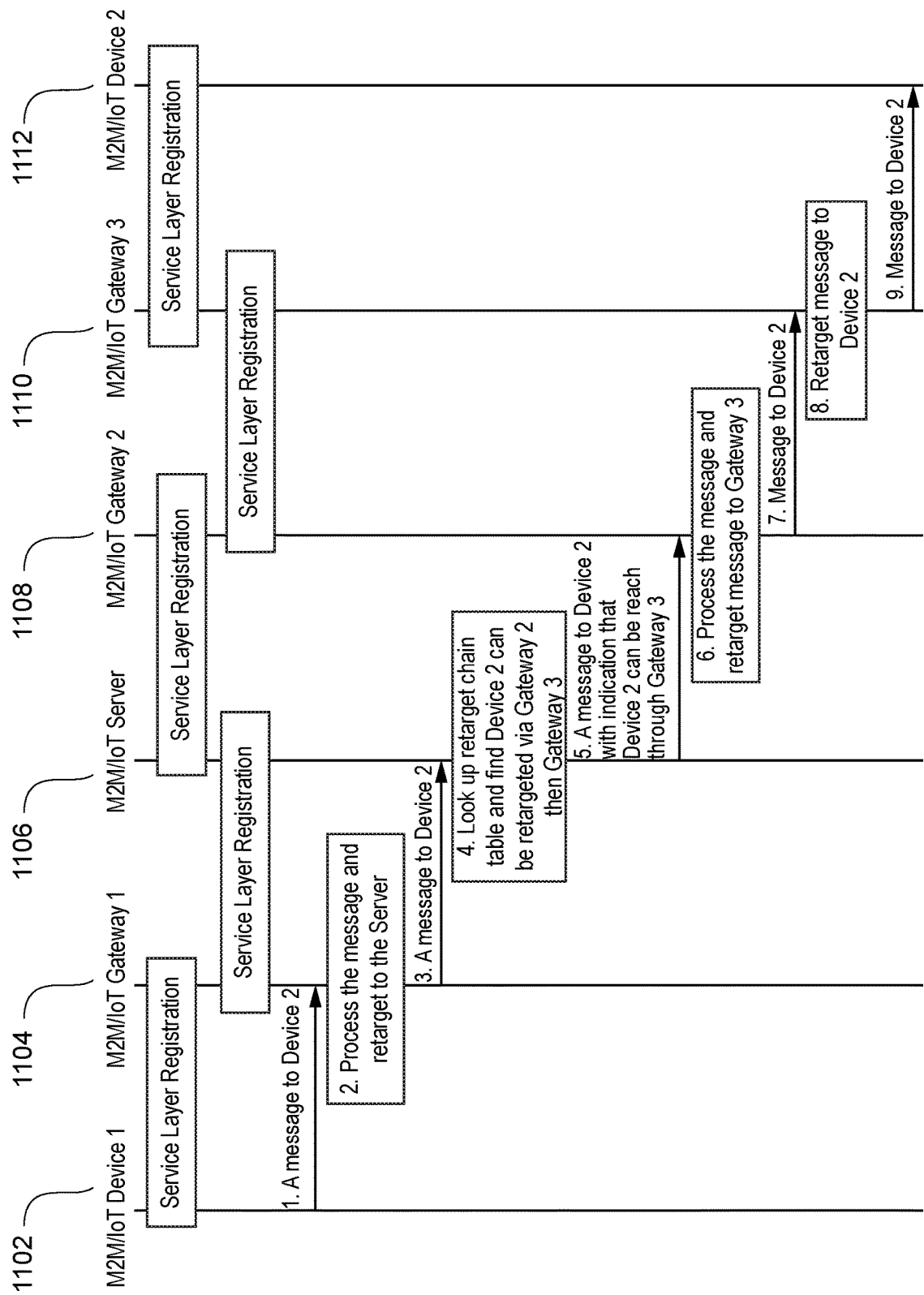
FIG. 34 is a diagram that illustrates a CSE retargeting a service layer message using a retargeting chain table.

FIG. 34 shows one embodiment of a procedure when a CSE, e.g. ASN-CSE on Device 1 1106, sends a message to another CSE, e.g. ASN-CSE on Device 2, in the same service provider. A CSE other than the IN-CSE receives a service layer message and is not the destination entity of the message, the entity check the retargeting chain information contained in the message. If there is no retargeting chain information in the message and the CSE find an entry associated with the destination CSE in retargeting chain table, e.g. IN-CSE on the Server 1106, then the entity retargets the message to the first entity on the retargeting chain and inserts the rest entities on the retargeting chain in the message. If there is no retargeting chain information in the message and the CSE cannot find an entry associated with the destination CSE in retargeting chain table, e.g. Gateway 1 1104, Gateway 2 1108 and Gateway 3 1110. The CSE will forward the message if the destination has a registration relationship with it, e.g. Gateway 3 1110 in step 8 of FIG. 34, or forward the message to the entity it registered to otherwise, e.g. Gateway 1 1104 in step 2 of FIG. 34. If there is retargeting chain information in the message, the entity retargets the message to the first entity on the retargeting chain, and leave the rest entities on the retargeting chain in the message, e.g. Gateway 2 1108 in step 6 of FIG. 34.

It is understood that the entities performing the steps illustrated in FIG. 34 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 34 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 34. It is also understood that the functionality illustrated in FIG. 34 may implemented as a set of virtualized network functions. The network functions may not necessarily communicate directly, rather, they may communicate via forwarding or routing function. It is also understood that any transmitting and receiving steps illustrated in FIG. 34 may be performed by communication circuitry of the apparatus under control of the processor of the apparatus and the computer-executable instructions (e.g., software) that it executes.

Procedure to Manage Retargeting Chain Table

Figure 37:
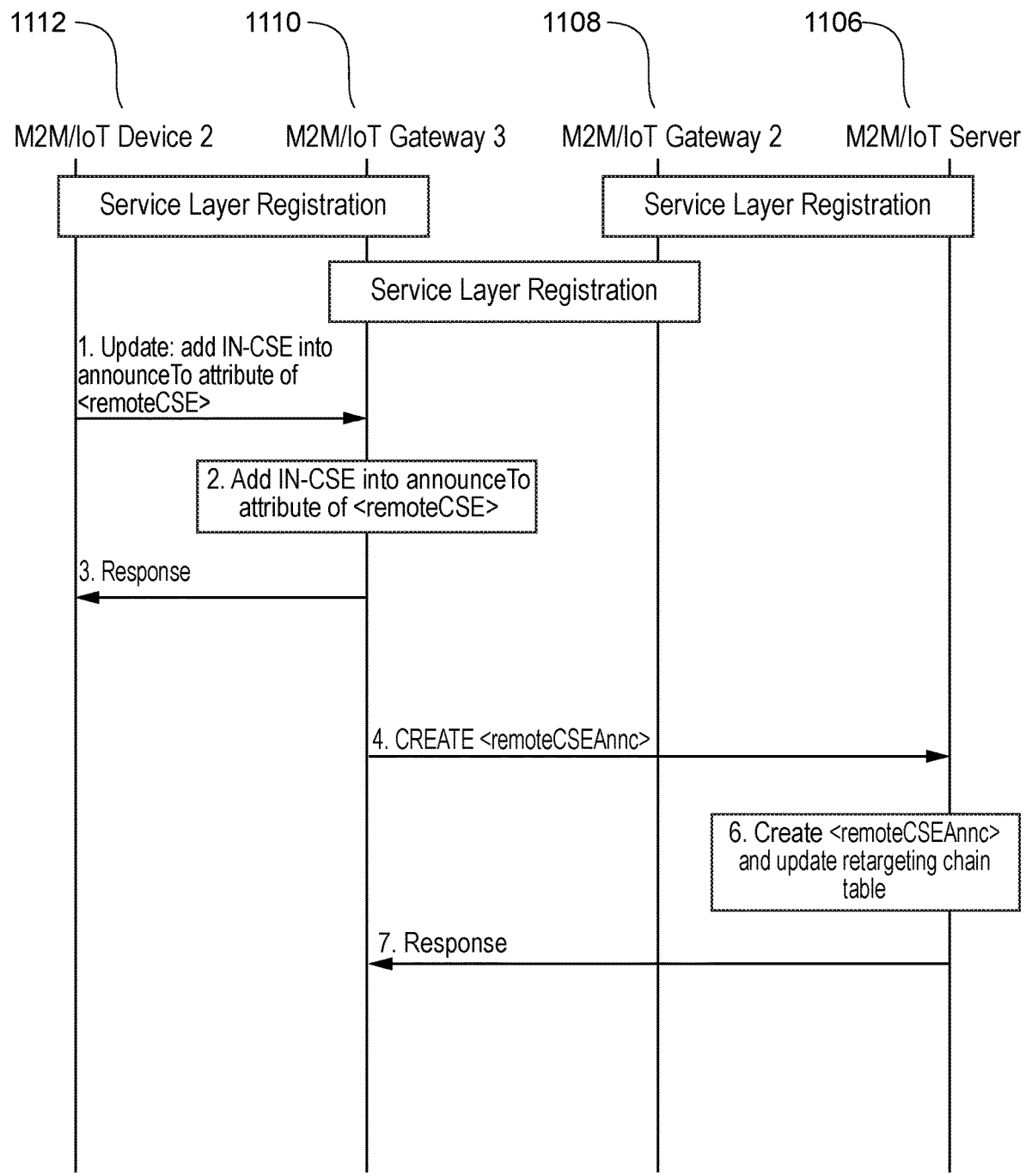
FIG. 37 is a diagram that illustrates an enhanced registration procedure to manage a retargeting chain table.

One embodiment of a procedure to create a retargeting chain table in a oneM2M implementation is shown in FIG. 37.

In Step 1 of FIG. 37, the Originator, e.g. Device 2 1112, sends the CREATE Request message to the Receiver, e.g. Gateway 3 1110 to add IN-CSE into the announceTo attribute of <remoteCSE> associated with it.

In Step 2 of FIG. 37, the Receiver, e.g. Gateway 3 1110, performs adding the IN-CSE into the announceTo attribute. The Receiver should perform the procedure to create an announced resource with pointOfAccess attribute as describes in Section 10.2.18.4 in oneM2M-TS-0001 oneM2M Functional Architecture-V-2.6.0.

In Step 3 of FIG. 37, the Receiver, e.g. Gateway 3 1110, responds with a Response message.

In Step 4 of FIG. 37, the Receiver, e.g. Gateway 3 1110 creates new <remoteCSEAnnc> resources at the IN-CSE, e.g. the Server 1106.

Figure 35:
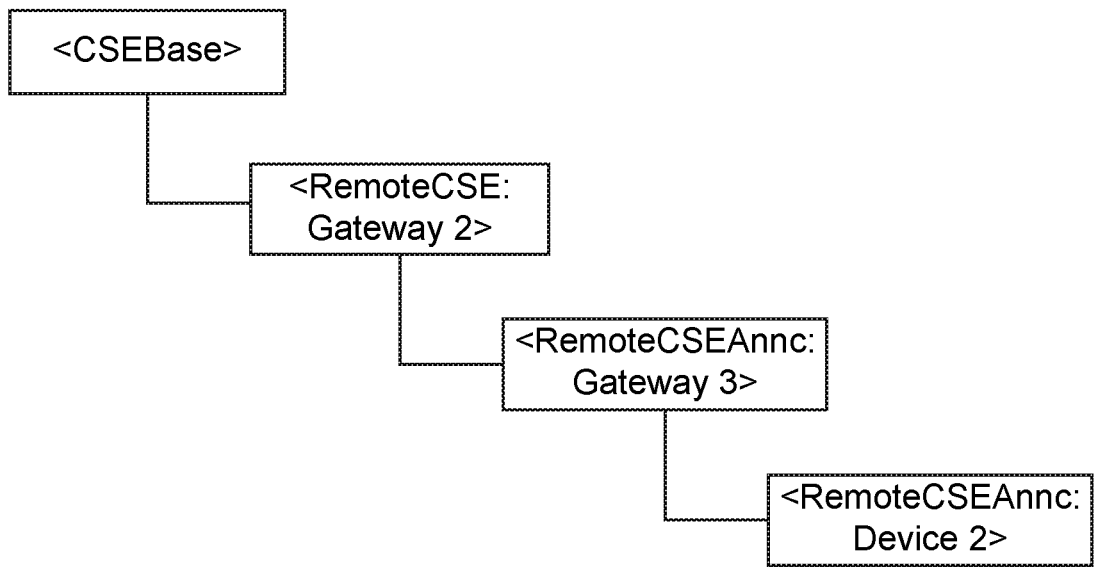
FIG. 35 is a diagram that illustrates the creation of new <remoteCSEAnnc> resources when the server receives the request from Gateway 3.
Figure 36:
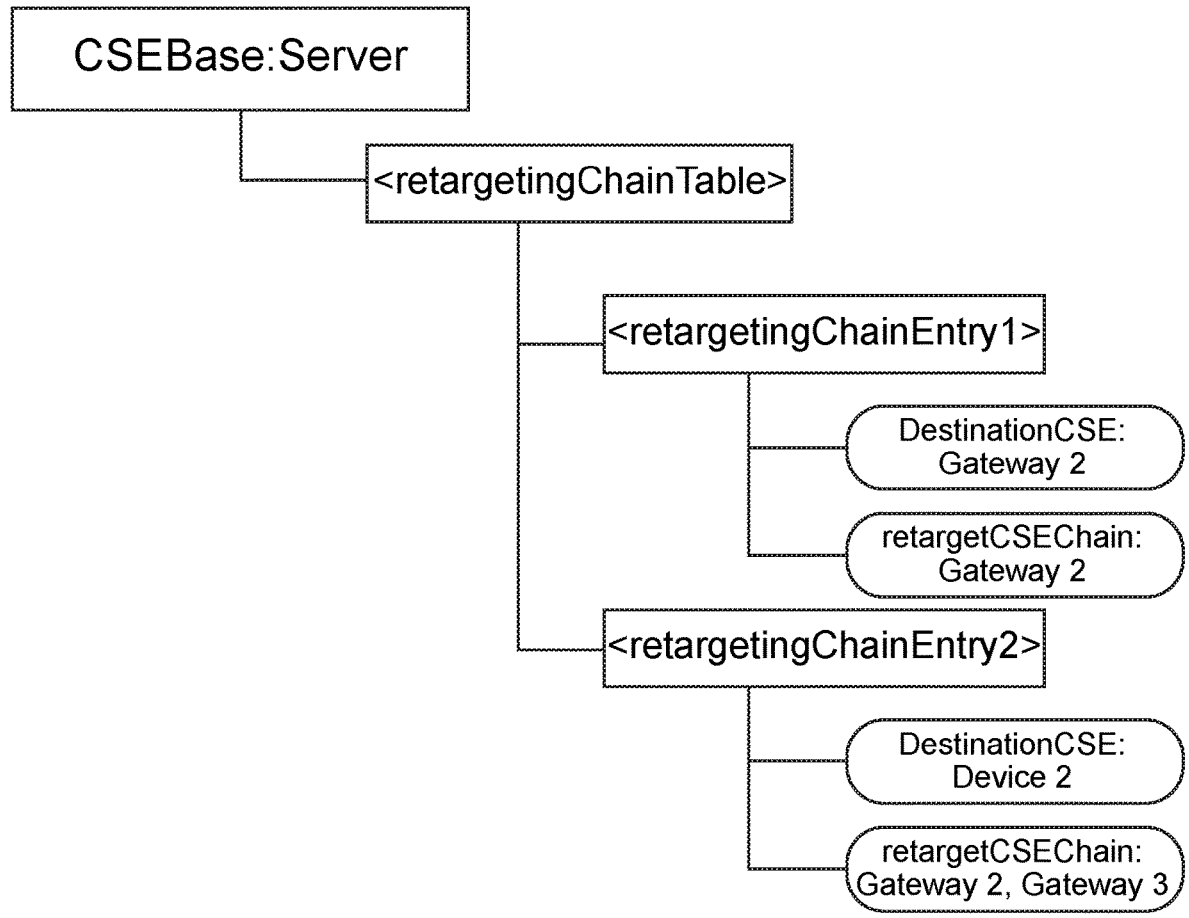
FIG. 36 is a diagram that illustrates the creation of new <retargetingChainEntry> resources when the server receives the request from Gateway 3.

In Step 5 of FIG. 37, the Server 1106 performs creation of <remoteCSEAnnc> resources including PointofAccess attribute for Device 2 1112 as shown in FIG. 35. The Server 1106 adds a new <retargetingChainEntry> under <retargetingChainTable> as highlighted in FIG. 36.

In Step 6 of FIG. 37, the Server 1106 responds with a Response message.

It is understood that the entities performing the steps illustrated in FIG. 37 may be logical entities that may be implemented in the form of software (i.e., computer-executable instructions) stored in a memory of, and executing on a processor of, an apparatus configured for wireless and/or network communications or a computer system such as those illustrated in FIG. 39C or FIG. 39D. That is, the method(s) illustrated in FIG. 37 may be implemented in the form of software (i.e., computer-executable instructions) stored in a memory of an apparatus, such as the apparatus or computer system illustrated in FIG. 39C or FIG. 39D, which computer executable instructions, when executed by a processor of the apparatus, perform the steps illustrated in FIG. 37. It is also understood that the functionality illustrated in FIG. 37 may implemented as a set of virtualized network functions. The network functions may not necessarily communicate directly, rather, they may communicate via forwarding or routing function. It is also understood that any transmitting and receiving steps illustrated in FIG. 37 may be performed by communication circuitry of the apparatus under control of the processor of the apparatus and the computer-executable instructions (e.g., software) that it executes.

User Interface

Interfaces, such as Graphical User Interfaces (GUIs), can be used to assist a user to control and/or configure functionalities related to Service Layer Retargeting. A user interface can be added to a SL entity (e.g. an oneM2M CSE) to configure and/or display parameters of its descendant entities, retargeting table and retargeting chain table in real time.

Figure 38:
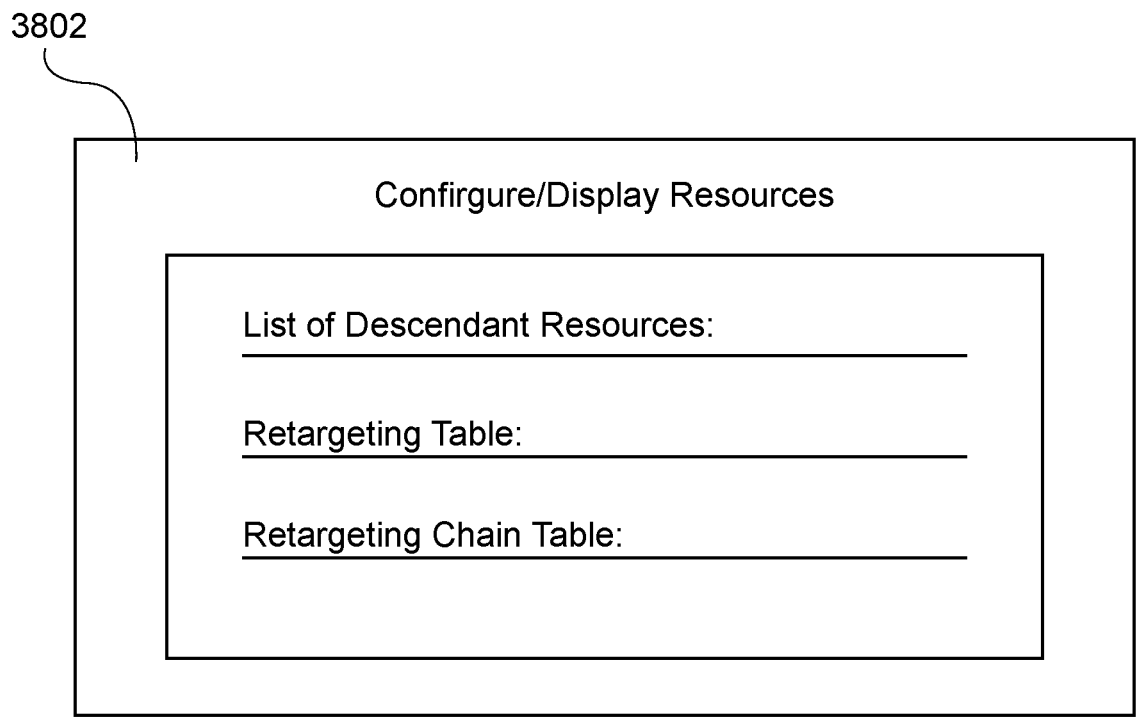
FIG. 38 is a diagram that illustrates a graphical user Interface (GUI) for a SL Entity (e.g. an oneM2M CSE).

FIG. 38 illustrates one embodiment of an example of such a user interface. It is to be understood that interfaces, such as the graphical user interface of FIG. 38, can be produced using displays such as those shown in FIGS. 39C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term service layer refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service run-time enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 39A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server 1106, or M2M service platform may be a component or node of the IoT/WoT as well as an IoT/WoT service layer, etc. Communication system 10 can be used to implement functionality of the disclosed embodiments and can include functionality and logical entities such as service layer 102, Application Protocols 104, Applications 106, CSE 202 and 206, AE 204, NSE 208, originator 602, receiver 604, AE1 802, MN-CSE1 804, MN-CSE2 806 IN-CSE 808, entities with service layer retargeting tables and service layer retargeting chain tables, M2M/IoT Gateway 1 1104, M2M/IoT Gateway 2 1108, M2M/IoT Gateway 3 1110, M2M/IoT server 1106, M2M/IoT Device 1 1106, M2M/IoT Device 2 1112, M2M/IoT Device 3 1114, Communication Management/Delivery Handling CSF 1902, Registration CSF 1904 and logical entities to produce interfaces such as interface 3802.

As shown in FIG. 39A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 39A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 39B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments. The M2M service layer 22 may be implemented by one or more servers, computers, devices, virtual machines (e.g. cloud/storage farms, etc.) or the like, including for example the devices illustrated in FIGS. 39C and 39D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 39B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' may be a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities described herein may be hosted within a M2M service layer instance hosted by an M2M node, such as an M2M server, M2M gateway, or M2M device, as shown in FIG. 39B. For example, one or more of the logical entities described herein may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 39C or FIG. 39D described below.

Further, the logical entities described herein may be implemented as part of an M2M network that uses a Service Oriented Architecture (SOA) and/or a Resource-Oriented Architecture (ROA) to access services of the present application.

FIG. 39C is a block diagram of an example hardware/software architecture of a M2M network node 30, such as an M2M device 18, an M2M gateway 14, an M2M server, or the like. The node 30 can be part of an M2M network as shown in FIG. 39A-B or part of a non-M2M network. As shown in FIG. 39C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 39C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 39C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 39C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 39D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 may be used to implement one or more of the logical entities described herein, such as service layer 102, Applications 106, CSE 202 and 206, AE 204, NSE 208, originator 602, receiver 604, AE1 802, MN-CSE1 804, MN-CSE2 806 IN-CSE 808, entities with service layer retargeting tables and service layer retargeting chain tables, M2M/IoT Gateway 1 1104, M2M/IoT Gateway 2 1108, M2M/IoT Gateway 3 1110, M2M/IoT server 1106, M2M/IoT Device 1 1106, M2M/IoT Device 2 1112, M2M/IoT Device 3 1114, Communication Management/Delivery Handling CSF 1902, Registration CSF 1904 and logical entities to produce interfaces such as interface 3802. Computing system 90 can be an M2M device, user equipment, gateway, or any other nodes of a network, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 39A and FIG. 39B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 39 A-B or the device 30 of FIG. 39 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the subject matter of the claims, including the best mode, and also to enable any person skilled in the art to practice the claimed subject matter, including making and using any devices or systems and performing any incorporated methods. The patentable scope of this subject matter is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to implement a first service layer entity of a communications network and to cause the first service layer entity to:
   receive a request from a second service layer entity on the network to register with the first service layer entity, the request to register comprising information identifying one or more other service layer entities that are descendants of the second service layer entity and to which messages may be retargeted via the second service layer entity, wherein a descendant of a service layer entity comprises an entity having a direct or an indirect registration relationship with the service layer entity;
   store, in a data structure maintained by the first service layer entity, information identifying each of the descendants of the second service layer entity as a possible destination for service layer messages received by the first service layer entity and identifying the second service layer entity as an entity to which any such received service layer messages are to be retargeted;
   receive a service layer message comprising information identifying a destination for the received service layer message, wherein the destination does not have a registration relationship with the first service layer entity;
   determine, from the data structure maintained by the first service laver entity, that the destination for the received service laver message is one of the descendants of the second service layer entity; and
   based on the determining, retarget, the received service layer message to the second service layer entity.

2. The apparatus of claim 1, wherein the instructions further cause the first service layer entity to:
   receive another request from a third service layer entity on the network to register with the first service layer entity, the another request to register comprising information identifying one or more other service layer entities that are descendants of the third service layer entity;
   store, in the data structure maintained by the first service layer entity, information identifying each of the descendants of the third service layer entity as a possible destination for service layer messages received by the first service layer entity and identifying the third service layer entity as an entity to which any such received service layer messages are to be retargeted.

3. The apparatus of claim 1, wherein the instructions further cause the first service layer entity to update or remove the information in the data structure associated with the second service layer entity.

4. The apparatus of claim 1, wherein the instructions further cause the first service layer entity to store in the data structure, information specifying an expiration time for the information associated with the second service layer entity.

5. The apparatus of claim 1, wherein the data structure comprises a table.

6. The apparatus of claim 1, wherein the instructions further cause the first service layer entity to:
    receive another service layer message comprising information identifying a destination for the received other service layer message;
    determine that the data structure does not contain any information associated with the identified destination for the other service layer message; and
    forward the other service layer message to another service layer entity to which the first service layer entity of the apparatus is registered.

7. A method, comprising:
    receiving, by a first service layer entity of a communications network, a request from a second service layer entity on the network to register with the first service layer entity, the request to register comprising information identifying one or more other service layer entities that are descendants of the second service layer entity and to which messages may be retargeted via the second service layer entity, wherein a descendant of a service layer entity comprises an entity having a direct or an indirect registration relationship with the service layer entity;
    storing, by the first service layer entity in a data structure maintained by the first service layer entity, information identifying each of the descendants of the second service layer entity as a possible destination for service layer messages received by the first service layer entity and identifying the second service layer entity as an entity to which any such received service layer messages are to be retargeted;
    receiving, by the first service layer entity, a service layer message comprising information identifying a destination for the received service layer message, wherein the destination does not have a registration relationship with the first service layer entity;
    determining, from the data structure maintained by the first service layer entity, that the destination for the received service laver message is one of the descendants of the second service layer entity; and
    based on the determining, retargeting, by the first service layer entity, the received service layer message to the second service layer entity.

8. The method of claim 7, further comprising:
    receiving, by the first service layer entity, another request from a third service layer entity on the network to register with the first service layer entity, the another request to register comprising information identifying one or more other service layer entities that are descendants of the third service layer entity;
    storing, by the first service layer entity in the data structure maintained by the first service layer entity, information identifying each of the descendants of the third service layer entity as a possible destination for service layer messages received by the first service layer entity and identifying the third service layer entity as an entity to which any such received service layer messages are to be retargeted.

9. The method of claim 7, further comprising removing or updating, by the first service layer entity, the information in the data structure associated with the second service layer entity.

10. The method of claim 7, further comprising storing, by the first service layer entity, in the data structure, information specifying an expiration time for the information associated with the second service layer entity.

11. The method of claim 7, wherein the data structure comprises a table.

12. A computer-readable storage medium storing instructions that, when executed, cause:
    receiving, by a first service layer entity of a communications network, a request from a second service layer entity on the network to register with the first service layer entity, the request to register comprising information identifying one or more other service layer entities that are descendants of the second service layer entity and to which messages may be retargeted via the second service layer entity, wherein a descendant of a service layer entity comprises an entity having a direct or an indirect registration relationship with the service layer entity;
    storing, by the first service layer entity in a data structure maintained by the first service layer entity, information identifying each of the descendants of the second service layer entity as a possible destination for service layer messages received by the first service layer entity and identifying the second service layer entity as an entity to which any such received service layer messages are to be retargeted;
    receiving, by the first service layer entity, a service layer message comprising information identifying a destination for the received service layer message, wherein the destination does not have a registration relationship with the first service layer entity;
    determining, from the data structure maintained by the first service layer entity, that the destination for the received service laver message is one of the descendants of the second service laver entity; and
    based on the determining, retargeting, by the first service layer entity, the received service layer message to the second service layer entity.

13. The computer-readable medium of claim 12, wherein the instructions further cause:
    receiving, by the first service layer entity, another request from a third service layer entity on the network to register with the first service layer entity, the another request to register comprising information identifying one or more other service layer entities that are descendants of the third service layer entity;
    storing, by the first service layer entity in the data structure maintained by the first service layer entity, information identifying each of the descendants of the third service layer entity as a possible destination for service layer messages received by the first service layer entity and identifying the third service layer entity as an entity to which any such received service layer messages are to be retargeted.

14. The computer-readable medium of claim 12, wherein the instructions further cause removing or updating, by the first service layer entity, the information in the data structure associated with the second service layer entity.

15. The computer-readable medium of claim 12, wherein the instructions further cause storing, by the first service layer entity, in the data structure, information specifying an expiration time for the information associated with the second service layer entity.

16. The computer-readable medium of claim 12, wherein the data structure comprises a table.

\* \* \* \* \*